United States Patent [19]
Yamaguchi et al.

[11] Patent Number: 6,088,486
[45] Date of Patent: Jul. 11, 2000

[54] VIDEO CODING AND VIDEO DECODING APPARATUS

[75] Inventors: Noboru Yamaguchi, Yashio; Toshiaki Watanabe, Yokohama; Takashi Ida, Kawasaki; Takaaki Kuratate, Kobe, all of Japan

[73] Assignee: Kabushiki Kaisha Toshiba, Kawasaki, Japan

[21] Appl. No.: 09/069,852

[22] Filed: Apr. 30, 1998

Related U.S. Application Data

[63] Continuation of application No. 08/722,943, Sep. 30, 1996, Pat. No. 5,883,678.

[30] Foreign Application Priority Data

| Sep. 29, 1995 | [JP] | Japan | 7-276989 |
| Sep. 29, 1995 | [JP] | Japan | 7-276990 |
| Oct. 27, 1995 | [JP] | Japan | 7-281028 |

[51] Int. Cl.[7] .................................................. G06K 9/36
[52] U.S. Cl. ............................................................ 382/243
[58] Field of Search .................................... 382/232, 233, 382/234, 235, 236, 238, 239, 240, 241, 242, 243, 244, 248; 358/432, 433, 261.3

[56] References Cited

U.S. PATENT DOCUMENTS

| 4,606,069 | 8/1986 | Johnsen .................................... 382/243 |
| 4,951,140 | 8/1990 | Ueno et al. . |
| 5,032,927 | 7/1991 | Watanabe et al. . |
| 5,113,457 | 5/1992 | Enomoto et al. ......................... 382/243 |
| 5,231,491 | 7/1993 | Holoch . |
| 5,233,422 | 8/1993 | Kondo et al. . |
| 5,274,453 | 12/1993 | Maeda . |
| 5,303,044 | 4/1994 | Richards . |
| 5,363,213 | 11/1994 | Coward et al. . |
| 5,444,492 | 8/1995 | Kihara . |
| 5,497,435 | 3/1996 | Berger ....................................... 382/249 |
| 5,528,704 | 6/1996 | Parker et al. . |
| 5,592,228 | 1/1997 | Dachiku et al. ......................... 382/241 |
| 5,638,130 | 6/1997 | Linzer . |
| 5,748,789 | 5/1998 | Lee et al. ................................. 382/243 |

OTHER PUBLICATIONS

A.K. Jain. "Fundamentals of Digital Image Processing", Prentice Hall, Chapter 11, Section 11.9, (pp. 548–551), 1989.

*Primary Examiner*—Jose L. Couso
*Attorney, Agent, or Firm*—Oblon, Spivak, McClelland, Maier & Neustadt, P.C.

[57] ABSTRACT

A video encoding apparatus is provided with a resolution converting section, an encoding section, and a transmitting section. The resolution converting section enlarges or reduces a binary picture which represents the shape of an object. The encoding section encodes a binary picture reduced by the resolution converting section. The reduction ratio used by the resolution converting section is encoded, and the transmitting section transmits this encoded reduction ratio along with encoded data on the binary picture. The amount of encoded data produced from the encoding section is controlled by changing the enlargement/reduction ratio used by the resolution converting section.

16 Claims, 63 Drawing Sheets

|  | MMR | THIS EMBODIMENT |
|---|---|---|
| P | 0 0 0 1 | 0 0 0 0   0 0 1 |
| $V_0$ | 1 | 0 1 |
| $V_1$ | 0 1 S | 1 S |
| $V_2$ | 0 0 0 0   1 S | 0 0 1 S |
| $V_3$ | 0 0 0 0   0 1 S | 0 0 0 1   S |
| $V_4$ |  | 0 0 0 0   0 1 S |
| $V_5$ |  | 0 0 0 0   0 0 0 1 S |
| ESC |  | 0 0 0 0   0 0 0 0 1 |
| H | 0 0 1 | 0 0 0 0   1 |

S : SIGN BIT

FIG. 10

[ MMR ENCODING ]

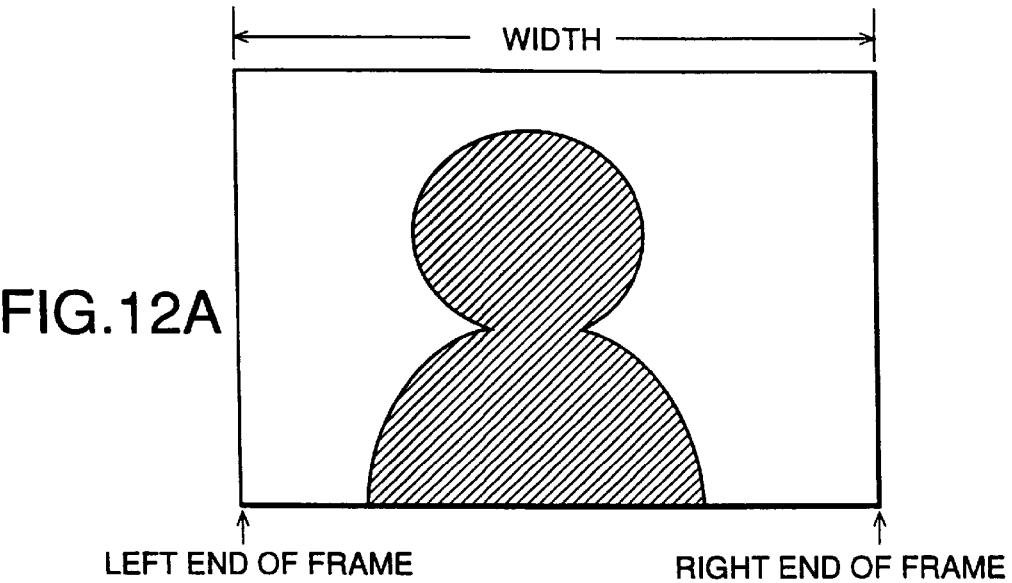
FIG.12A
LEFT END OF FRAME          RIGHT END OF FRAME
FIG.12B   ← REFERENCE LINE
          ← ENCODING LINE
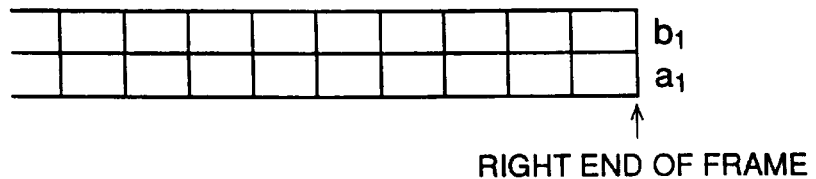
FIG.12C
RIGHT END OF FRAME $b_2 = a_0$ $b_2 = a_0$

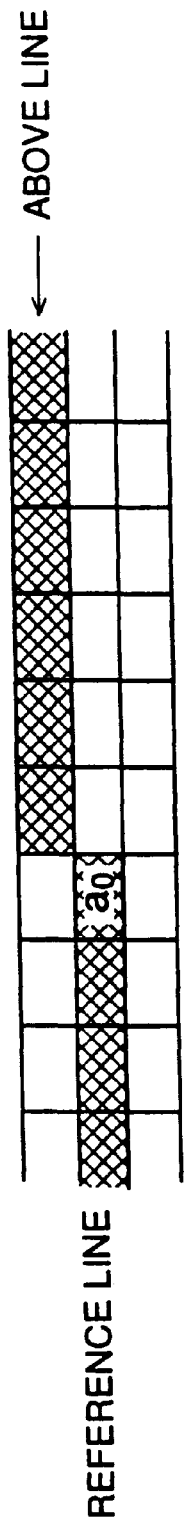
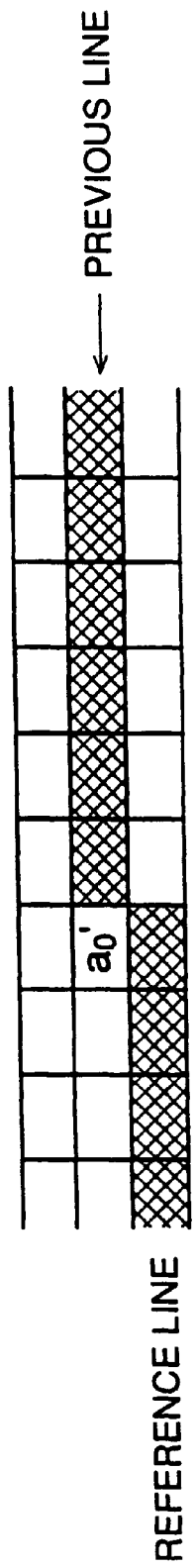
FIG.19A
FIG.19B

EXAMPLE OF TRANSMISSION OF ENCODED ALPHA-MAP

⇩ REDUCTION

●:CHANGED PIXEL

●:CHANGED PIXEL

●:CHANGED PIXEL

 CR=1/4
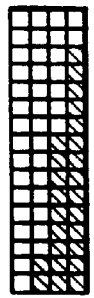 CR=1/4
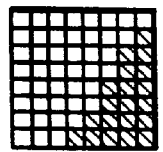 CR=1/2
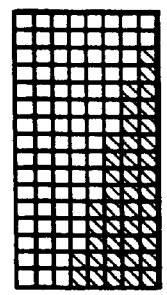 CR=1/2
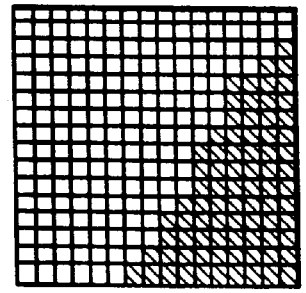 CR=1
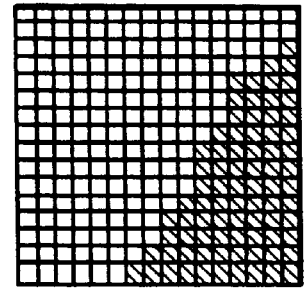 CR=1
FIG.40A
FIG.40B

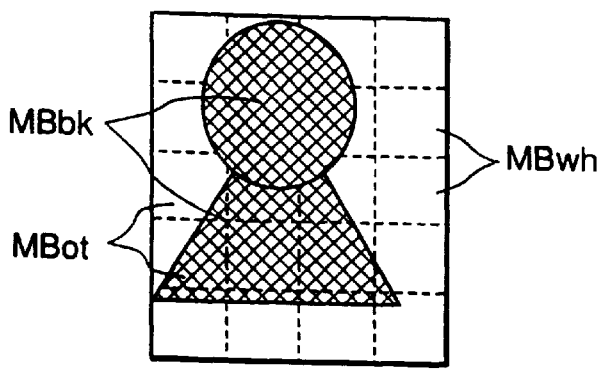
FIG.43A
FIG.43B
BLOCK TYPE
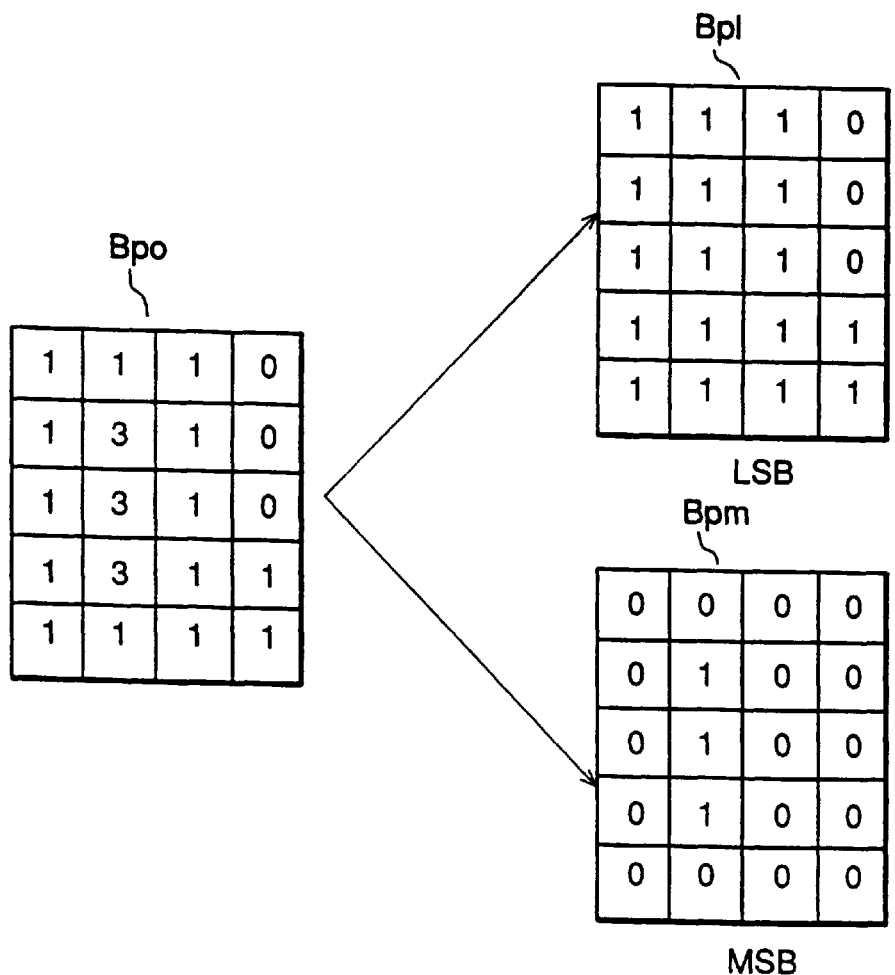
FIG.43C

TIME n−1

| 0 | 0 | 1 | 1 | 0 | 0 | 0 |
|---|---|---|---|---|---|---|
| 0 | 1 | 1 | 1 | 0 | 0 | 0 |
| 0 | 1 | 3 | 1 | 0 | 0 | 0 |
| 1 | 3 | 3 | 1 | 0 | 0 | 0 |
| 1 | 3 | 3 | 3 | 1 | 1 | 0 |
| 1 | 3 | 3 | 3 | 3 | 1 | 1 |

↑ CUT

FIG. 46 A

TIME n−1′

| 0 | 0 | 1 | 1 | 0 | 0 |
|---|---|---|---|---|---|
| 0 | 1 | 1 | 1 | 0 | 0 |
| 0 | 1 | 3 | 1 | 0 | 0 |
| 1 | 3 | 3 | 1 | 0 | 0 |
| 1 | 3 | 3 | 3 | 1 | 1 |
| 1 | 3 | 3 | 3 | 3 | 1 |
| 1 | 3 | 3 | 3 | 3 | 1 |

← COPY

FIG. 46 B

| S | S | S | S | S | S |
|---|---|---|---|---|---|
| S | S | S | S | S | S |
| S | S | S | S | S | S |
| S | S | S | S | S | S |
| S | S | S | D | S | D |
| S | S | S | S | S | S |
| S | D | D | D | D | S |

FIG. 47 A

| S | S | D | S | D | S |
|---|---|---|---|---|---|
| S | D | S | S | D | S |
| S | D | D | D | D | S |
| D | D | S | D | D | S |
| D | D | S | D | S | D |
| D | D | S | S | S | D |
| S | S | S | S | S | S |

FIG. 47 B

| | | | | | | |
|---|---|---|---|---|---|---|
| S | S | S | S | S | S | ← all S |
| S | S | S | S | S | S | ← all S |
| S | S | S | S | S | S | ← all S |
| S | S | S | S | S | S | ← all S |
| S | S | S | D | S | D | : |
| S | S | S | S | S | S | ← all S |
| S | D | D | D | D | S | |

FIG. 48

| | | CURRENT BLOCK TYPE | | |
|---|---|---|---|---|
| | | MBwh | MBot | MBbk |
| PREDICTED BLOCK TYPE | MBwh | 1 | 0 0 | 0 1 |
| | MBot | 1 0 | 0 | 1 1 |
| | MBbk | 0 1 | 0 0 | 1 |

FIG. 49

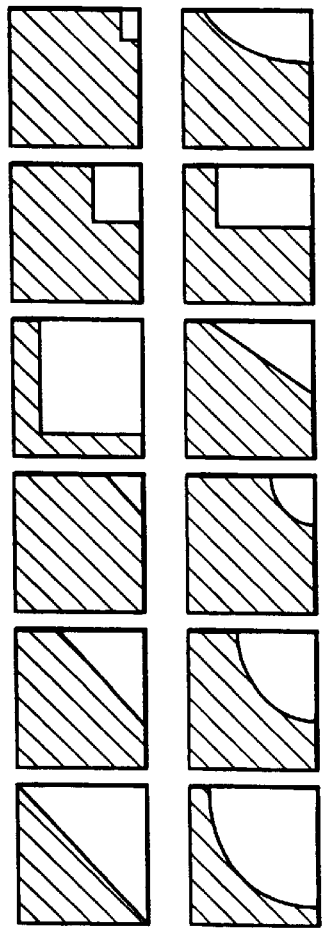
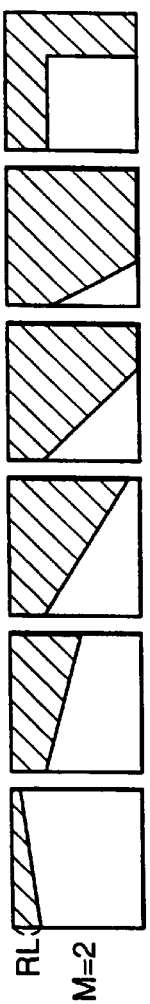
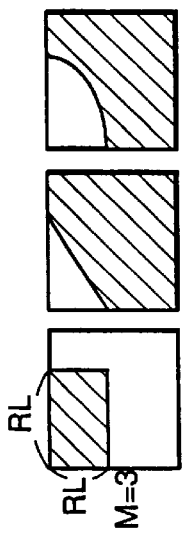
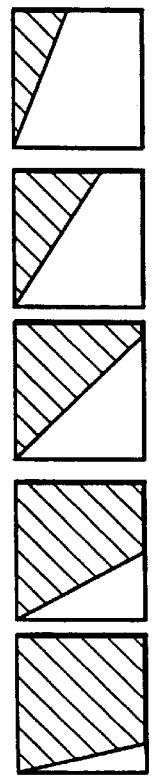
FIG.70A FIG.70B M=2 FIG.70C M=3 FIG.70D M=4

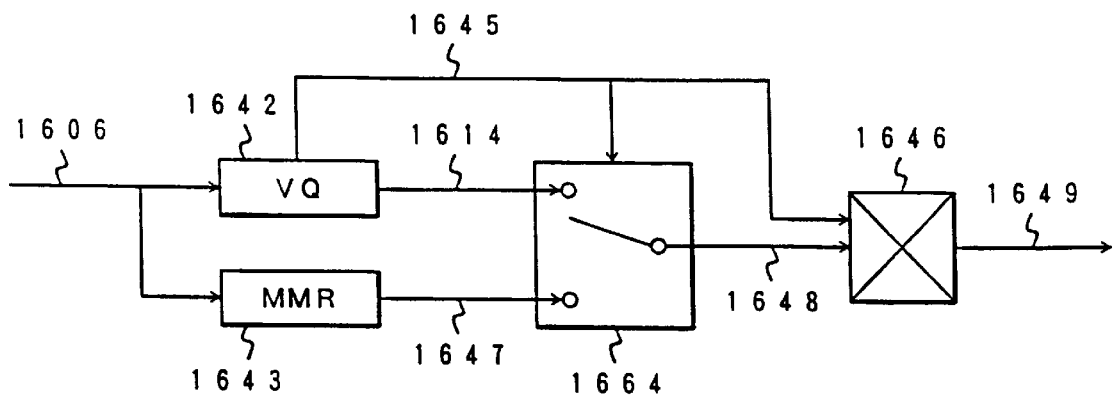
FIG. 71A
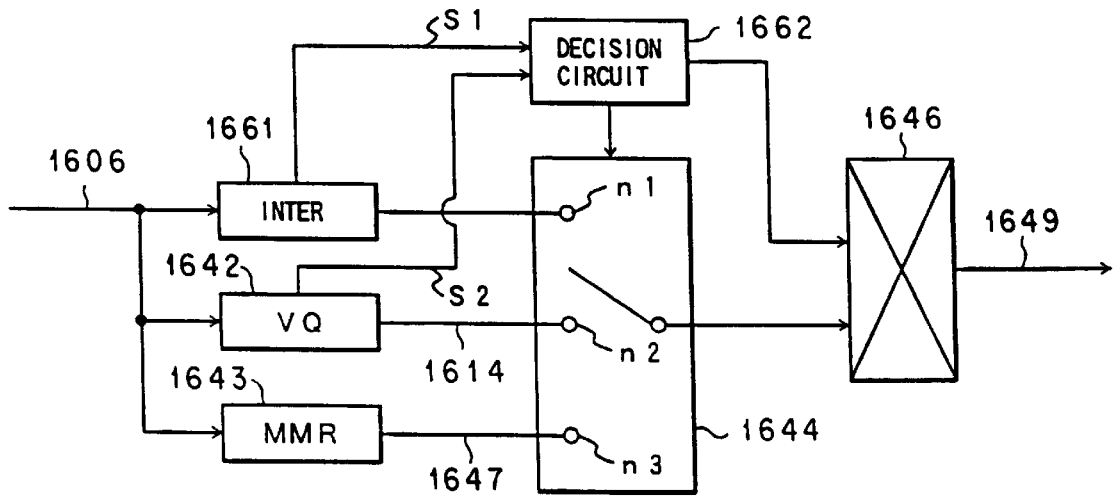
FIG. 71B
|  | n1 | n2 | n3 |
|---|---|---|---|
| S1 | ON | OFF | OFF |
| S2 | — | ON | OFF |
FIG. 71C

| MODE | Vertical_pass_mode==FALSE | Vertical_pass_mode==TRUE |
|------|---------------------------|--------------------------|
| V 0  | 1                         | 1                        |
| V 1  | 0 1 s                     |                          |
| V 2  | 0 0 0 0 1 s               |                          |
| V 3  | 0 0 0 0 0 1 s             |                          |
| V 4  | 0 0 0 0 0 0 1 s           |                          |
| V 5  | 0 0 0 0 0 0 0 1 s         |                          |
| EOMB | 0 0 0 1                   | ( 0 1 )                  |
| H    | 0 0 1                     | 0 ( 0 0 )                | s : SIGN BIT

FIG. 73

● :CHANGING PIXEL

▨ :REFERENCE AREA

VIDEO CODING AND VIDEO DECODING APPARATUS

This application is a continuation of U.S. application Ser. No. 08/722,943 filed Sep. 30, 1996 now U.S. Pat. No. 5,883,678.

BACKGROUND OF THE INVENTION

1. Field of the Invention

The present invention relates to a video coding apparatus and a video decoding apparatus for encoding a video signal at a high efficiency, transmitting and storing the coded signal, and decoding the coded signal.

2. Description of the Related Art

Generally, a video signal is compression-encoded before being transmitted or stored because the signal has an enormous amount of information. To encode a video signal at a high efficiency, a picture or an image of a frame is divided into a plurality of blocks in units of a predetermined number of pixels. Orthogonal transformation is performed for each block to separate the special frequency of a picture into frequency components. Each frequency component is obtained as a transform coefficient and encoded.

As one video coding system, a video coding system belonging to a category called mid-level coding is proposed in J.Y.A. Wang et. al., "Applying Mid-level Vision Techniques for Video Data Compression and Manipulation", M.I.T. Media Lab. Tech. Report No. 263, February, 1994.

In this system, when a picture consists of a background and an object, these background and object are separately encoded.

To separately encode the background and the object, an alpha-map signal (indicating the background by black pixels and the object by white pixels) which is subsidiary video information representing the shape of the object and the position of the object in the frame is necessary. An alpha-map signal of the background can be uniquely obtained from the alpha-map signal of the object.

As methods of efficiently encoding this alpha-map signal, a binary video encoding method (e.g., MMR (Modified Modified READ) encoding) or a line figure encoding method (e.g., chain encoding) is used.

Furthermore, to reduce the amount of codes of an alpha-map, it is possible to use a method (J. Ostermann, "Object-based analysis-synthesis coding based on the source model of moving rigid 3D objects", Signal Process. Image Comm. Vol. 6, No. 2, pp. 143–161, 1994) by which the contour lines of a shape are approximated by polygons and smoothed by spline curves or a method (Japanese Patent Application No. 5-297133) by which an alpha-map is encoded by reducing it and approximated by curves when it is enlarged.

In the above system of separately encoding the background and the object in the frame, the amount of codes is increased by the amount of alpha-maps compared to the conventional coding method of encoding a whole frame at once. This increase in the alpha-map code amount decreases the coding efficiency.

SUMMARY OF THE INVENTION

It is an object of the present invention to provide a video coding apparatus and a video decoding apparatus capable of efficiently encoding and decoding alpha-map information which is subsidiary video information representing the shape of an object and the position of the object in the frame.

According to the present invention, there is provided a binary picture encoding apparatus comprising a division section for dividing a rectangular region containing an object into blocks, each of the blocks having M×N pixels (M: the number of pixels included in a row array, N: the number of pixels included in a column array), an encoder for encoding the blocks of the rectangular region by a predetermined rule by applying relative address coding to at least part of the blocks, a storage for storing reproduction values corresponding to a region which is near each of the blocks, and a decoder for detecting pixels having different pixel values, the pixels having different pixel values being reduced in number by detecting the pixels together with reproduction values corresponding to the region near each of the blocks.

According to the present invention, there is provided a binary picture decoding apparatus comprising a decoder for decoding encoded data, which is obtained by sequentially encoding blocks of an object-included rectangular region by a predetermined rule, each of the blocks having M×N pixels (M: the number of pixels included in a row array, N: the number of pixels included in a column array), a storage for storing reproduction values corresponding to a region which is near each of the blocks, a detector for detecting pixels having different pixel values, and a decoder for decoding relative addresses associated with the pixels having different pixel values, the pixels having different pixel values being detected together with reproduction values corresponding to the region near each of the blocks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 10 is a view showing examples of variable-length codes and examples of MMR codes used in the present invention;

FIGS. 12A to 12C are views for explaining the MMR coding procedure;

FIGS. 19A and 19B are views for explaining the present invention, which illustrate intraframe and interframe reference lines;

FIGS. 40A and 40B are views for explaining the present invention, which illustrate the eighth embodiment of the present invention.

FIGS. 43A to 43C are views showing an example in which the block attribute of an alpha map is decomposed into bit planes, so as to explain the ninth embodiment of the present invention;

FIG. 44 is a view showing an example in which the bit planes of the block attribute of the alpha map are encoded, so as to explain the ninth embodiment of the present invention;

FIGS. 45A and 45B are views showing examples of the attribute information of a certain macro block at time n and at time n−1, so as to explain the 10th embodiment of the present invention (views showing the correlation of the block attributes between the frames of the alpha map);

FIGS. 46A and 46B are views showing an example of changing the size of the label at time n−1 in correspondence with the size of the label at time n, so as to explain the 10th embodiment of the present invention;

FIGS. 47A and 47B are views showing interframe encoding and intraframe encoding, so as to explain the 10th embodiment of the present invention;

FIG. 48 is a view showing an example in which encoding is performed in units of lines, so as to explain the 10th embodiment of the present invention;

FIG. 49 is a view showing an example of a variable length code table for encoding each label, so as to explain the 10th embodiment of the present invention;

FIGS. 70A to 70D are views showing examples of index tables using a type M, and "RT" and "RL" used in the present invention, so as to explain the 11th embodiment of the present invention;

FIGS. 71A to 71C are block diagrams showing coding apparatuses of the present invention and switching table of the switch section thereof, so as to explain the 11th embodiment of the present invention;

FIG. 73 is a view showing an example of a VLC table used in the present invention, so as to explain the 11th embodiment of the present invention;

DETAILED DESCRIPTION OF THE PREFERRED EMBODIMENTS

Figure 1:
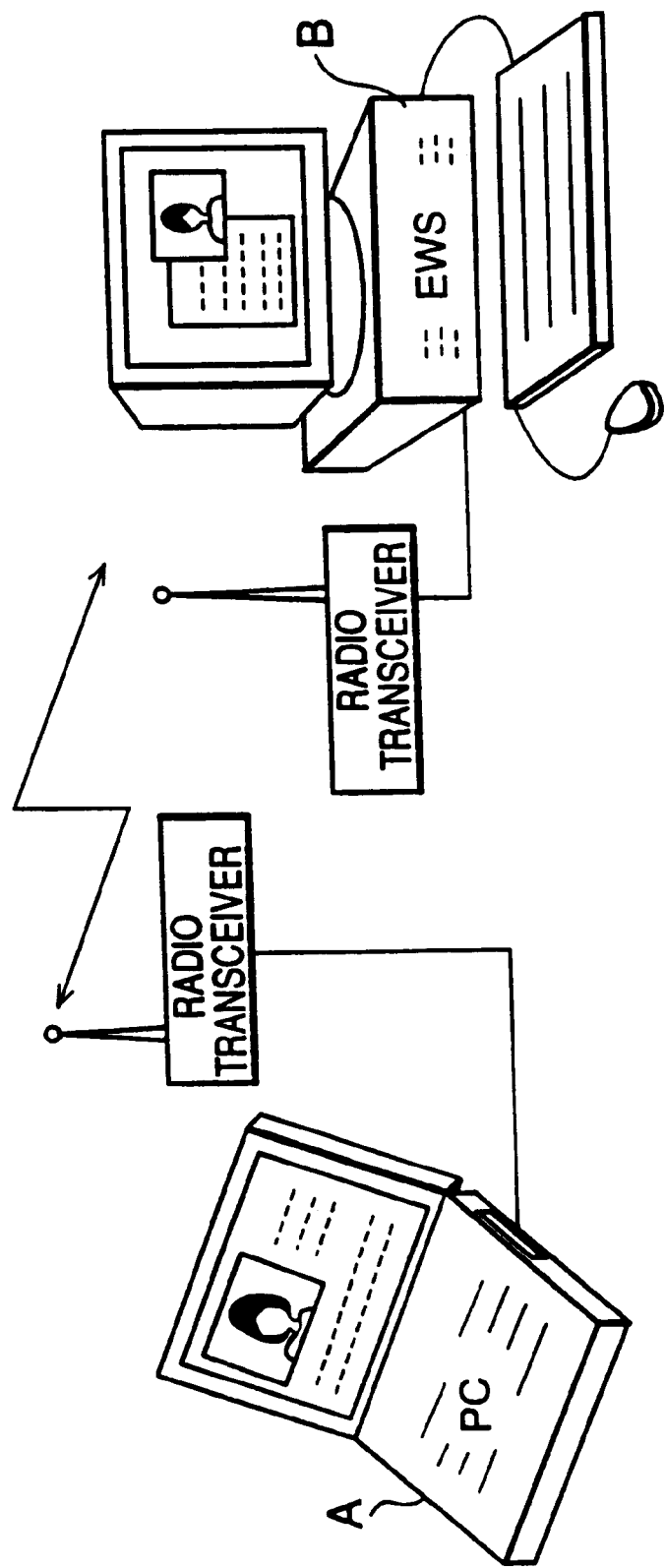
FIG. 1 is a view for explaining the present invention, which illustrates an example of a video transmission system to which a video coding apparatus and a video decoding apparatus of the present invention are applied.

The present invention relates to a video coding apparatus and a video decoding apparatus used in transmitting/receiving apparatuses (A and B in FIG. 1) in a video transmission system shown in FIG. 1. These video coding and decoding apparatuses can perform high-efficiency compression encoding and decoding for an alpha-map signal.

In the present invention, the coding apparatus encodes an alpha-map signal while reducing the resolution and multiplexes the obtained codes together with the reduction ratio information, thereby forming an alpha-map signal to be transmitted or stored. Consequently, an alpha-map signal can be efficiently encoded.

Also, the decoding apparatus of the present invention decodes this efficiently encoded alpha-map signal as follows. That is, the decoding apparatus separates the signal into the alpha-map coded components and the reduction ratio information, decodes the alpha-map coded components, and enlarges the decoded signal to the original resolution in accordance with the reduction ratio information, thereby restoring the alpha-map signal of the original size. This allows easy decoding of a coded picture using an alpha map.

Figure 2:
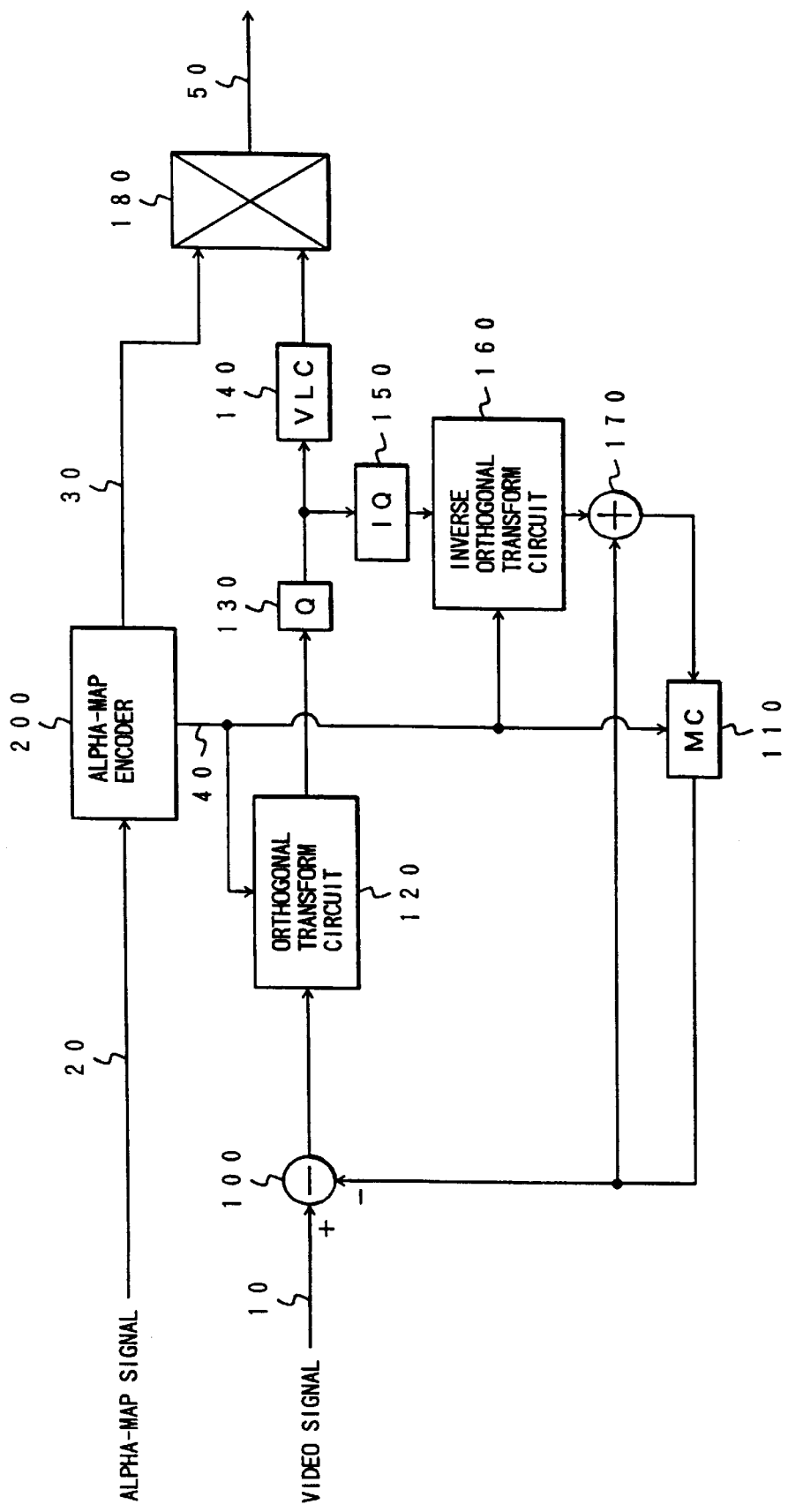
FIG. 2 is a view for explaining the present invention, which is a block diagram showing a schematic arrangement of the whole coding apparatus of the present invention.

FIG. 2 is a block diagram of the video coding apparatus according to the present invention As shown in FIG. 2, the video coding apparatus of the present invention comprises a subtracter 100, a motion compensation prediction circuit 110, an orthogonal transform circuit 120, a quantizer 130, a variable length encoder 140, an inverse quantizer 150, an inverse orthogonal transform circuit 160, an adder 170, a multiplexer 180, and an alpha-map encoder 200.

The alpha-map encoder 200 encodes an input alpha map and outputs the encoded signal as an alpha-map signal to the multiplexer 180. The encoder 200 also has a function of decoding an alpha-map signal and outputting the decoded signal as a local decoded signal.

This alpha-map encoder 200 most particularly has a function of performing, when encoding an input alpha-map signal, processing of reducing the resolution at a given reduction ratio (magnification), encoding the alpha-map signal subjected to this resolution reduction processing, multiplexing the encoded signal and the reduction ratio information (magnification information), and outputting the multiplexed signal as an alpha-map output signal to the multiplexer 180. As the local decoded signal, a signal obtained by performing processing by which the signal subjected to the resolution reduction processing is returned to the original resolution is used.

The subtracter 100 calculates an error signal of a motion compensation prediction signal supplied from the motion compensation prediction circuit 110 and an input video signal. The orthogonal transform circuit 120 transforms the error signal supplied from the subtracter 100 into an orthogonal transform coefficient in accordance with the alpha-map information and outputs the coefficient.

The quantizer 130 quantizes the orthogonal transform coefficient obtained from the orthogonal transform circuit 120. The variable length coder 140 encodes the output from the quantizer 130 and outputs the encoded signal. The multiplexer 180 multiplexes the output encoded signal from the variable length coder 140 and the alpha-map signal, together with side information such as motion vector information, and outputs the multiplexed signal as a bit stream.

The inverse quantizer 150 inversely quantizes the output from the quantizer 130. The inverse orthogonal transform circuit 160 performs inverse orthogonal transformation for the output from the inverse quantizer 150 on the basis of the alpha-map signal. The adder 170 adds the output from the inverse orthogonal transform circuit 160 and the prediction signal (motion compensation prediction signal) supplied from the motion compensation prediction circuit 110 and outputs the sum to the subtracter 100.

The motion compensation prediction circuit 110 has a frame memory and operates on the basis of the local decoded signal supplied from the alpha-map encoder 200, thereby storing signals of an object region and signals of a background region. The motion compensation prediction circuit 110 predicts a motion compensation value from the stored object-region pictures and outputs as a predictive value, and also predicts a motion compensation value from the stored background-region pictures and outputs as a predictive value.

This apparatus with the above configuration is applied with a video signal and an alpha-map of the video signal.

The alpha-map encoder 200 encodes the input alpha-map signal through a line 20 while reducing the signal at a designated resolution reduction ratio (magnification), multiplexes the encoded alpha-map signal together with the resolution reduction ratio information (magnification information), and outputs the multiplexed signal through a line 30. Also, the alpha-map encoder 200 outputs a local decoded signal, which is obtained by decoding the encoded alpha-map signal so as to restore the original resolution, to the orthogonal transform circuit 120, the inverse orthogonal transform circuit 160, and the motion compensation prediction circuit 110 through a line 40.

When encoding an input alpha-map, this alpha-map encoder 200 performs processing of reducing the resolution at a given reduction ratio, encodes the alpha-map signal subjected to the resolution reduction processing, multiplexes the encoded signal and the reduction ratio information, and outputs the multiplexed signal as an alpha-map signal to the multiplexer 180. This allows efficient encoding of an alpha-map signal.

As the local decoded signal, a signal obtained by performing processing of restoring the original resolution of the signal subjected to the resolution reduction processing is used. This local decoded signal is output to the orthogonal transform circuit 120 and the inverse orthogonal transform circuit 160 through the line 40. This permits the orthogonal transform circuit 120 and the inverse orthogonal transform circuit 160 to perform the processing by using the alpha-map of the original size.

A video signal is divided into blocks each having a predetermined pixel size (N×N pixels) and supplied in the order of block positions to the subtracter 100 through a line 10. The subtracter 100 calculates an error signal of this input (video signal) and the prediction signal (the output motion compensation prediction signal from the object prediction circuit 110) and supplies the error signal to the orthogonal transform circuit 120. The orthogonal transform circuit 120 transforms the supplied error signal into an orthogonal transform coefficient in accordance with the alpha-map information supplied through the line 40 and supplies the coefficient to the quantizer 130 where the coefficient is quantized. The transform coefficient quantized by the quantizer 130 is encoded by the variable length coder 140 and also supplied to the inverse quantizer 150. The transform coefficient is inversely quantized by the inverse quantizer 150 and inversely transformed by the inverse orthogonal transform circuit 160.

The adder 170 adds the resulting signal and the motion compensation predictive value supplied from the motion compensation prediction circuit 110. The output local decoded picture from the adder 170 is stored in the frame memory of the motion compensation prediction circuit 110. On the basis of the local decoded signal supplied from the alpha-map encoder 200, the motion compensation prediction circuit 110 supplies to the subtracter 100 a motion compensation predictive value of an object at a timing at which a block in an object region is processed and a motion compensation predictive value of a background portion at other timings. That is, on the basis of the local decoded signal of the alpha-map signal, the motion compensation prediction circuit 110 checks which of a video signal of a portion corresponding to a block in the object or a video signal of a portion corresponding to a block in the background is currently input to the subtracter 100. The motion compensation prediction circuit 110 supplies to the subtracter 100 the object motion compensation prediction signal in a period during which a video signal of a portion corresponding to a block in the object is input and the background motion compensation prediction signal in a period during which a video signal of a portion corresponding to a block in the background is input.

As a consequence, the subtracter 100 calculates the difference between the input video signal and the prediction signal corresponding to a region in the picture. If the input picture is a region corresponding to the object, an error signal with respect to the predictive value in the corresponding position of the object is calculated. If the input picture is a picture in a region of the background, an error signal with respect to the predictive value corresponding to that background position is calculated. The calculated error signal is supplied to the orthogonal transform circuit 120. The orthogonal transform circuit 120 transforms the supplied error signal into an orthogonal transform coefficient in accordance with the alpha-map information supplied through the line 40 and supplies the coefficient to the quantizer 130 where the coefficient is quantized.

The transform coefficient quantized by the quantizer 130 is encoded by the variable length coder 140 and supplied to the inverse quantizer 150. The transform coefficient is inversely quantized by the inverse quantizer 150, inversely transformed by the inverse orthogonal transform circuit 160, and supplied to the adder 170. The output signal from the inverse orthogonal transform circuit 160 is added to the predictive value supplied to the adder 170 via a predictive value switching circuit 500.

The local decoded video signal output from the adder 170 is supplied to the motion compensation prediction circuit 110. On the basis of the local decoded signal of the alpha-map signal, the motion compensation prediction circuit 110 checks which of a signal corresponding to a block in the object or a signal corresponding to a block in the background is currently output from the adder 170. If a signal corresponding to a block in the object is being output, the circuit 110 operates so as to store the signal in a frame memory for the object. If a signal corresponding to a block in the background is being output, the circuit 110 operates so as to store the signal in a memory for the background. Consequently, a picture consisting of only object pictures and a picture consisting of only background pictures are stored in the respective memories. The motion compensation prediction circuit 110 can calculate a predictive value by using an object picture and a predictive value of a background picture by using a picture in the background.

As described above, the alpha-map encoder 200 encodes an input alpha map and supplies the encoded alpha-map signal to the multiplexer 180 through the line 30.

The multiplexer 180 is also supplied with the output transform coefficient from the variable length coder 140 through the line 40. The multiplexer 180 multiplexes the coded values of these alpha-map signal and transform coefficient thus supplied, together with side information such as motion vector information, and outputs the multiplexed signal through the line 50. The output signal is a coded bit stream as the final output of this video coding apparatus.

The foregoing are the configuration and the operation of the coding apparatus. To obtain an error signal of a picture, motion compensation prediction is performed by using an object picture and a background picture. To this end, the apparatus checks in accordance with an alpha map whether the current block position of a picture being processed is a position in an object region or a position in a background region. If the current block position of the picture being processed is an object region position, the apparatus calculates the error by using a predictive value obtained from the object picture. If the current block position of the picture being processed is a background region position, the apparatus calculates the error by using a predictive value obtained from the background picture.

In performing predicting operations for the object and the background, the motion compensation prediction circuit is made hold pictures in the respective corresponding regions, from a picture obtained from the error, in accordance with the alpha map, and these pictures are used in the respective predicting operations. Accordingly, optimum motion compensation prediction can be performed for each of the object and the background. This makes high-quality picture compression encoding and decoding feasible.

Also, in the present invention, an alpha map is encoded while its resolution is reduced, and the obtained codes and the reduction ratio information are together multiplexed to obtain an alpha-map signal to be transmitted or stored. Therefore, the alpha-map signal can be efficiently encoded and this allows efficient encoding of the shape information of the object.

In reproducing the alpha-map signal, the alpha-map coded components and the reduction ratio information are separated. The alpha-map coded components are decoded and enlarged to the original resolution in accordance with the reduction ratio information. Consequently, the alpha map of the original size can be restored and this allows easy decoding of a coded picture using an alpha map.

Figure 3:
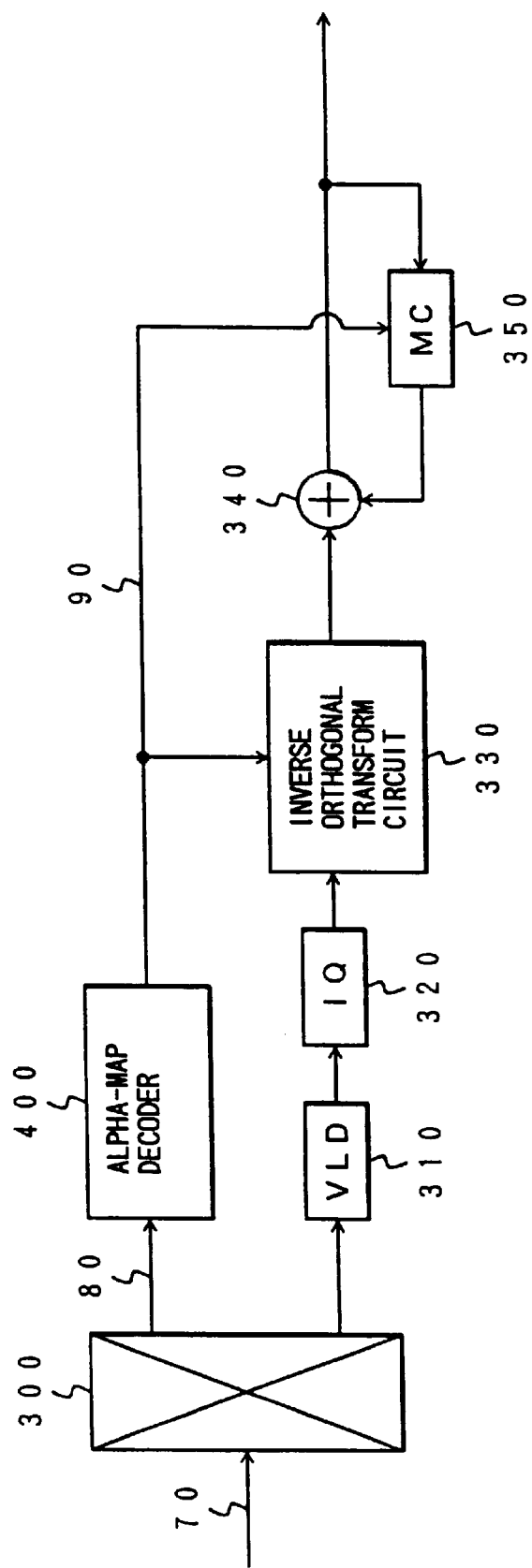
FIG. 3 is a view for explaining the present invention, which is a block diagram showing a schematic arrangement of the whole decoding apparatus of the present invention.

FIG. 3 is a block diagram showing the decoding apparatus of the present invention. As shown in FIG. 3, this decoding apparatus comprises a demultiplexer 300, a variable length decoder 310, an inverse quantizer 320, an inverse orthogonal transform circuit 330, an adder 340, a motion compensation prediction circuit 350, and an alpha-map decoder 400.

The demultiplexer 300 separates an input coded bit stream into an alpha-map signal and a coded signal of a picture. The alpha-map decoder 400 reconstructs an alpha map by decoding the alpha-map signal separated by the demultiplexer 300. In this embodiment, the alpha-map decoder 400 has a function of separating a supplied alpha-map signal into alpha-map components and reduction ratio information (magnification information), decoding the alpha-map components, enlarging the resolution on the basis of the reduction ratio information, and restoring the alpha map with the original resolution.

The variable length decoder 310 decodes the coded signal of a picture separated by the demultiplexer 300. The inverse quantizer 320 returns the decoded signal to the original coefficient by performing inverse quantization. The inverse orthogonal transform circuit 330 returns the coefficient to a predictive error signal by performing inverse orthogonal transformation in accordance with the alpha map. The adder 340 adds to this predictive error signal a motion compensation predictive value from the motion compensation prediction circuit 350 and outputs the sum as a reproduction video signal. This reproduction video signal is the final output from the decoding apparatus.

The motion compensation prediction circuit 350 stores the reproduction video signal output from the adder 340 into a frame memory in accordance with the alpha map, thereby obtaining an object picture and a background picture. In addition, the motion compensation prediction circuit 350 obtains an object motion compensation prediction signal and a background motion compensation prediction signal from these stored pictures.

In the decoding apparatus with the above configuration, a coded bit stream is supplied to the demultiplexer 300 through a line 70 and separated into codes pertaining to an alpha-map signal and variable length codes of a video signal by separating individual information. The codes relating to an alpha-map signal are supplied to the alpha-map decoder 400 through a line 80. The variable length codes of a video signal are supplied to the variable length decoder 310. The alpha-map decoder 400 decodes the codes pertaining to an alpha-map signal into the alpha-map signal and outputs the signal to the inverse orthogonal transform circuit 330 and the motion compensation prediction circuit 350. That is, the alpha-map decoder 400 separates the supplied alpha-map signal into the alpha-map components and the reduction ratio information and decodes the alpha-map components. Also, the decoder 400 restores the alpha map with the original resolution by enlarging the resolution of the decoded signal on the basis of the reduction ratio information and outputs the alpha map to the inverse orthogonal transform circuit 330 and the motion compensation prediction circuit 350.

Meanwhile, the variable length decoder 310 decodes the codes supplied from the demultiplexer 300 and supplies the decoded codes to the inverse quantizer 320 where the codes are inversely quantized. The transform coefficient obtained by the inverse quantization is inversely transformed by the inverse orthogonal transform circuit 330, in accordance with an alpha map supplied through a line 90, and supplied to the adder 340. The adder 340 adds the signal subjected to the inverse orthogonal transform by the inverse orthogonal transform circuit 330 and the motion compensation prediction signal supplied from the motion compensation prediction circuit 350, thereby obtaining a reconstructed picture.

In the present invention, the coding apparatus encodes an alpha map while reducing the resolution of the map and multiplexes the obtained codes together with the reduction ratio information to form an alpha-map signal to be transmitted or stored. Accordingly, an alpha-map signal can be efficiently encoded and this allows efficient encoding of the shape information of an object.

Also, when decoding the alpha-map signal thus compression-encoded with a high efficiency, the decoding apparatus separates the signal into the alpha-map coded components and the reduction ratio information, decodes the alpha-map coded components, and enlarges the decoded signal to the original resolution in accordance with the reduction ratio information. Consequently, the alpha-map of the original size can be restored and this allows easy decoding of a coded picture using an alpha map.

The important parts in the present invention are the alpha-map encoder 200 in the coding apparatus and the alpha-map decoder 400 in the decoding apparatus, and the characteristic feature of the invention resides in that these circuits are given a function of reducing and enlarging the resolution at a desired magnification. Therefore, this function will be described in detail below.

That is, the main components of the present invention are the alpha-map encoder 200 and the alpha-map decoder 400. The rest of the arrangement can be accomplished by using the technique of a system of coding a picture with an arbitrary shape described in Japanese Patent Application No. 7-97073 already filed by the present inventors and so a detailed description thereof will be omitted.

A practical configuration of the alpha-map encoder 200 as one major element of the present invention will be described below with reference to FIGS. 4 to 6. A practical configuration of the alpha-map decoder 400 as another major element of the present invention will be described below with reference to FIGS. 7 and 8.

Figure 4:
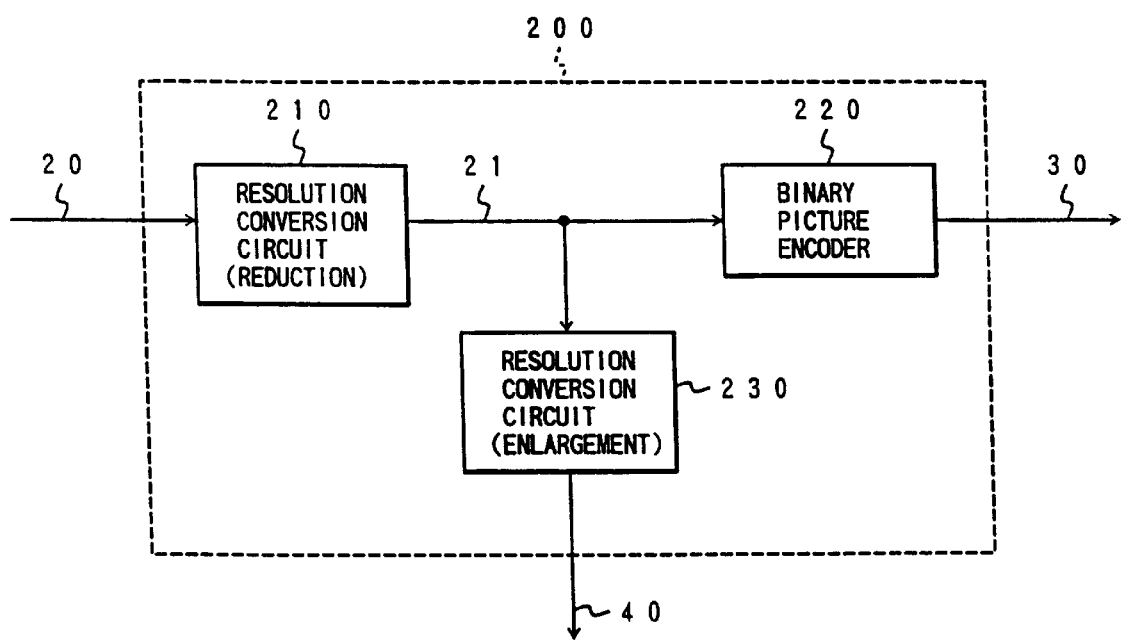
FIG. 4 is a block diagram showing the arrangement of a conventional alpha-map encoder.

FIG. 4 shows a method proposed in Japanese Patent Application No. 5-297133. In the alpha-map encoder 200, a resolution conversion circuit 210 as a means for converting the resolution reduces an alpha-map signal supplied through the line 20, thereby decreasing the number of samples to be encoded. The reduced signal is supplied to a binary picture encoder 220 through a line 21 and encoded by MMR or chain encoding. The encoded signal is supplied to the multiplexer 180 through the line 30.

The alpha-map signal reduced by the resolution conversion circuit 210 is also supplied to a resolution conversion circuit 230 through the line 21. The signal is enlarged to the number of samples of the original signal supplied to the alpha-map encoder 200 through the line 20. The enlarged signal is output through the line 40.

Figures 5A, 5B:
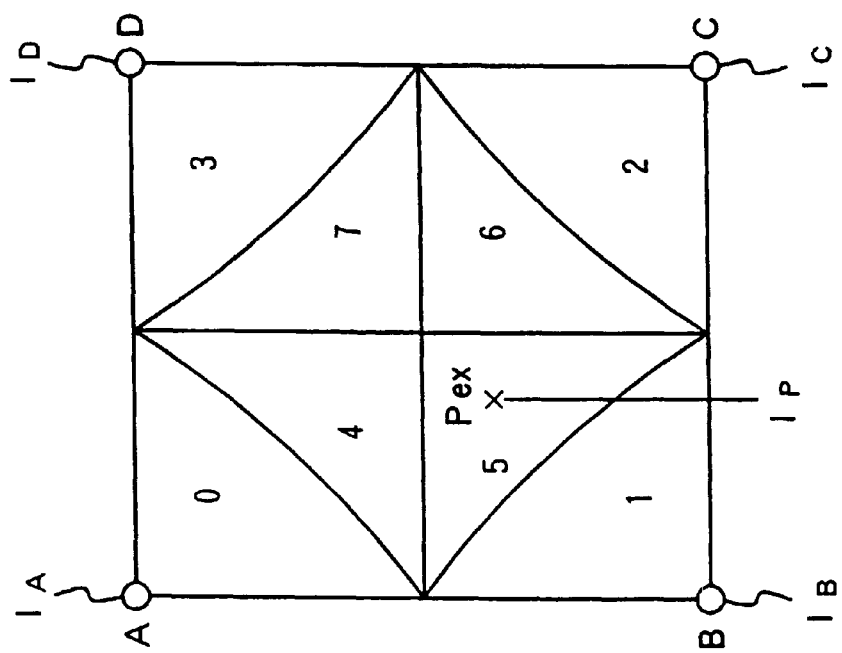
FIGS. 5A and 5B are views showing an example of a binary picture resolution conversion circuit.

FIGS. 5A and 5B illustrate an example of the reduction/enlargement conversion by the resolution conversion circuits 210 and 230. This conversion will be described below on the basis of literature, Ogami ed.,: "Image Processing Handbook", p. 630, Shokodo.

In FIG. 5A, Pex is a pixel position after the conversion and indicates a real-number pixel position as shown. Accordingly, an input signal is divided into eight regions on the basis of the distances of the signal to integral-number pixel positions A, B, C, and D, and a pixel value IP of Pex is calculated from pixel values IA to ID of A to D by using logical expressions shown in FIG. 5B.

The purpose of the invention shown in FIG. 4 is to reduce the amount of codes while permitting an error produced when an alpha map is reduced or enlarged. If the reduction/enlargement ratio is fixed, however, it is impossible to trade off the error of an alpha-map signal for the amount of codes.

Figure 6:
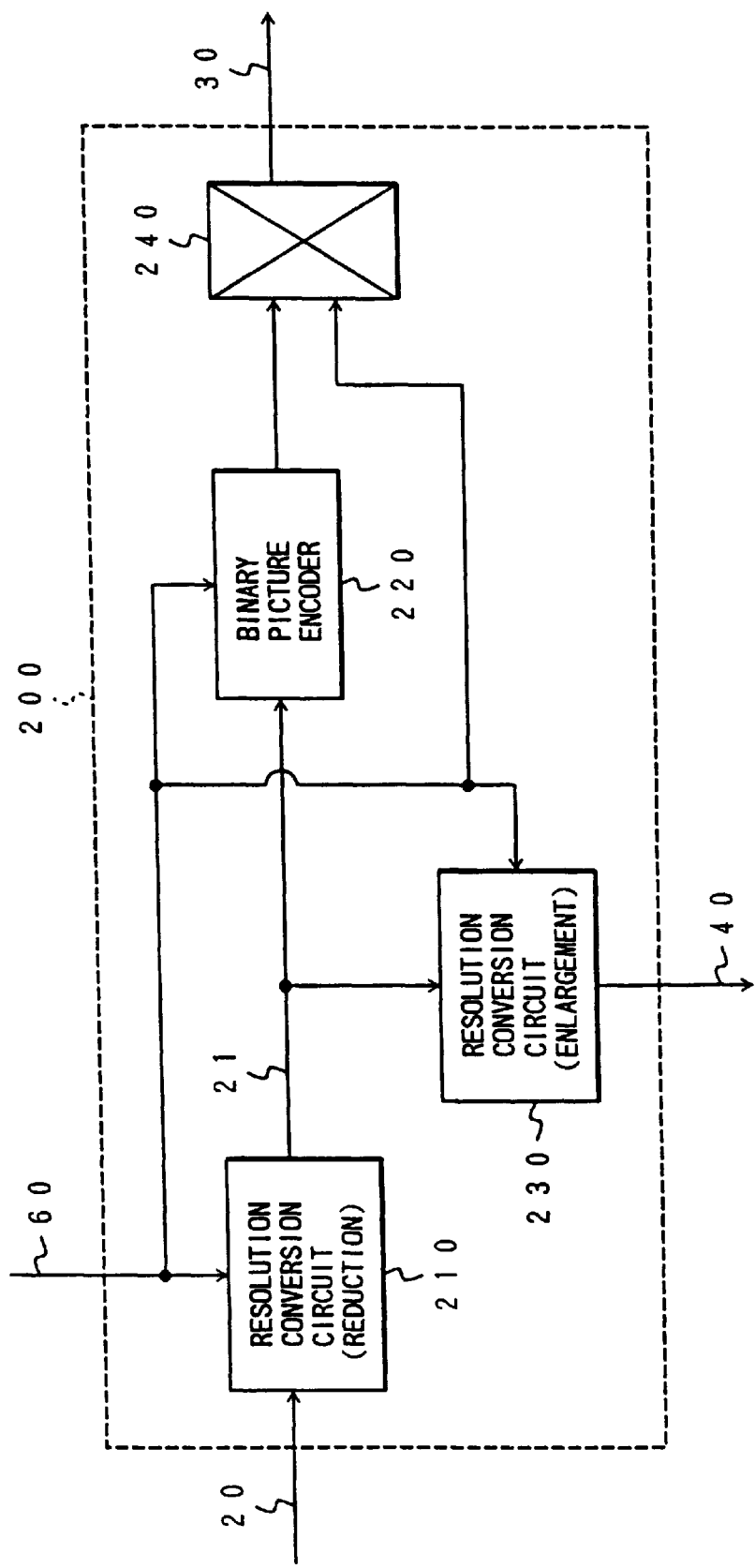
FIG. 6 is a view for explaining the present invention, which illustrates an encoder of the first embodiment of the present invention.

FIG. 6 shows the configuration of the alpha-map encoder 200 of the present invention. As shown in FIG. 6, the alpha-map encoder 200 of the present invention comprises resolution conversion circuits 210 and 230, a binary picture encoder 220, and a multiplexer 240.

The resolution conversion circuit 210 is a conversion circuit for resolution reduction conversion and encodes an alpha map at a reduction ratio corresponding to a given enlargement ratio. The resolution conversion circuit 230 is a conversion circuit for resolution enlargement conversion and encodes an alpha map at an enlargement ratio corresponding to the given enlargement ratio.

The resolution conversion circuit 230 returns the alpha map subjected to the resolution reduction conversion by the resolution conversion circuit 210 to the original size. The alpha map returned to its original size by this resolution conversion circuit 230 is supplied as an alpha-map local decoded signal to the orthogonal transform circuit 120 and the inverse orthogonal transform circuit 160 through the line 40.

The binary picture encoder 220 performs binary picture encoding for the alpha-map signal subjected to the resolution reduction conversion by the resolution conversion circuit 210 and outputs the encoded signal. The multiplexer 240 multiplexes the binary picture encoded output and information of the given enlargement ratio and outputs the multiplexed signal.

In the alpha-map encoder 200 with the above arrangement, the resolution conversion circuit 210 reduction-encodes an input alpha map through the line 20 at a designated enlargement ratio and outputs the encoded alpha-map signal through the line 30. The resolution conversion circuit 230 decodes the reduction-encoded alpha-map signal to the original resolution and outputs the obtained local decoded signal to the orthogonal transform circuit 120 and the inverse orthogonal transform circuit 160 through the line 40.

That is, the trade-off mentioned above can be accomplished by supplying setting information indicating a desired reduction/enlargement ratio to the alpha-map encoder 200 through a line 60. The reduction/enlargement ratio setting information signal supplied through the line 60 is supplied to the resolution conversion circuits 210 and 230 and the binary picture encoder 220. In this manner the amount of generated codes of an alpha-map signal can be controlled. Also, the multiplexer 240 multiplexes the reduction/enlargement ratio code (setting information signal) supplied through the line 60 and the encoded alpha-map signal and outputs the multiplexed signal to the line 30. This signal is supplied as the alpha-map coded signal to the multiplexer 180 as the final output stage of the video encoding apparatus.

Figure 7:
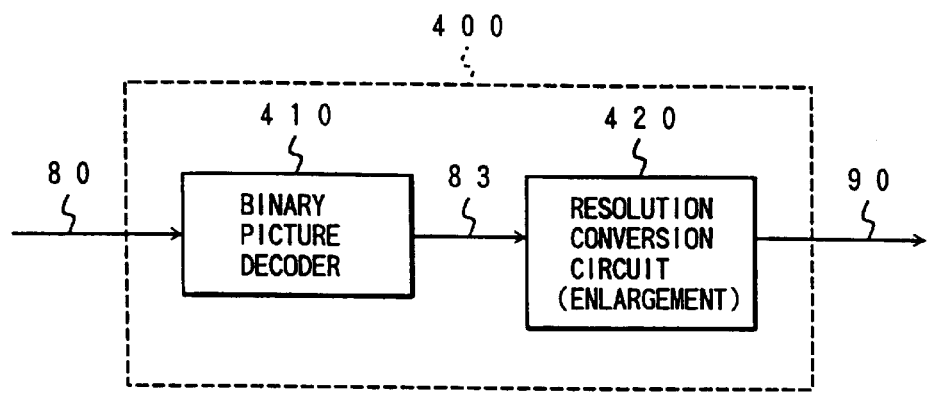
FIG. 7 is a view for explaining a conventional decoder.
Figure 8:
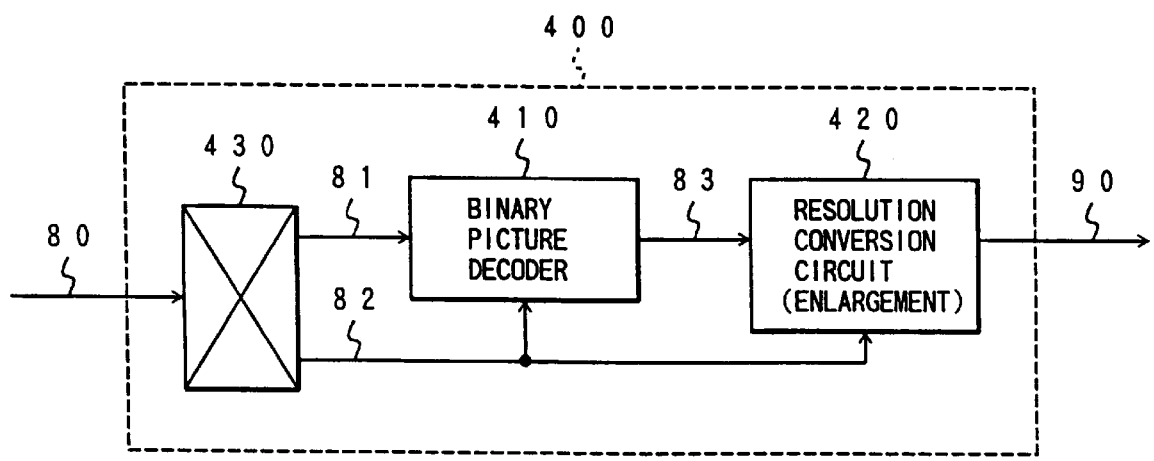
FIG. 8 is a view for explaining the present invention, which illustrates a decoder of the first embodiment of the present invention.

FIG. 7 shows the concept of an alpha-map decoder as a counterpart of the alpha-map encoder shown in FIG. 4. FIG. 8 shows a practical arrangement of the alpha-map encoder 400 of the present invention.

As shown in FIGS. 7 and 8, the alpha-map decoder 400 comprises a binary picture decoder 410, a resolution conversion circuit 420, and a demultiplexer 430. The demultiplexer 430 demultiplexes an input alpha-map signal, which is demultiplexed by the demultiplexer 300 of the video decoding apparatus, into codes of an alpha-map signal and codes of a reduction/enlargement ratio. The binary picture decoder 410 returns the alpha-map signal codes to the binary picture in accordance with the reduction/enlargement ratio codes demultiplexed by the demultiplexer 430. The resolution conversion circuit 420 performs resolution enlargement conversion for the binary picture in accordance with the reduction/enlargement ratio codes demultiplexed by the demultiplexer 430 and outputs the converted signal.

In FIG. 8, codes supplied to the alpha-map decoder 400 through a line 80 are separated into codes of an alpha-map signal and codes of a reduction/enlargement ratio by the demultiplexer 430. The alpha-map signal codes and the reduction/enlargement ratio codes are output through lines 81 and 82.

The binary picture decoder 410 reconstructs the reduced alpha-map signal from the alpha-map signal codes supplied through the line 81 and the reduction/enlargement ratio codes supplied through the line 82, and supplies the reconstructed signal to the resolution conversion circuit 420 through a line 83. The resolution conversion circuit 420 reproduces the alpha-map signal by enlarging the reduced alpha-map signal to the original size in accordance with the reduction/enlargement ratio codes supplied through the line 82, and outputs the reproduced signal through the line 90.

In the present invention, binary picture encoding is used as compression encoding performed for an alpha-map signal. Details of this binary picture encoding will be described as the second embodiment of the present invention with reference to FIGS. 9A to 10. This embodiment relates to the binary picture encoder 220 in the first embodiment.

FIG. 10 is a view showing the comparison of codes obtained by variable length encoding used in the present invention and codes obtained by well-known MMR encoding. That is, FIG. 10 compares MMR codes representing specific state information with variable length codes representing the same state information. For example, P indicates a pass mode which is "0001" in MMR encoding and "0000 001" in the present invention. V0, V1, V2, V3, V4, and V5 indicate vertical modes: V0 indicates the same position in a line below; V1, a shift of one pixel in a line below; V2, a shift of two pixels in a line below; V3, a shift of three pixels in a line blow; V4, a shift of four pixels in a line below; and V5, a shift of five pixels in a line below. V0, V1, V2, V3, V4, and V5 are represented by "1", "01S", "0000 1S", "0000 01S", no correspondence, no correspondence, respectively, in MMR encoding, and represented by "01", "1S", "001S", "0001 S", "0000 1S", "0000 01S", and "0000 001S", respectively, in the present invention. H indicates a horizontal node which is "001" in MMR encoding and "0000 1" in the present invention. The present invention additionally has an ESC code which is represented by "0000 00001". In FIG. 10, "S" in these codes is a sign bit indicating which of a1 and b1 is left or right.

FIGS. 9A to 9D are views for explaining two-dimensional encoding of a binary picture used in MMR encoding.

Figure 9A:
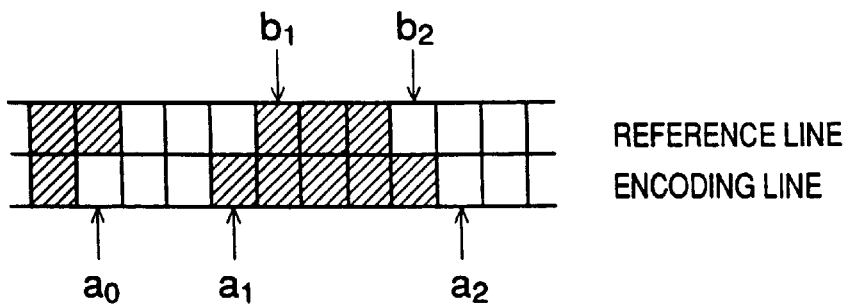
FIGS. 9A to 9D are views for explaining MMR two-dimensional coding.

The two-dimensional encoding in the second embodiment will be described by taking encoding of the positions of five changed pixels on a reference line and an encoding line, as shown in FIG. 9A, as an example. If the distance between a1 and b1 is three pixels or less, the distance is encoded in the vertical mode (V). In other cases, the horizontal mode (H) is used.

In FIGS. 9A to 9D, "a0" is a starting changed pixel on the encoding line, and "a1" is a first changed pixel on the right side of "a0" on the encoding line. "a2" is a changed pixel next to "a1" on the encoding line, and "b1" is a first changed pixel on the reference line on the right side of "a0" and having a color opposite to that of "a0". "b2" is a changed pixel next to "b1" on the reference line. In this example the procedure of MMR encoding is as follows.

Figure 9B:
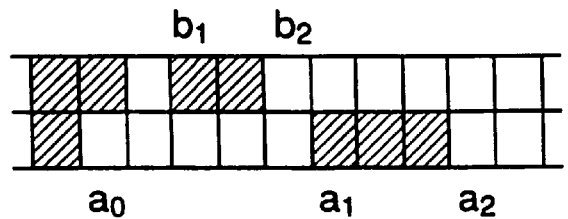

[1] As shown in FIG. 9B, if the changed pixel b2 on the reference line is on the left side of he first changed pixel a1 on the encoding line, the pass mode (P) which means a pass of pixels of one line is set, and the position of the starting changed pixel a0 on the encoding line is moved immediately below b2.

Figure 9C:
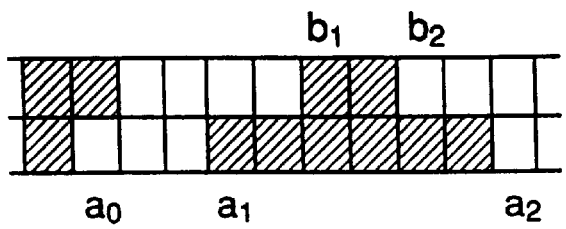

[2] If the positional relationship is as shown in FIG. 9C, the pass mode is not set because the changed pixel b2 is not on the left side of a1. In addition, since the distance between a1 and b1 is three pixels or less, the vertical mode (V) is set, the distance is encoded, and aO is moved to the position of a1.

Figure 9D:
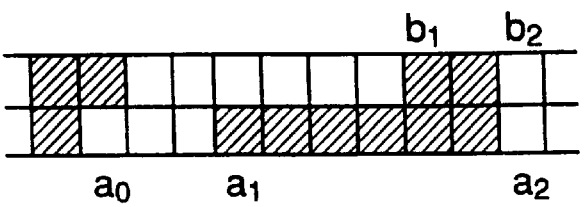

[3] In other cases as in FIG. 9D, the horizontal mode (H) is set, a length a0–a1 and a length a1–a2 are encoded, and a0 is moved to the position of a2.

Each of the above mode information is encoded by using the variable length codes shown in FIG. 10, and the run length in the horizontal mode is encoded by MH (Modified Huffman) (Television Society ed., "Image Information Compression", Ohmu K.K.) This is an example of encoding using MMR encoding.

In the method of this embodiment, on the other hand, if the distance between a1 and b1 is M (=integer) pixels or less in the relationship between the reference line and the encoding line shown in FIGS. 9A to 9D, the vertical mode (V) is set. If this distance between a1 and b1 is N (=integer: $M \geq N$) pixels or less, the distance is encoded by variable length encoding. If the distance is larger than N pixels, the distance is encoded by using an ESC code (escape code) and a fixed length code.

This fixed length code has $\log_2$ (M−N+1) bits if the value of (M−N +1) is a power of 2. FIG. 10 shows an example of variable length codes when N=5. Also, the number of pixels in the horizontal direction in a reduced picture of an alpha-map signal to be encoded by a binary picture encoder 220 is known. For example, if this number of pixels in the horizontal direction is "128", the maximum value of $\log_2$ (M−N+1) is 7 bits, and so the value of M can be changed by adding 3-bit additional information.

In MMR encoding, the run length is MH-encoded in the horizontal mode, and the run length frequency distribution varies in accordance with the number of pixels in the horizontal direction of an alpha-map signal. Accordingly, the run length can also be fixed-length-encoded in accordance with the number of pixels in the horizontal direction of an alpha-map signal (if the number of pixels in the horizontal line is "128", the run length is fixed-length-encoded by 7 bits).

Figure 28:
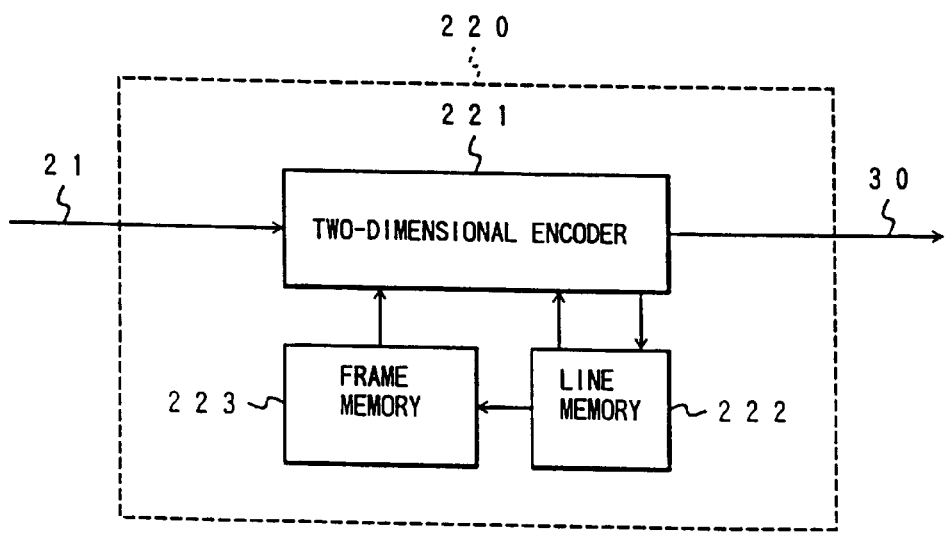
FIG. 28 is a view for explaining the present invention, which illustrates the second embodiment of the present invention.

If the correlation between frames is high in encoding of a motion picture, the binary picture encoder 220 is constituted by a two-dimensional encoder 221, a line memory 222, and a frame memory 223 as shown in FIG. 28. A picture in the preceding line is held in the line memory 222, and an alpha-map encoded in the preceding frame is stored in the frame memory 223. When the two-dimensional encoder 221 performs encoding by referring not only to the preceding line stored in the line memory 222 but also to lines in the preceding frame stored in the frame memory 223, the encoding efficiency is in some instances raised.

Also, a reference line in the preceding frame can be motion-compensated by using motion vectors used in the motion compensation prediction circuits 110 and 350 shown in FIGS. 2 and 3.

In the method of this embodiment as described above, in the relationship between the reference line and the encoding line shown in FIGS. 9A to 9D, if the distance between a1 and b1 is M (=integer) pixels or less, the distance is encoded in the vertical mode (V). If this distance between a1 and b1 is N (=integer: M≧N) pixels or less, the distance is encoded by using a variable length code. If the distance is larger than N pixels, the distance is encoded by using an ESC code (escape code) and a fixed length code. Consequently, encoding can be performed at a higher compression ratio than when MMR encoding is used.

Another example by which compression encoding can be performed at a higher efficiency will be described below.

Figure 11:
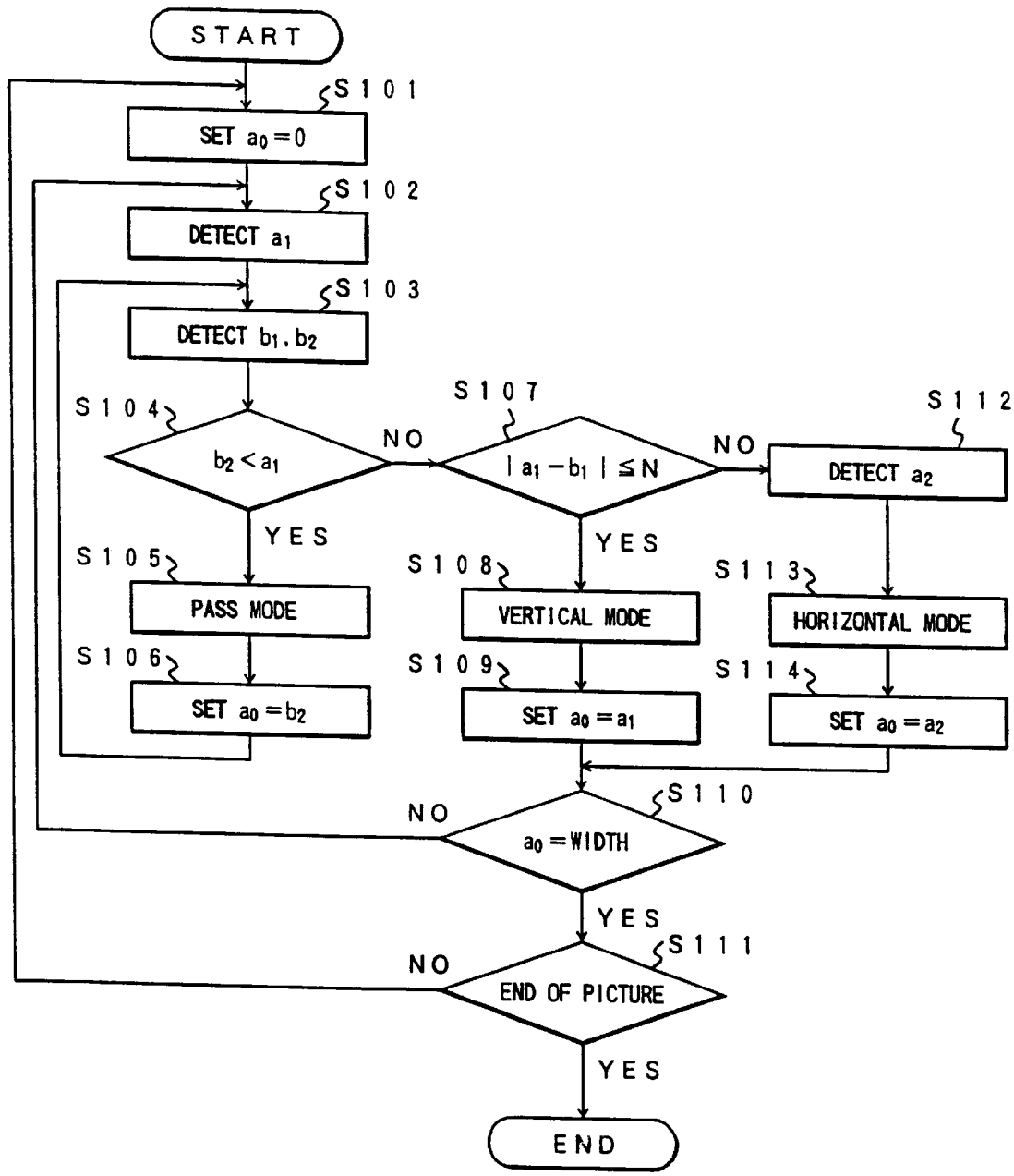
FIG. 11 is a flow chart for explaining an MMR coding procedure.

FIG. 11 is a flow chart showing the procedure of well-known MMR encoding as a binary picture encoding method. That is, the pixel position information of the starting changed pixel a0 on the encoding line is initialized (S101). The first changed pixel a1 to the right of the position of a0 on the encoding line is detected (S102). The first changed pixel b1 on the reference line on the right side of the position "a0" and having a color opposite to that of a pixel in the position "a0" is detected and the changed pixel b2 next to the position "b1" on the reference line is detected (S103). Whether the pixel positional relationship between b2 and a1 is b2<a1 is checked (S104). If b2<a1, the pass mode (P) is set, the pixel position information of a0 is set to the pixel position information of b2 (S105 and S106), and the flow returns to the processing in step S103.

If it is determined in step S104 that b2<a1 does not hold, whether |a1−b1|≦N (N is a certain threshold) is checked (S107). If |a1−b1|≦N, the vertical mode (V) is set, the pixel position of a0 is moved to the pixel position of a1 (S108 and S109), and the flow advances to processing in step S110. In step S110, whether a0 is a position corresponding to "WIDTH" (the number of pixels in the direction of width of a picture) is checked. If NO in step S110, the flow returns to the processing in step S102. If it is determined in step S110 that a0 is the position corresponding to "WIDTH", whether the end of the picture is reached is checked (S111). If the end of the picture is not reached, the flow returns to the processing in step S101. If it is determined in step S111 that the end of the picture is reached, the processing is completed.

If it is determined in step S107 that |a1−b1|≦N does not hold, a2 is detected (S112), the horizontal mode (H) is set, the pixel position of "a0" is set to the pixel position of "a2" (S113 and S114), and the flow advances to the processing in step S110. In step S110, whether "a0" is "WIDTH" is checked. If NO in step S110, the flow returns to the processing in step S102.

As shown in FIG. 12A, "WIDTH" is the number of pixels in one horizontal line in one frame (the number of pixels in one raster scan line). That is, the processing of MMR encoding progresses in units of lines; the encoding is performed by executing encoding processing for each raster scan line.

As in FIG. 12A, an alpha-map signal to which the encoding processing of the present invention is applied, i.e., a binary picture for distinguishing between the object and the background, is in most cases a simple figure in which the number of changing points in each raster scan line is at most 2. When encoding is performed for each raster scan line as in the case of MMR encoding shown in FIG. 11, although changed pixels to be encoded are only those in the boundary between the object and the background, the pixel in the right end of the frame must also be encoded as a changed pixel. Accordingly, the method is inefficient in respect of the amount of compressed codes.

In the method of the present invention herein explained, therefore, "a1" or "b1" is detected in raster scan order, as shown in FIGS. 13A to 13D, rather than in a line. Consequently, only changed pixels in the boundary can be encoded. When encoding is performed in units of lines as in MMR encoding, "a1" or "b1" is an address from the left end of the corresponding line. In the method of the present invention, however, encoding is performed by detecting "a1" or "b1" in raster scan order. Accordingly, "a1" and "b1" are defined as follows.

Figure 13A:
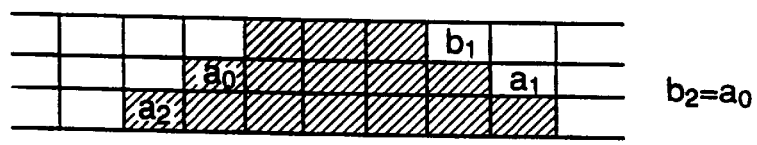
FIGS. 13A to 13D are views for explaining the present invention, which illustrate a procedure of encoding in raster order according to the method of the present invention.
Figure 13B:
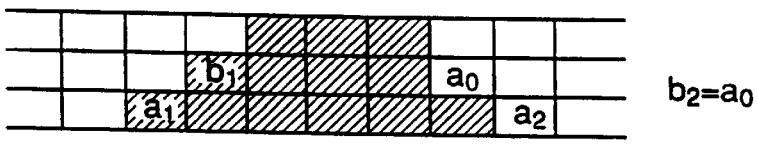
Figure 13C:
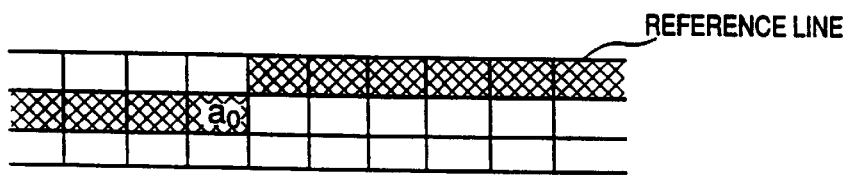
Figure 13D:
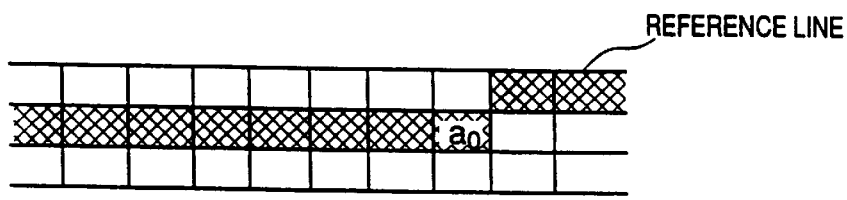
Figure 14A:
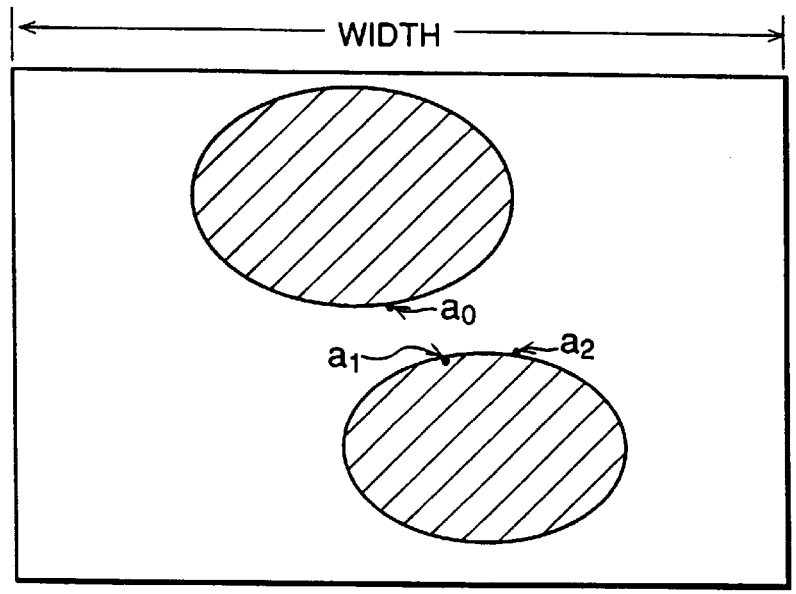
FIGS. 14A and 14B are views for explaining the present invention, which illustrate an example requiring a vertical pass mode of the method of the present invention.
Figure 14B:
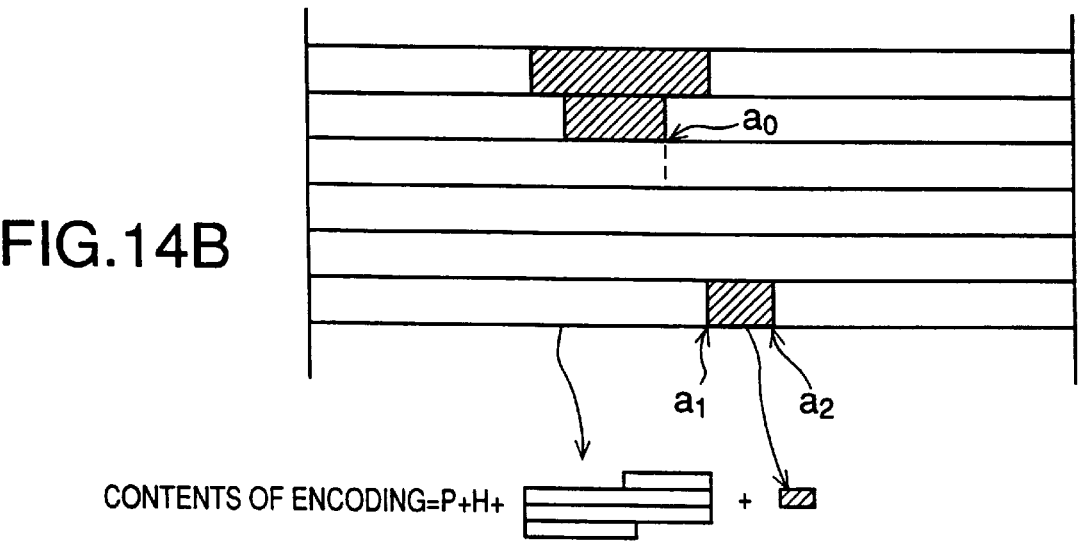

$a_1 = abs\_a_1 - (int)(abs\_a_0/WIDTH)*WIDTH$ $B_1 = abs\_B_1 - ((int)(abs\_a_0/WIDTH)-1)*WIDTH$ In the above equations, abs_a1(abs_b1,abs_a0) is an address in raster order from the upper left corner of the frame. "*" means multiplication, and "(int)(x)" means rounding off the digits after the decimal point of x. As represented by the crosshatched regions in FIGS. 13C and 13D, the reference line is a region of the number of pixels corresponding to "WIDTH" starting from a pixel in the position a0. FIG. 13C shows the reference line of FIG. 13A, and FIG. 13D shows the reference line of FIG. 13B. In the method of the present invention, therefore, encoding is performed as shown in FIGS. 14A and 14B by using the pass mode code P, the horizontal mode code H, and run length codes of white and black pixels. P is the pass mode code contained in a two-dimensional encoding table. H is the horizontal mode code also contained in the two-dimensional encoding table. The white arid hatched rectangles following these codes represent run length codes of white and black pixels. However, if encoding is performed in raster order as described above for a picture shown in FIG. 14A, a run length exceeding the number (WIDTH) of constituent pixels in the horizontal line of the picture is generated as shown in FIG. 14B, since there is no changed pixel over a plurality of lines in the picture. In the method of the present invention, therefore, to avoid this inconvenience, the vertical pass mode code V is additionally prepared as a code for passing lines in the vertical direction.

If the maximum run length exceeds the constituent pixel number WIDTH in the horizontal direction of a picture, the vertical pass mode (V) is applied. The vertical pass mode code V designates a pass of lines in the vertical direction. Therefore, even when the run length is larger than a value equivalent to "WIDTH", the run length cannot be expressed if it appears in the next line. To avoid this event, an escape code from the horizontal mode (run Length encoding) is prepared. In this vertical pass mode, the maximum value of a run length used in the horizontal mode is the pixel number WIDTH in the horizontal direction. If a run length has a value equivalent to WIDTH, an escape code from the horizontal mode (run length encoding) is used as a code representing the run length.

Figure 15A:
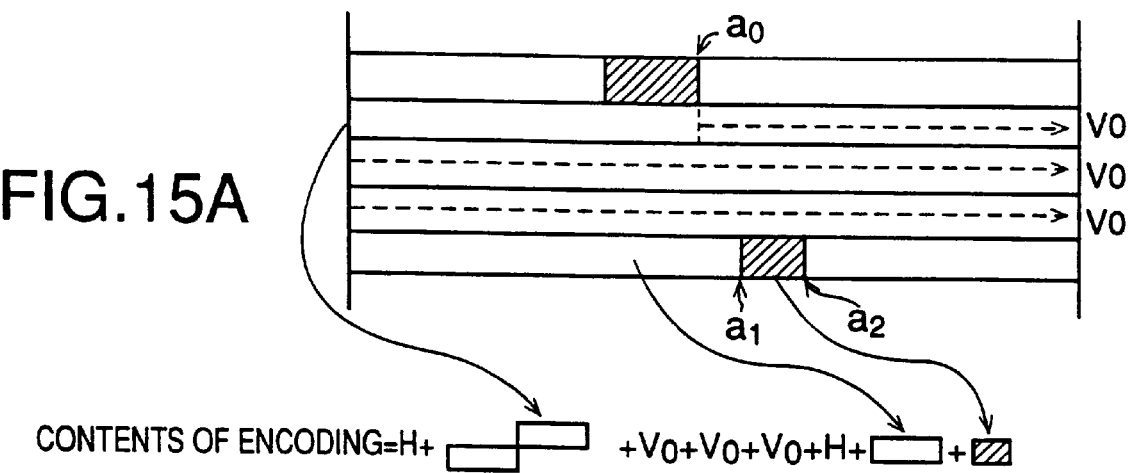
FIGS. 15A to 15C are views for explaining the present invention, which illustrate the first example of the vertical pass mode.
Figure 15B:
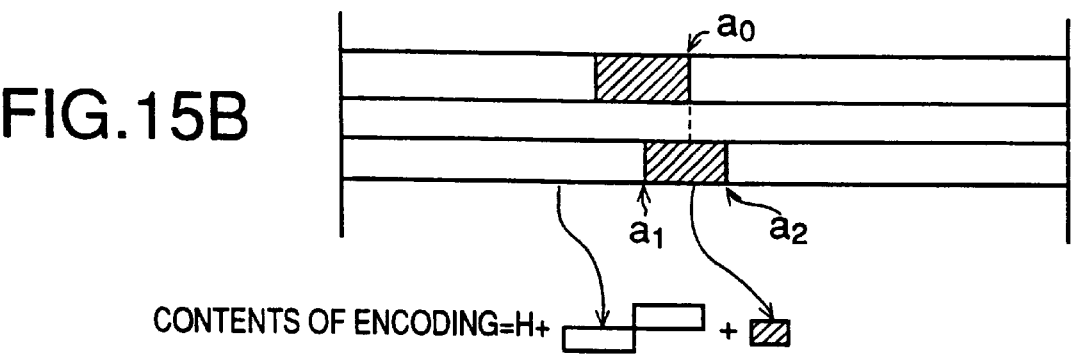
Figure 15C:
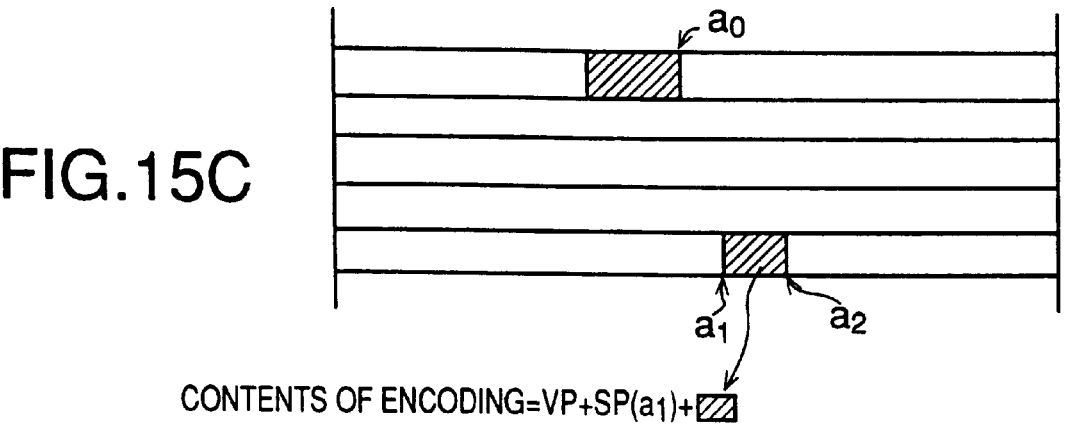

FIGS. 15A to 15C illustrate examples of the vertical pass mode. In an example shown in FIG. 15A, the vertical pass mode is formed by using an escape code from run length encoding and a vertical mode code. In a case like that shown in FIG. 15B in which a1 appears in a line which jumps a whole line from the line of a0, the length of a white run can be expressed by using the pass mode even if the run length is larger than the constituent pixel number WIDTH in the horizontal direction of a picture. Therefore, no encoding needs to be performed in the vertical pass mode. In an example shown in FIG. 15C, a1 appears in a line skipping whole three lines from the line of a0. If this is the case, a code (VP) of the vertical pass mode for designating a jump (i.e., a pass) of the corresponding number of lines is prepared in a variable length code table, and encoding is performed by using this vertical pass mode code VP. That is, the number of lines to be passed is expressed in the vertical mode, and information represented by this code VP is equivalent to "horizontal mode (H)+maximum run length". Note that as shown in FIG. 15C, instead of. expressing the number of lines to be passed in the vertical mode, the address (SP(a1)) of the next changed pixel can be encoded.

Figure 16A:
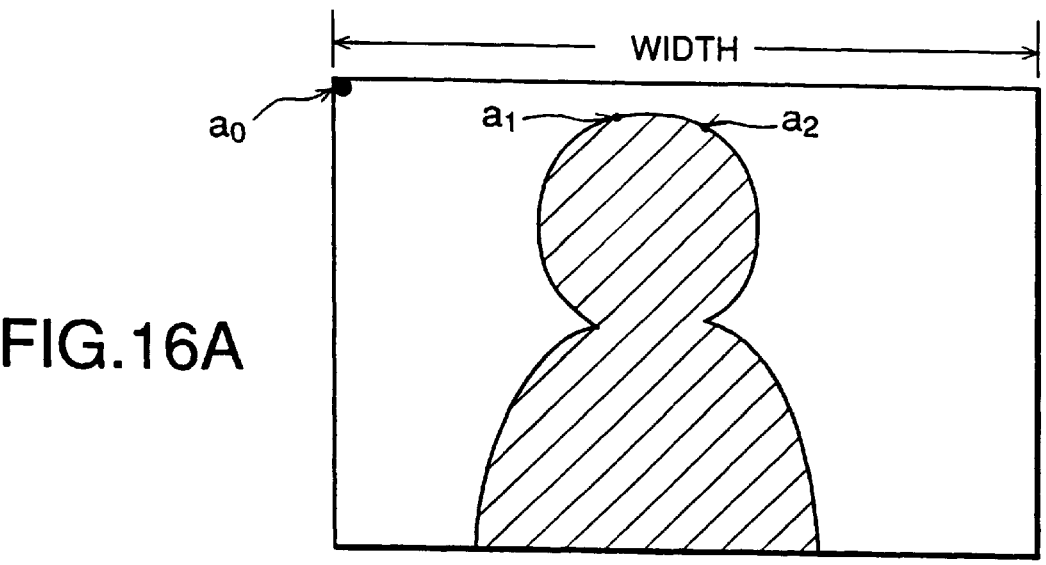
FIGS. 16A to 16C are views for explaining the present invention, which illustrate the second example of the vertical pass mode.
Figure 16B:
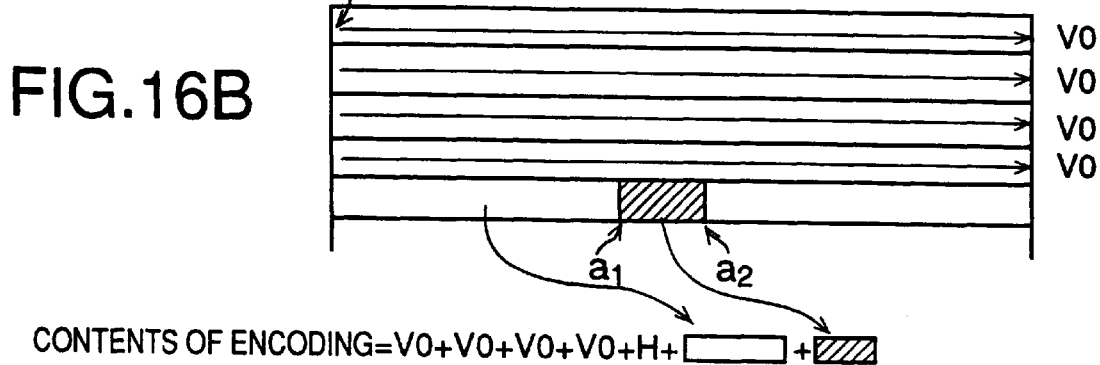
Figure 16C:
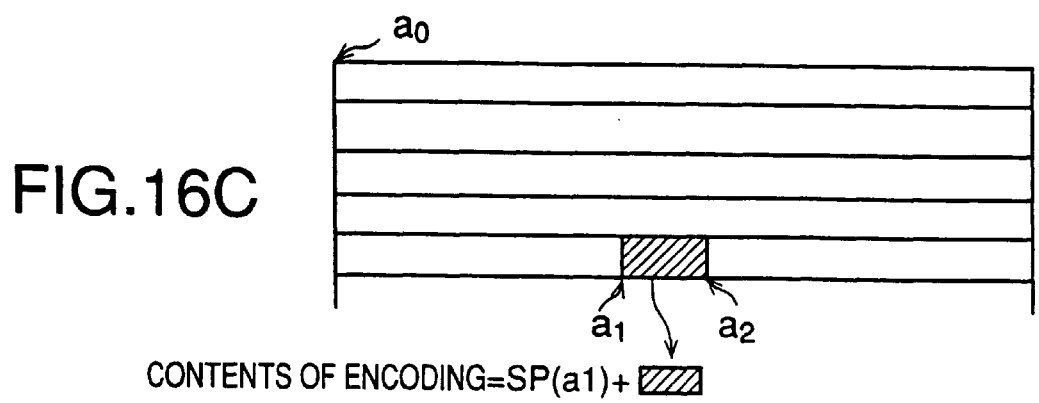

In an alpha-map signal to which the encoding method of the present invention is applied, i.e., a binary picture for distinguishing between the object and the background, no changed pixels are in many instances present in the first several lines as shown in FIG. 16A. Since the vertical pass mode VP can be used in the present invention, for the picture as shown in FIG. 16A the vertical pass mode is applied from the leading position of a frame as shown in FIG. 16B or 16C. Consequently, the amount of codes can be reduced. In an example shown in FIG. 16B, the number of lines to be passed is expressed by using a vertical mode code V0. In this example, four vertical mode codes V0 are arranged because the number of lines to be passed is 4. A line in which a1 appears is represented by "H+white run length" by using a white run length from the leading position of the line to a1 and the horizontal mode code H. In addition, the line is expressed in the form of "V0"+"V0"+"V0"+"V0"+"H"+ "run length code indicating the number of white pixels"+ "run length code indicating the number of black pixels" by arranging black pixels between a1 and a2.

In an example shown in FIG. 16C, the address (SP(a1)) of the first changed pixel in the frame is encoded. A line is expressed in the form of "SP(a1)+run length code indicating the number of black pixels". Therefore, high-efficiency compression encoding can be performed by applying this method to encoding of an alpha-map signal.

In the above examples, (a1–a0) and (a2–a1) are run-length-encoded in the horizontal mode. This merely succeeds the expression method in the horizontal mode of MMR. Therefore, the present invention proposes an encoding system in which if only (a1–a0) can be run-length-encoded in the horizontal mode and a2 can be encoded in another mode (e.g., the vertical mode), this a2 is encoded in another method.

Figure 17:
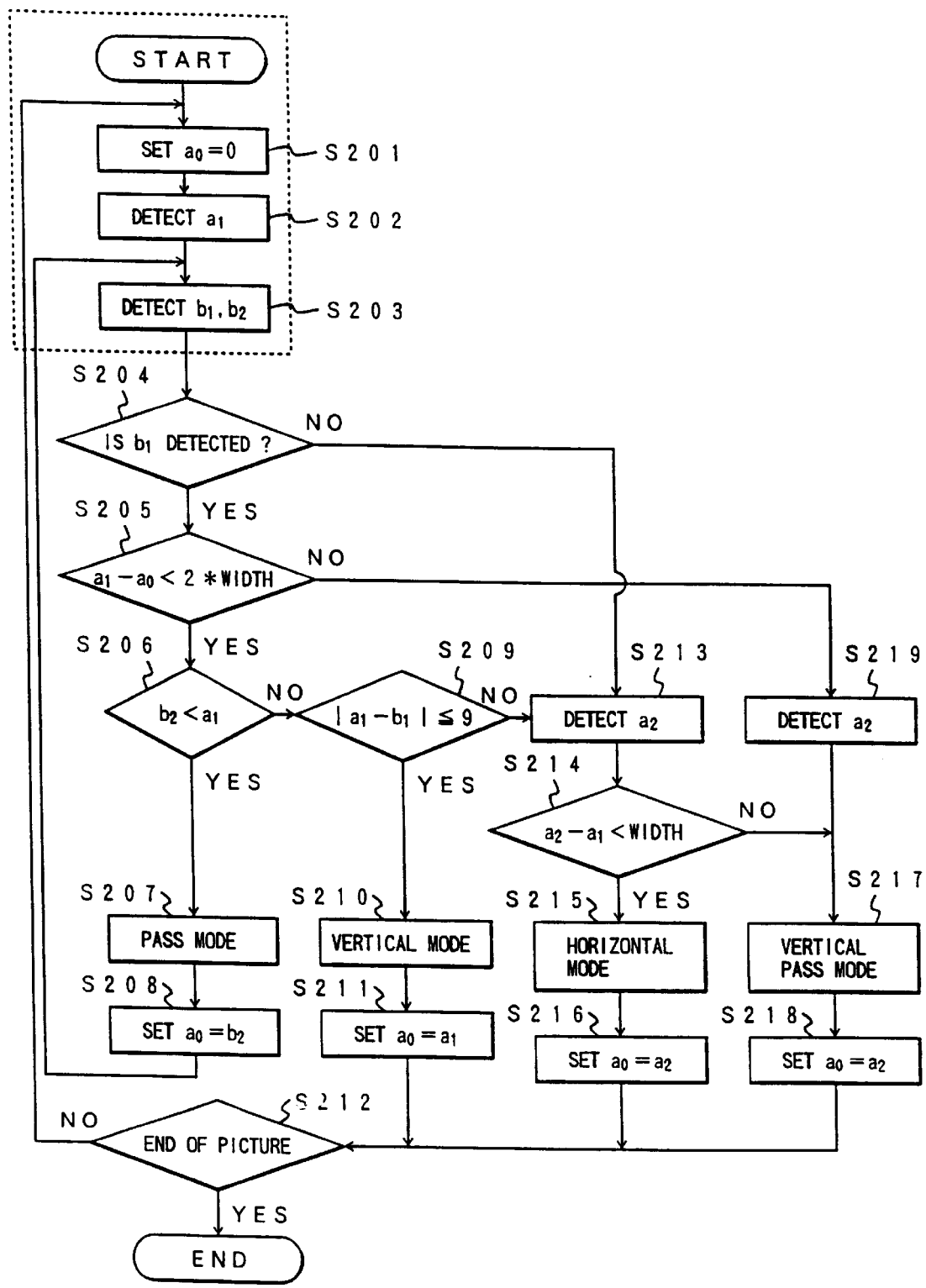
FIG. 17 is a view for explaining the present invention, which is a flow chart for explaining a coding procedure when encoding is performed in raster order.

FIG. 17 is a flow chart for explaining an encoding procedure when this system is applied. In this processing, the pixel position information of the starting changed pixel a0 on the encoding line is initialized (S201). The first changed pixel a1 to the right of the position "a0" on the encoding line is detected (S202). The first changed pixel b1 on the reference line on the right side of the position "a0" and having a color opposite to that of a pixel in the position "a0" is detected and the changed pixel b2 appearing next to the position "b1" on the reference line is detected (S203). Whether b1 is detected is checked (S204). If b1 is detected, whether the number of pixels between a0 and a1 is smaller than 2*WIDTH is checked (S205). If the number of pixels is smaller than 2*WIDTH, whether b2<a1 is checked (S206). If b2<a1, the pass mode (P) is set, the pixel position information of a0 is set to the pixel position information of b2 (S207 and S208), and the flow returns to the processing in step S203.

On the other hand, if it is determined in step S206 that b2<a1 does not hold, whether |a1–b1|≦9 is checked (S209). If |a1–b1|≦9, the vertical mode (V) is set, the pixel position of a0 is set to the pixel position of a1 (S210 and S211), and the flow advances to processing in step S212. In step S212, whether the end of the picture is reached is checked. If the end of the picture is reached, the processing is completed. If the end of the picture is not reached, the flow returns to the processing in step S202.

If it is determined in step S209 that |a1–b1|≦9 does not hold, a2 is detected, and whether the number of pixels between a1 and a2 is smaller than the horizontal constituent pixel number "WIDTH" of the picture is checked (S214). If YES in step S214, the vertical mode is set (S215), a0 is set to a2 (S216), and the flow advances to the determination processing in step S212.

If it is determined in step S214 that the number of pixels between a1 and a2 is not smaller than the horizontal constituent pixel number "WIDTH" of the picture, the vertical pass mode is set (S217), a0 is set to a2 (S218), and the flow advances to the determination processing in step S212.

If it is determined in step S205 that the number of pixels between a0 and a1 is not smaller than 2*WIDTH, a2 is detected (S219), the vertical pass mode is set (S217), and a0 is set to a2 (S218). Thereafter, the flow advances to the determination processing in step S212. Consequently, an encoding system is realized in which if only (a1–a0) can be run-length-encoded in the horizontal mode and a2 can be encoded in another mode (e.g., the vertical mode), this a2 is encoded in another mode.

A practical example in which lines in a preceding frame are used as reference lines and the encoding processing efficiency is improved by using the correlation between frames will be described below.

Figure 18:
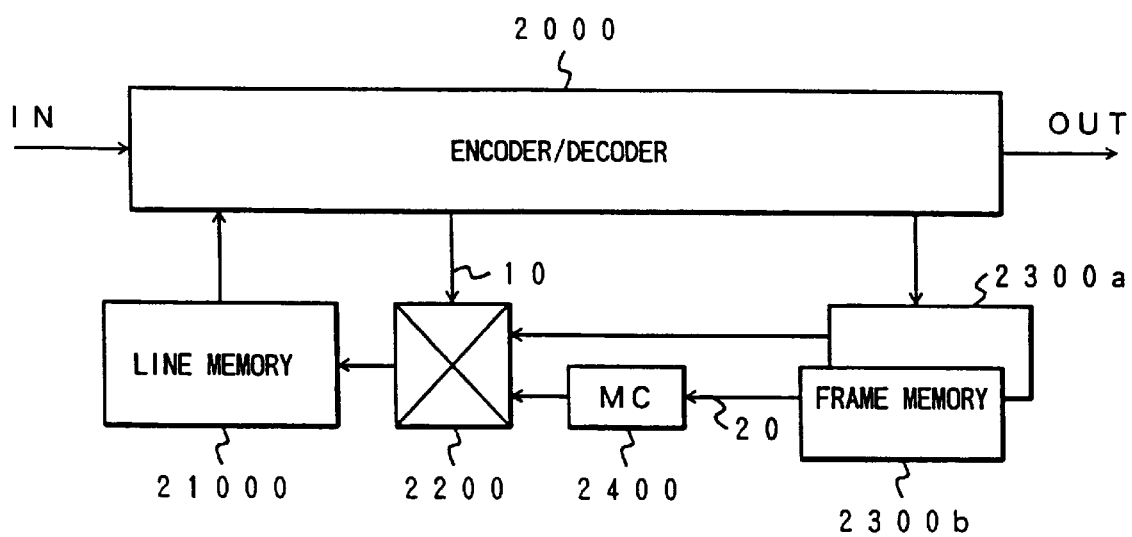
FIG. 18 is a view for explaining the present invention, which is a block diagram of a coding/decoding apparatus using an interframe reference line.

FIG. 18 is a block diagram of a coding/decoding apparatus according to the present invention. In FIG. 18, an encoder/decoder 2000 outputs coded picture data and decodes and outputs input coded picture data. A line memory 2100 holds picture information in units of lines each corresponding to one raster scan. That is, the line memory 2100 holds picture information of intraframe reference lines and picture information of interframe reference lines. Reference numeral 2200 denotes a selector; 2300a and 2300b, frame memories for holding frame pictures; and 2400, a motion compensation prediction circuit.

The frame memories 2300a and 2300b hold picture data of the current frames. The motion compensation prediction circuit 2400 performs motion compensation prediction for the picture data from the frame memory 2300b and outputs the picture data subjected to the motion compensation prediction.

In accordance with an output mode switch signal from the encoder/decoder 2000, the selector 2200 selects one of the output picture data from the motion compensation prediction circuit 2400 and the picture data from the frame memory 2300a and outputs the selected data to the line memory 2100. The line memory 2100 holds the picture data obtained via the selector 2200 in units of lines and transfers the data to the encoder/decoder 2000. The encoder/decoder 2000 encodes or decodes this picture data in units of lines.

In this system with the above arrangement, the encoder/decoder 2000 encodes input picture information in raster scan order while referring to the contents of the line memory 2100 and outputs the encoded information from an output OUT. Also, the encoder/decoder 2100 decodes coded information and stores the decoded information in the frame memories 2300a and 2300b. The decoded picture information in the frame memories 2300a and 2300b is read out to the selector 2200 or to the motion compensation prediction circuit 2400 where the information is subjected to motion compensation prediction and then supplied to the selector 2200.

Inputs to the selector 2200 are switched in accordance with a mode switch signal (intraframe/interframe) supplied from the encoder/decoder 2000 through a line 10. The picture information is supplied from the frame memories 2300a and 2300b to the line memory 2100 via the selector 2200. Consequently, the line memory 2100 sequentially stores intraframe reference lines or interframe reference lines selectively input in accordance with the mode switch signal (intraframe/interframe).

The frame memories 2300a and 2300b store the decoded pixel values of a frame of interest and the pixel values of a decoded reference frame obtained by encoding/decoding processing by the encoder/decoder 2000. Note that the motion-compensated signal obtained by the motion compensation prediction circuit 2400 can also be used as the interframe reference line.

Crosshatched portions in FIGS. 19A and 19B indicate examples of intraframe and interframe reference lines when encoding is performed in raster order. FIG. 19A shows an intraframe reference line which will be referred to as "ABOVE LINE" hereinafter. FIG. 19B shows an interframe reference line which is set as illustrated with respect to the same a0 as in a reference frame or an address a0 after motion compensation. This interframe reference line will be referred to as "PREVIOUS LINE" hereinafter.

Mode information for switching reference lines is separately encoded in units of block lines consisting of a plurality of lines by the encoder/decoder 2000.

Figure 20:
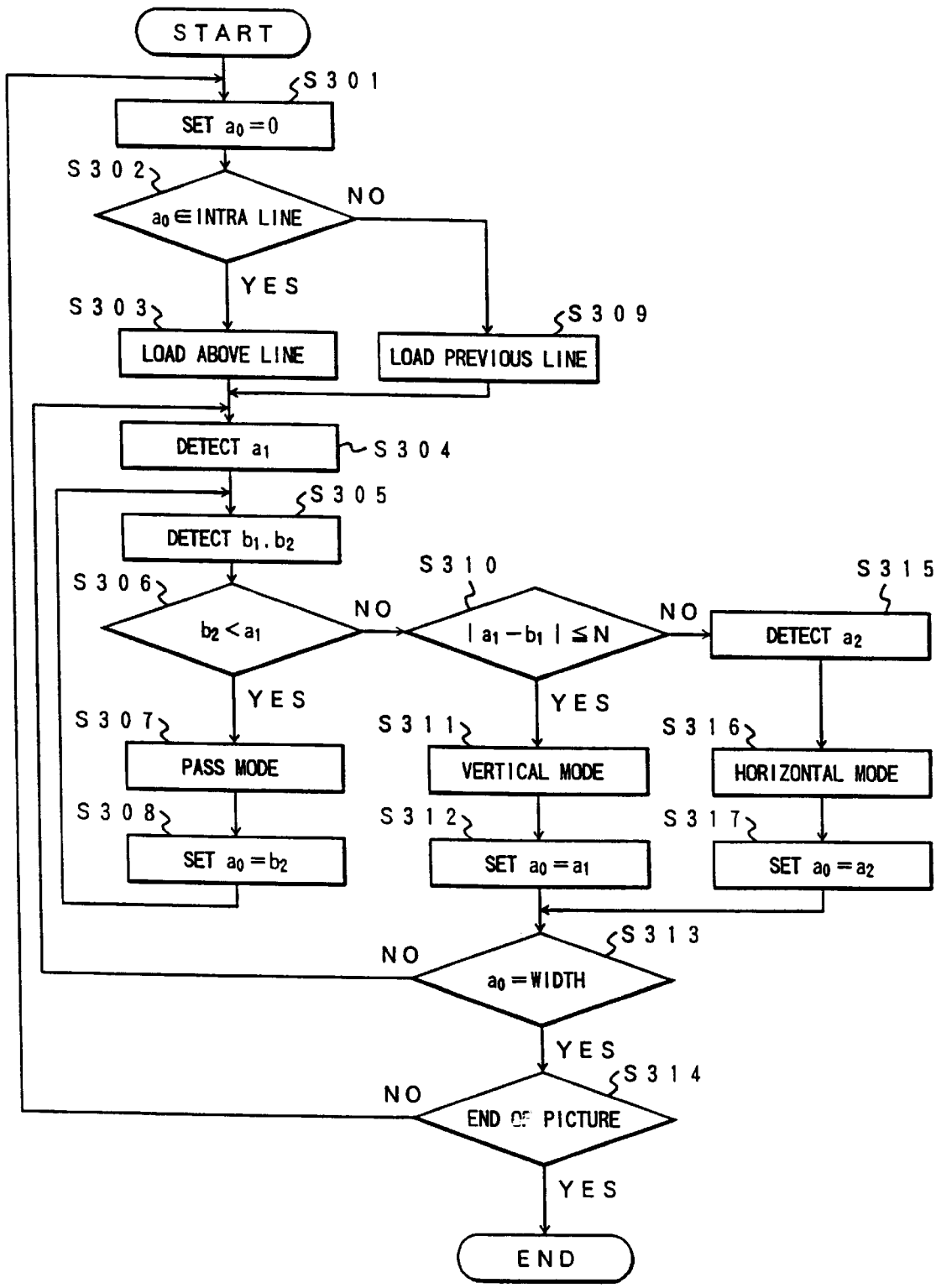
FIG. 20 is a view for explaining the present invention, which is a flow chart for explaining a coding procedure using an interframe reference line.

FIG. 20 is a flow chart showing the encoding procedure of this embodiment. The encoder/decoder 2000 first initializes the pixel position information of the starting changed pixel a0 on the encoding line (S301) and then checks whether the mode of the line to which the starting pixel a0 belongs is an intraframe mode (INTRA) (S302). If the mode is the intraframe mode (INTRA), "ABOVE LINE" is read into the line memory 2100 (S302). If the mode is not the intraframe mode (INTRA), "PREVIOUS LINE" is read into the line memory 2100 in FIG. 18 (S309).

Subsequently, the encoder/decoder 2000 detects a1 (S304), detects b1 and b2 (S305), and checks whether the pixel positional relationship between b2 and a1 is b2>a1 (S306). If b2<a1, the encoder/decoder 2000 sets the pass mode (P) and sets the pixel position information of a0 to the pixel position information of b2 (S307 and S308), and the flow returns to the processing in step S304.

If it is determined in step S306 that the pixel positional relationship between b2 and a1 is not b2<a1, the encoder/decoder 2000 checks whether $|a1-b1| \leq N$ (N is a certain threshold) (S310). If $|a1-b1| \leq N$, the encoder/decoder 2000 sets the vertical mode (V) and sets the pixel position of a0 in the pixel position of a1 (S311 and S312), and the flow advances to processing in step S313. In step S313, the encoder/decoder 2000 checks whether a0 is a position corresponding to "WIDTH" (the number of pixels in the direction of width of a picture). If NO in step S313, the flow returns to the processing in step S304. If it is determined in step S313 that a0 is a position corresponding to "WIDTH", the encoder/decoder 2000 checks whether the end of the picture is reached (S314). If the end of the picture is not reached, the flow returns to the processing in step S301. If it is determined in step S314 that the end of the picture is reached, the encoder/decoder 2000 completes the processing.

If it is determined in step S310 that $|a1-b1| \leq N$ does not hold, the encoder/decoder 2000 detects a2 (S315), sets the horizontal mode (H), and sets the pixel position of "a0" to the pixel position of "a2" (S316 and S317). Thereafter, the flow advances to the processing in step S313.

That is, in the above procedure, if the mode of the line to which the starting pixel a0 belongs is the intraframe mode (INTRA), "ABOVE LINE" is read into the line memory 2100 shown in FIG. 18. If the mode is an interframe mode (INTER), "PREVIOUS LINE" is read into the line memory 2100. If "PREVIOUS LINE" as the reference line is exactly the same as the encoding line or the error between the lines is very small, "NOT CODED" is performed, i.e., the signal of the reference line is directly copied without encoding the encoding line. Since the signal of the reference line is directly copied without encoding the encoding line if "PREVIOUS LINE" as the reference line is exactly the same as the encoding line or the error between the lines is very small, the amount of generated codes can be reduced.

Figure 21:
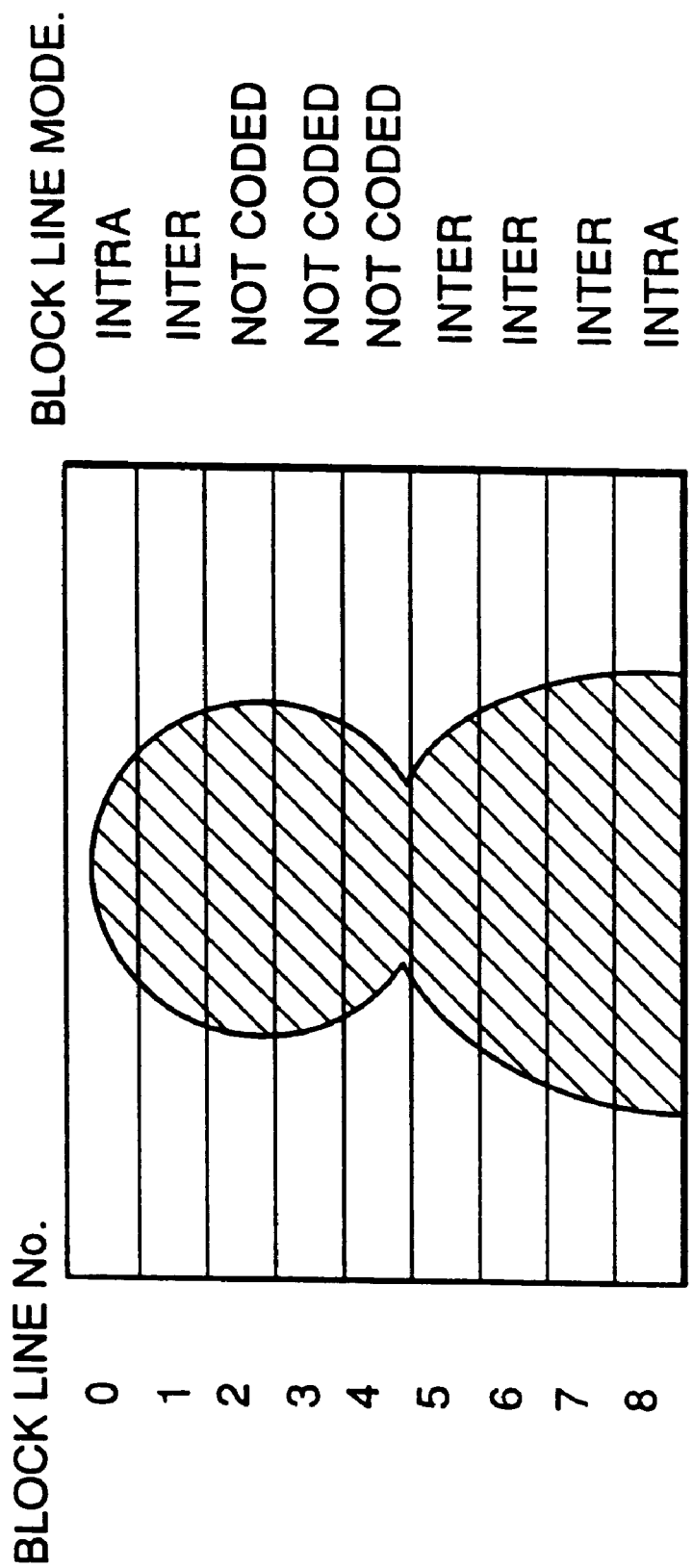
FIG. 21 is a view for explaining the present invention, which illustrates switching between coding modes of the present invention.

FIG. 21 shows an example of mode switching performed in units of block lines for an alpha map of an image of a person when the above system is used. A block line indicates a block constituted by a plurality of adjacent lines. Block lines 0 and 1 occupied by a portion corresponding to the top of the head and its vicinity are in the "INTRA" line mode. Block lines 2 to 4 occupied by a portion corresponding to the face are in the "NOT CODED" line mode since the differences between the lines are small. Block lines 5 to 8 occupied by a portion corresponding to the shoulders and the chest and their vicinities are in the "INTRA" line mode.

Figure 22:
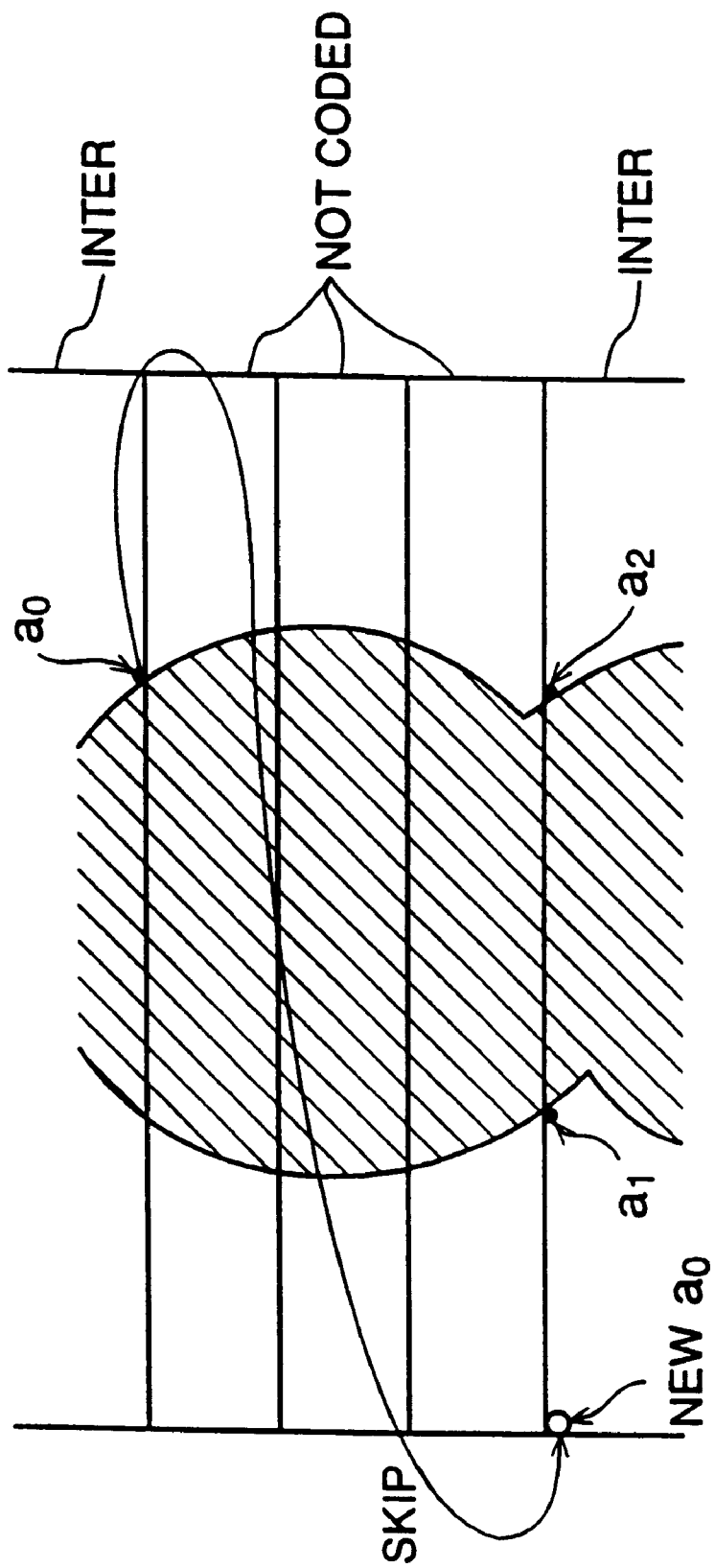
FIG. 22 is a view for explaining the present invention, which illustrates block line skip of the present invention.

FIG. 22 explains a practical example in which encoding of block lines in the "NOT CODED" made is skipped when encoding is performed in raster order.

In the present invention, mode switching is performed in accordance with the attribute ("INTRA"/"INTER"/"NOT CODED") of a line to which the starting pixel a0 belongs. However, a1 does not necessarily exist on the same line as a0 when encoding is performed in raster order. Accordingly, whether a1 is on the same line as a0 in decoding is unknown.

As shown in FIG. 22, therefore, when a0 is the last changed pixel on the block line of interest and the mode of the next block line is the "NOT CODED" (no encoding), the processing skips to the next block line in a "CODED" (encoding) mode by using a skip code SK. The first pixel on the block line to which the processing skipped is set as new a0, and all regions in this block line are encoded. Assume that a0 is present on a block line B1, the mode of the block line B1 is "INTER", three block lines B2 to B4 in the "NOT CODED" mode follow the block line B1, and a block line B5 in the "INTER" mode follows the block line B4. In this case a0 is moved as new a0 to the leading position of the block line B5, and the processing skips from a0 to new a0 by using the code SK, thereby setting all of the block lines B1 to B4 in the "CODED" mode, i.e., encoding these block lines. A variable length code of the code SK is designed together with variable length codes of "vertical mode"/"horizontal mode"/"pass mode".

Figure 23:
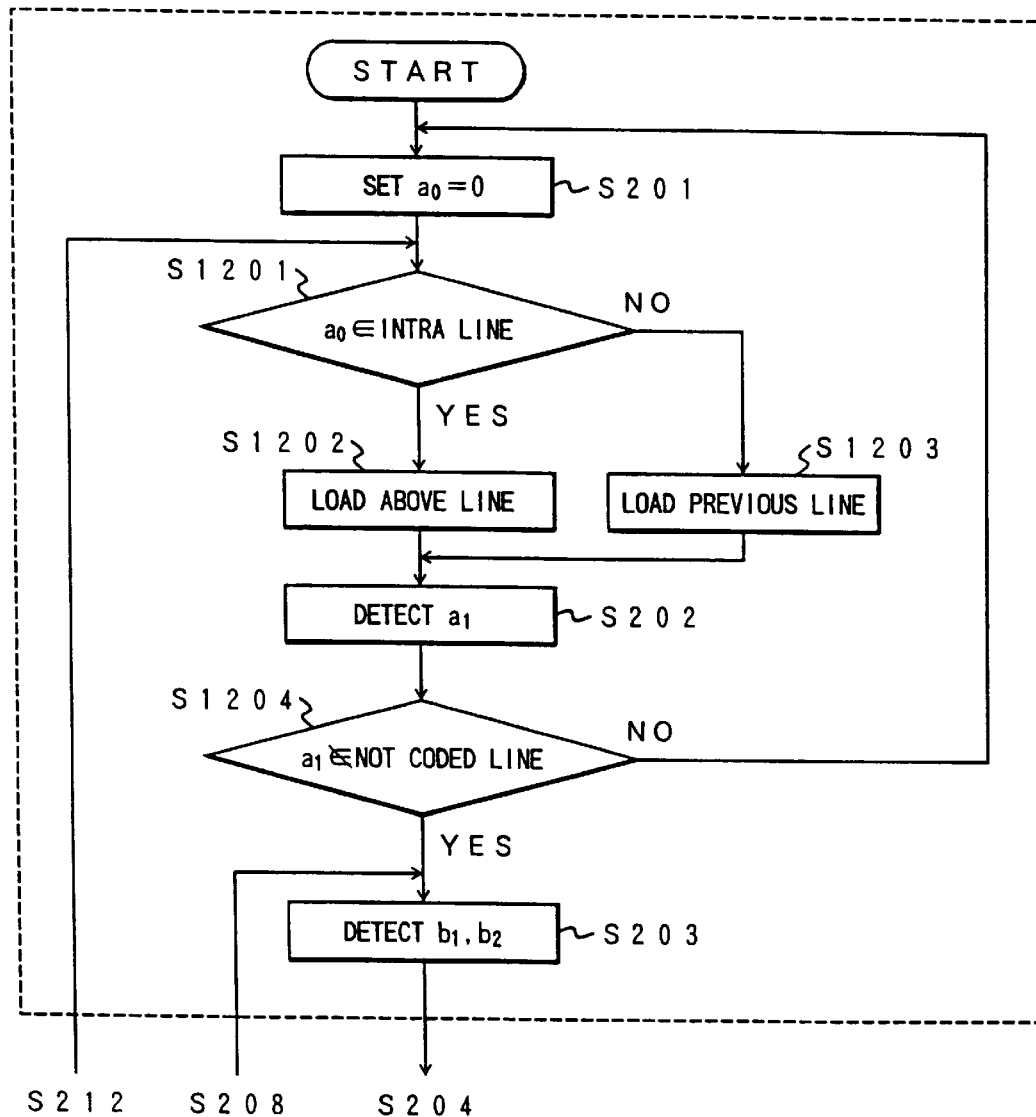
FIG. 23 is a view for explaining the present invention, which is a flow chart for explaining a coding procedure using a NOT CODED mode of the present invention.

FIG. 23 is a flow chart showing the encoding procedure described above, in which the portion enclosed within the dotted lines in FIG. 17 is altered.

The pixel position information of the starting changed pixel a0 on the encoding line is initialized (S201). Whether the mode of the line to which the starting pixel a0 belongs is the intraframe (INTRA) mode is checked (S1201). If the mode is the intraframe (INTRA) mode, "ABOVE LINE" is read into the line memory 2100 shown in FIG. 18 (S1202). If the mode is not the intraframe (INTRA) mode, "PREVIOUS LINE" is read into the line memory 2100 (S1203). Subsequently, whether the line to which a0 belongs is "NOT CODED LINE", i.e., a line not to be encoded, is checked (S1204). If the line is a line not to be encoded, the flow advances to the processing in step S201. If the line is a line to be encoded, a1 is detected (S202), b1 and b2 are detected (S203), and the flow advances to the processing in step S204.

As described above, encoded signals in the preceding frame are decoded and stored, and whether the region of a picture being encoded approximates to the state of a picture in an encoded region is checked by referring to the signals of the preceding frame. If the region being encoded approximates to the encoded region, the picture in the region is not encoded. Instead, signals in the decoded frame are copied to the frame being encoded, the copied portion is skipped, and the region to be encoded next is encoded. Consequently, the processing efficiency can be improved because encoding of the copied portion is skipped.

A practical example in which the amount of codes to be generated is reduced by improving the performance of prediction by using a plurality of reference lines will be described below.

Figure 24A:
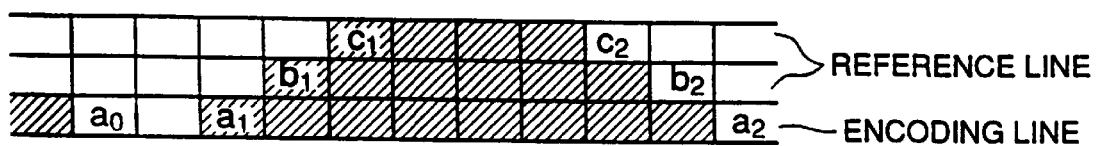
FIGS. 24A and 24B are views for explaining the present invention, which illustrate a case where a plurality of reference lines are used in the present invention.
Figure 24B:
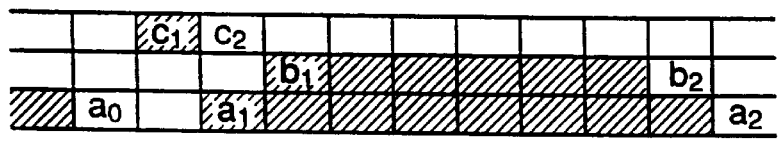

FIGS. 24A and 24B are views for explaining the relationship between the encoding line and the reference line in the present invention. Before the explanation, c1 and c2 are redefined as follows.

c1: the first changed pixel on the right side of
a0 and having a color opposite to that of a0
c2: the next changed pixel of c1

In the present invention, when a1 is encoded the displacements of b1 and a1 are predicted from the displacements of c1 and b1. diff obtained by the following equation is encoded in the vertical mode.

$$\text{diff} = b_1 - a_1 + f(b_1 - c_1)$$

In the above equation, f(x) is a prediction function for estimating the displacements of b1 and a1. Also, the following equations are examples of prediction functions by which the predictive value is set to 0 when the absolute values of the displacements of c1 and b1 are smaller than a threshold th, in order to prevent a decrease in the prediction efficiency resulting from micro-noise.

| | |
|---|---|
| f(x) = 0 | (abs(x) < th) |
| f(x) = sign(x) | (abs(x) ≥ th) |
| sign(x) = −1 | (x = 0) |
| sign(x) = 0 | (x = 0) |
| sign(x) = 1 | (x > 0) |

Note that if c2 is closer to the left end than b1 or if abs(b1−c1) is larger than a certain threshold, encoding is performed in the regular vertical mode.

Figure 25:
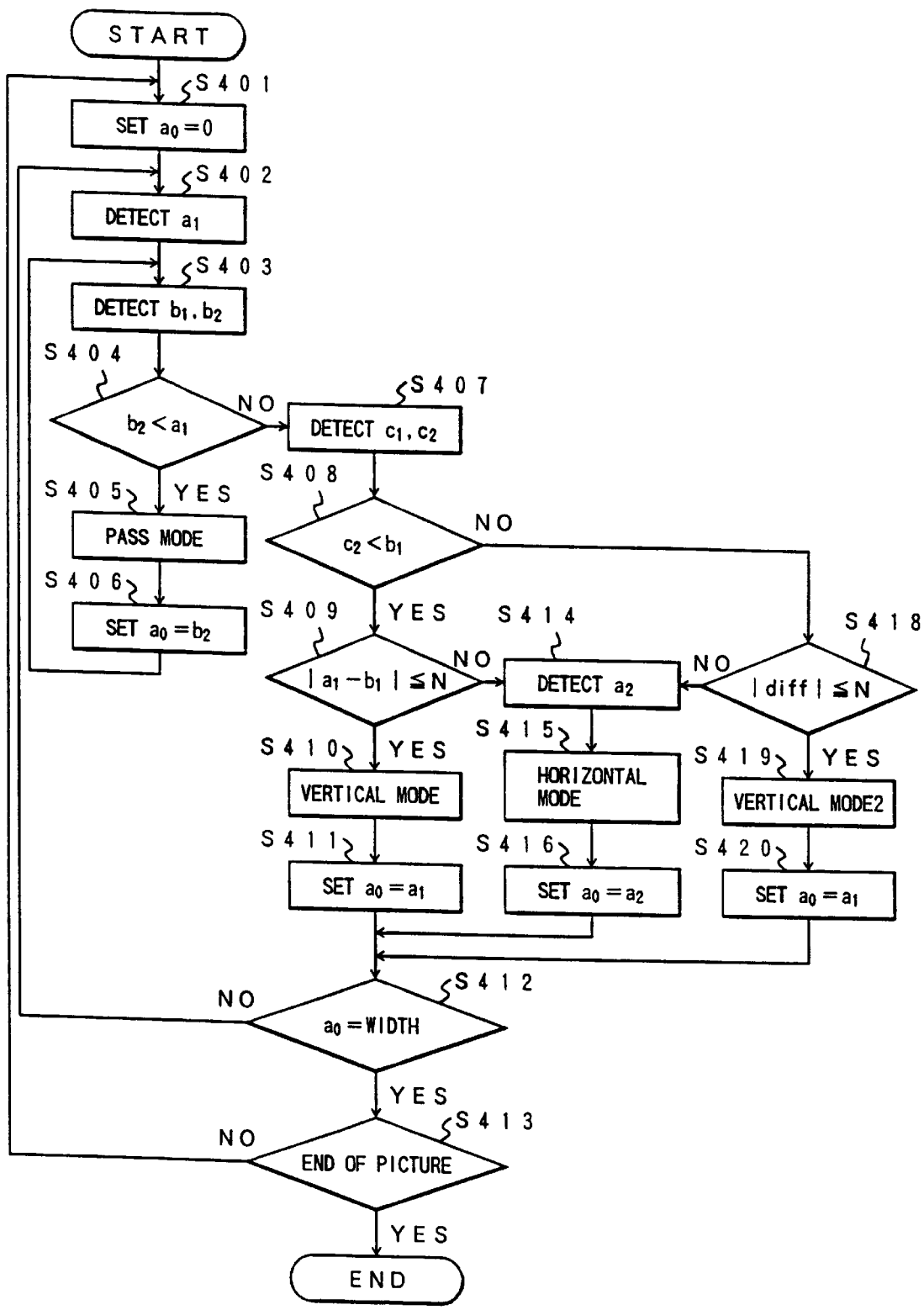
FIG. 25 is a view for explaining the present invention, which is a flow chart of a coding procedure when two reference lines are used in the present invention.

FIG. 25 is a flow chart showing the encoding procedure of this practical example. The first vertical mode is a conventional vertical mode, and the second vertical mode is a vertical mode using two reference lines, which is a new mode used by the present invention.

In this processing, the pixel position information of the starting changed pixel a0 on the encoding line is initialized (S401). The first changed pixel a1 to the right of the position "a0" on the encoding line is detected (S402). The first changed pixel b1 on the reference line on the right side of the position "a0" and having a color opposite to that of a pixel in the position "a0" is detected and the changed pixel b2 appearing next to the position "b1" on the reference line is detected (S403). Whether b1 is smaller than a1 is checked (S404). If b1 is smaller than a1, the pass mode (P) is set (S405), the pixel position information of a0 is set to the pixel position information of b2 (S406), and the flow returns to the processing in step S403.

If it is determined in step S405 that b1 is not smaller than a1, c1 and c2 are detected (S407), and whether c2 is smaller than b1 is checked (S408). If c2 is smaller than b1, whether $|a1-b1| \leq N$ is checked (S409). If $|a1-b1| \leq N$, the first vertical mode (V) is set (S410), the pixel position of a0 is set to the pixel position of a1 (S411), and the flow advances to processing in step S412.

In step S412, whether the position of a0 corresponds to the value of WIDTH as the number of pixels in the horizontal direction is checked. If NO in step S412, the flow returns to the processing in step S402. If YES in step S412, the flow advances to step S413 to check whether the end of the picture is reached. If the end of the picture is reached, the processing is completed. If the end of the picture is not reached, the flow returns to the processing in step S401.

On the other hand, if it is determined in step S408 that c2<b1 does not hold, whether $|\text{diff}| \leq N$ is checked (S418). If NO in step S418, a2 is detected (S414), the horizontal mode is set (S415), and a0 is set to a2 (S416). The flow then advances to the processing in step S412. If it is determined in step S418 that $|\text{diff}| \leq N$, the second vertical mode is set (S419), a0 is set to a2 (S420), and the flow advances to the processing in step S412.

On the other hand, if it is determined in step S409 that $|a1-b1| \leq N$ does not hold, a2 is detected (S414), the horizontal mode is set (S415), and a0 is set to a2 (S417). The flow then advances to the processing in step S412.

By the above processing, the performance of prediction can be improved by using a plurality of reference lines. The amount of codes to be generated can be reduced by this improvement of the prediction performance.

Figure 26B:
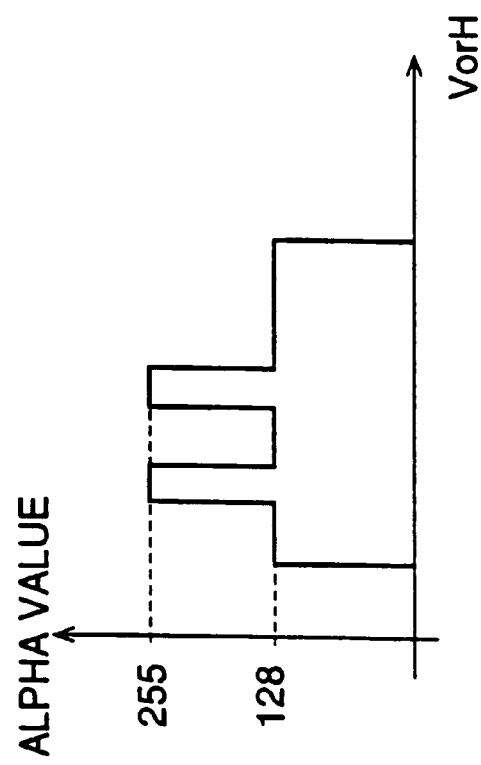
FIGS. 26A and 26B are views for explaining the present invention, which illustrate multivalue alpha maps to be applied to the present invention.
Figure 26A:
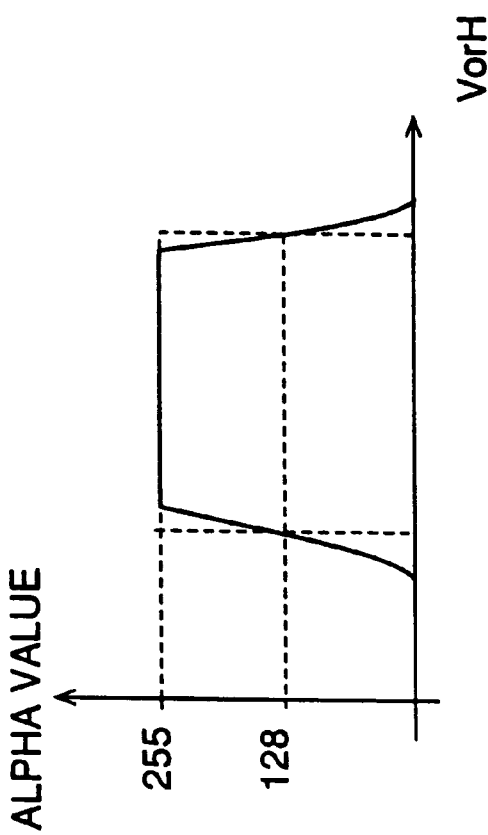

As one application of high-efficiency compression encoding according to the method of the present invention, a practical example of encoding of multivalue alpha maps, rather than the binary ones as described above, will be described below. FIGS. 26A and 26B are views for explaining multivalue alpha maps.

FIG. 26A shows an alpha map in which, in order to prevent discontinuity in the boundary when the object and the background are synthesized, the weighting of the synthesis is expressed by multiple values. FIG. 26B shows an alpha map when a portion of a caption is semitransparently synthesized (semitransparent superposition).

Assuming the signal of the object is So, the signal of the background is Sb, and the value of weighting (Alpha Value) is a, a synthetic signal is represented by an equation below. In this equation Alpha Value is expressed by 8 bits.

$$Sc = ((255-a)*Sb + So)/255$$

Figure 27A:
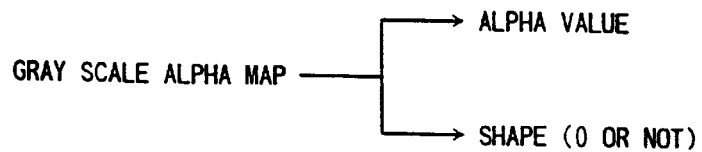
FIGS. 27A and 27B are views for explaining the present invention, which are block diagrams for explaining arrangements to which the multivalue alpha-map coding method of the present invention is applied.
Figure 27B:
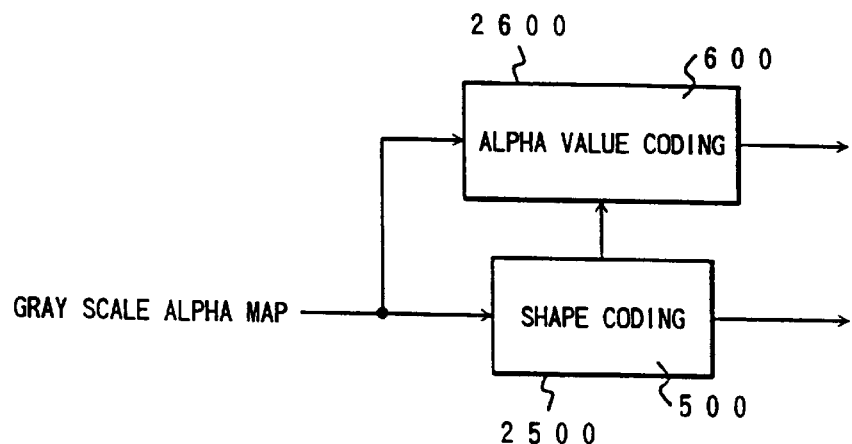

To encode this alpha map, as shown in FIG. 27A, shape information (Shape) representing whether the value of the alpha map is 0 and alpha value information (Alpha Value) which is gray scale information (gradation information) of each pixel in the alpha map are separately encoded. That is, as illustrated in FIG. 27B, the shape information Shape is supplied to a shape coding unit 2500 for practicing the binary picture coding method of the present invention. There the shape information Shape is encoded by the binary picture coding method of the present invention. In accordance with the reproduction signal of the information Shape, an alpha value coding unit 2600 for encoding a multivalue picture encodes the alpha value information Alpha Value.

In this manner it is possible to encode multivalue alpha maps, rather than binary ones.

As the third embodiment of the present invention, a code amount reducing technique when the region occupied by the object in a whole frame is very small will be described below with reference to FIGS. 29A to 30B.

Figure 29A:
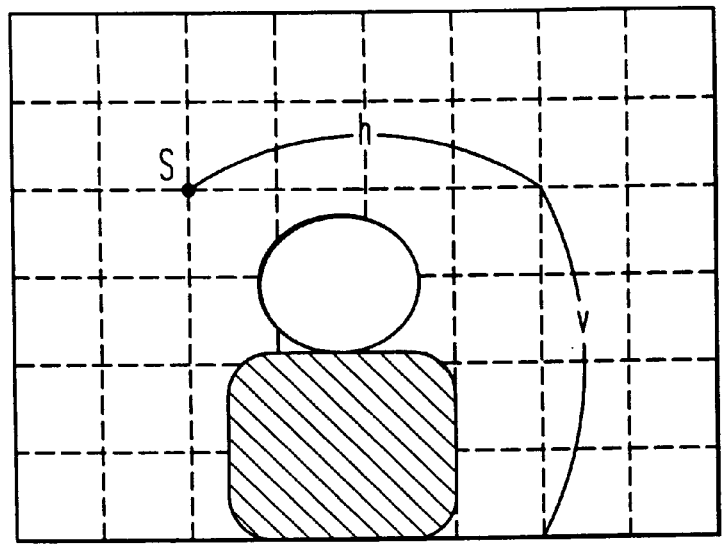
FIGS. 29A and 29B are views for explaining the present invention, which illustrate the third embodiment of the present invention.
Figure 29B:
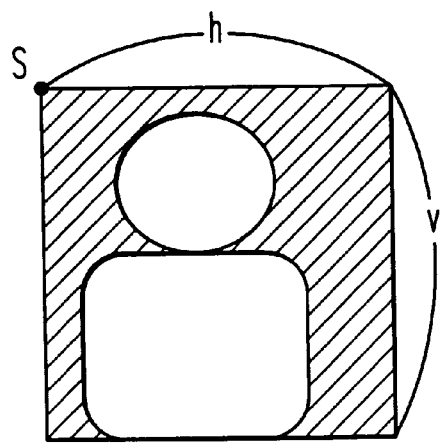

In a case where the region occupied by the object in a while frame is very small as shown in FIG. 29A, the amount of codes is sometimes reduced by encoding an alpha-map signal of the small region containing the object, as shown in FIG. 29B, rather than an alpha-map signal of the whole frame. If this is the case, the size of the small region and the positional relationship in the frame must be known. Therefore, the position address of an upper left corner S of a small region, which represents the position of the small region, and the dimensions (h, v) of the small region in the (horizontal, vertical) directions are additionally encoded as additional information. Furthermore, to reduce the amount of codes of S and (h, v), the small region is so set as to be an integral multiple of a block which is a processing unit of encoding enclosed within the broken lines in FIG. 29A. Consequently, S and (h, v) can be expressed by block addresses.

Figure 30A:
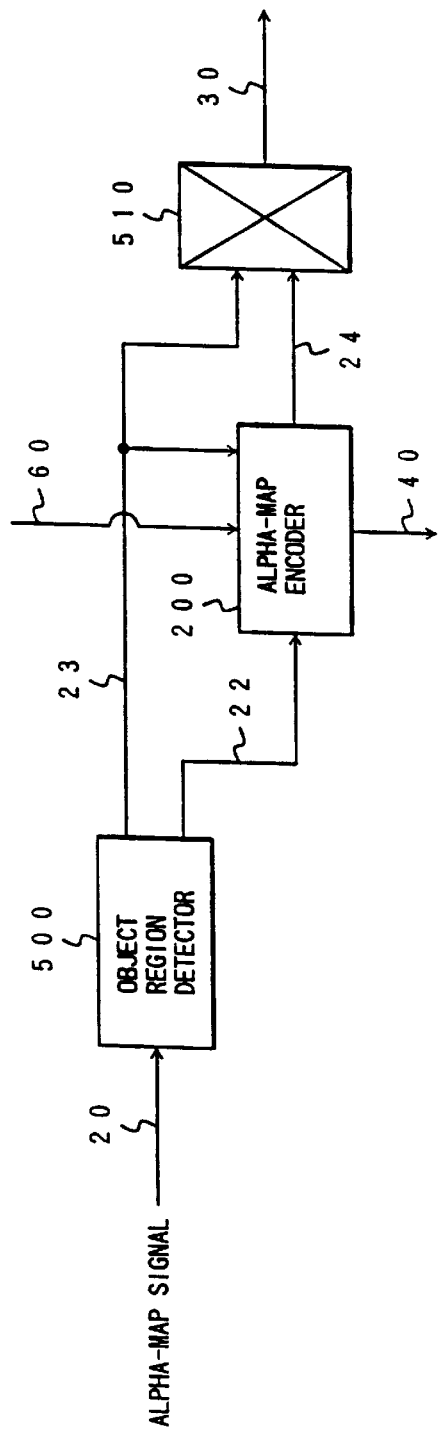
FIGS. 30A and 30B are views for explaining the present invention, which are block diagrams for explaining the third embodiment of the present invention.
Figure 30B:
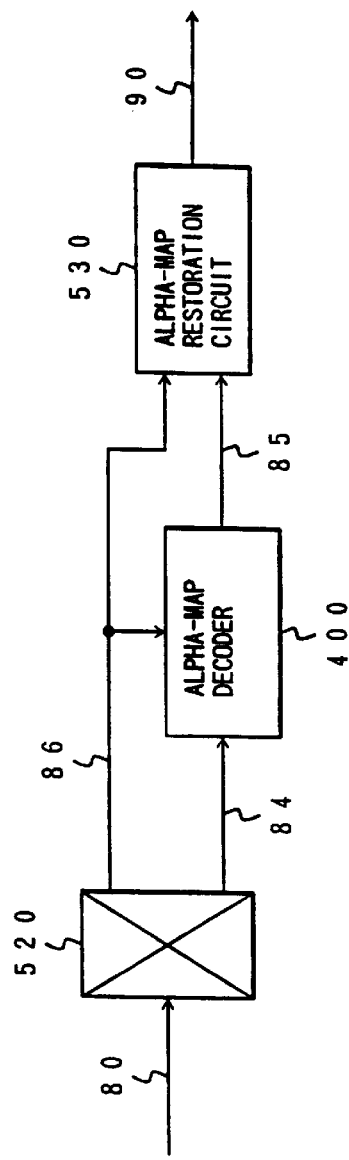
Figure 31A:
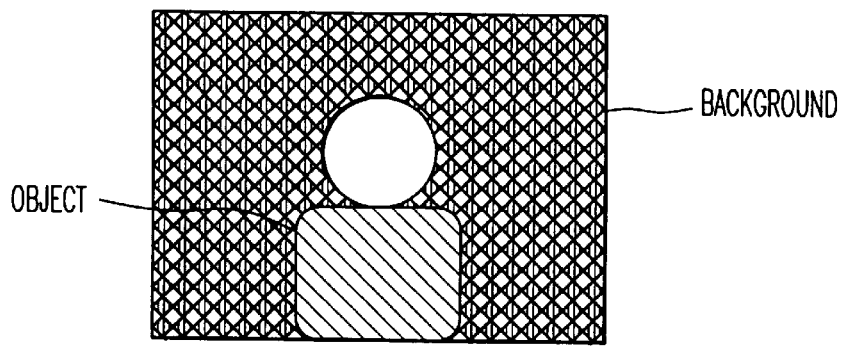
FIGS. 31A to 31E are views for explaining alpha maps.
Figure 31B:
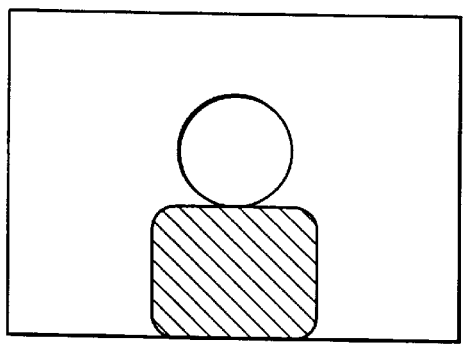
Figure 31C:
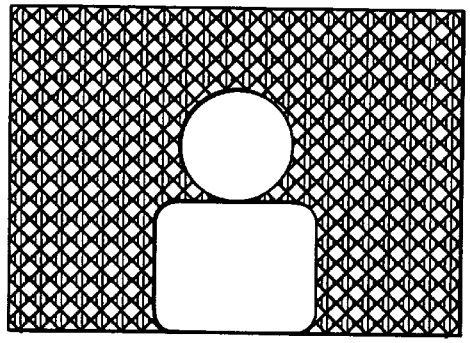
Figure 31D:
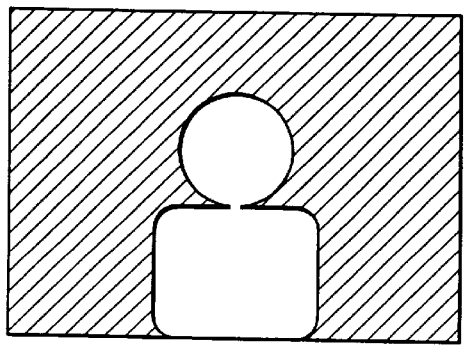
Figure 31E:
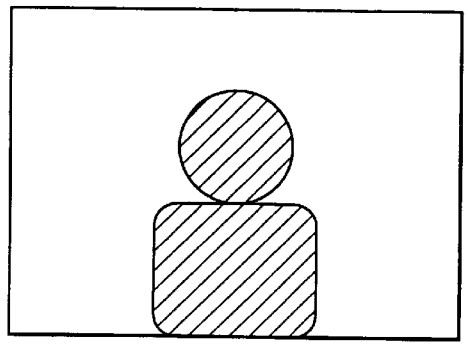

FIGS. 30A and 30B are block diagrams for explaining the flow of the above processing. FIG. 30A is a block diagram of a transmitter, and FIG. 30B is a block diagram of a receiver.

The transmitter consists of an object region detector 500, an alpha-map encoder 200, and a multiplexer 510. The object region detector 500 detects the region of the object from an alpha map, i.e., detects the alpha-map signal of the small region and the values of S and (h, v).

The alpha-map encoder 200 encodes the alpha map of the small region. Details of the encoder 200 have already been described. The multiplexer 510 multiplexes the encoded alpha-map and the output values of S and (h, v) from the object region detector 500 and outputs the multiplexed signal.

The receiver comprises a demultiplexer 520, an alpha-map decoder 400, and an alpha-map restoration circuit 530. The demultiplexer 520 demultiplexes the bit stream into the alpha-map signal of the small region and the coded components of the values of S and (h, v). The alpha-map decoder 400 decodes the alpha-map signal of the small region to obtain the alpha map of the original size. The alpha-map restoration circuit 530 restores the values of S and (h, v) from the coded components of the values of S and (h, v).

In the above configuration, an alpha-map signal of a whole frame is supplied to the object region detector 500 through a line 20. The detector 500 supplies an alpha-map signal of the small region as shown in FIG. 29B to the alpha-map encoder 200 through a line 22. Also, the detector 500 encodes the values of S and (h, v) and supplies the encoded values to the alpha-map encoder 200 and the multiplexer 510 through a line 23.

The multiplexer 510 multiplexes the encoded alpha-map signal of the small region supplied through a line 24 and the encoded values of S and (h, v) supplied through the line 23 and outputs the multiplexed signal through a line 30.

Meanwhile, the codes supplied to the demultiplexer 520 through a line 80 are demultiplexed into codes pertaining to the alpha-map signal of the small region and codes pertaining to S and (h, v), and these codes are output through lines 84 and 86, respectively. The alpha-map restoration circuit 530 restores the alpha-map signal of the whole frame from the reconstructed alpha-map signal of the small region supplied through a line 85 and the values of S and (h, v) supplied through the line 86 and outputs the restored signal through a line 90.

As a result, when the region occupied by the object in a whole frame is very small as shown in FIG. 29A, the amount of codes can be reduced by encoding an alpha-map signal of the small region containing the object as shown in FIG. 29B, rather than an alpha-map signal of the whole frame.

As the fourth embodiment, a technique which smooths an oblique discontinuity occurring due to sampling conversion (enlargement/reduction conversion) will be described below with reference to FIGS. 4, 33A and 33B, and 34.

When a binary picture is repeatedly reduced and enlarged, oblique lines or curved lines easily loose their smoothness. Since an alpha-map signal is binary picture information, the signal readily brings about this phenomenon when repeatedly reduced and enlarged. In addition, an alpha-map signal is used to extract or identify a portion of interest in a frame. Therefore, the loss of smoothness leads to degradation of image quality. Accordingly, a technique by which this problem of the loss of smoothness is eliminated is necessary.

This embodiment relates to a binary picture processing method which smooths an oblique discontinuity occurring due to sampling conversion (enlargement/reduction conversion) in the arrangement shown in FIG. 4.

Figure 33A:
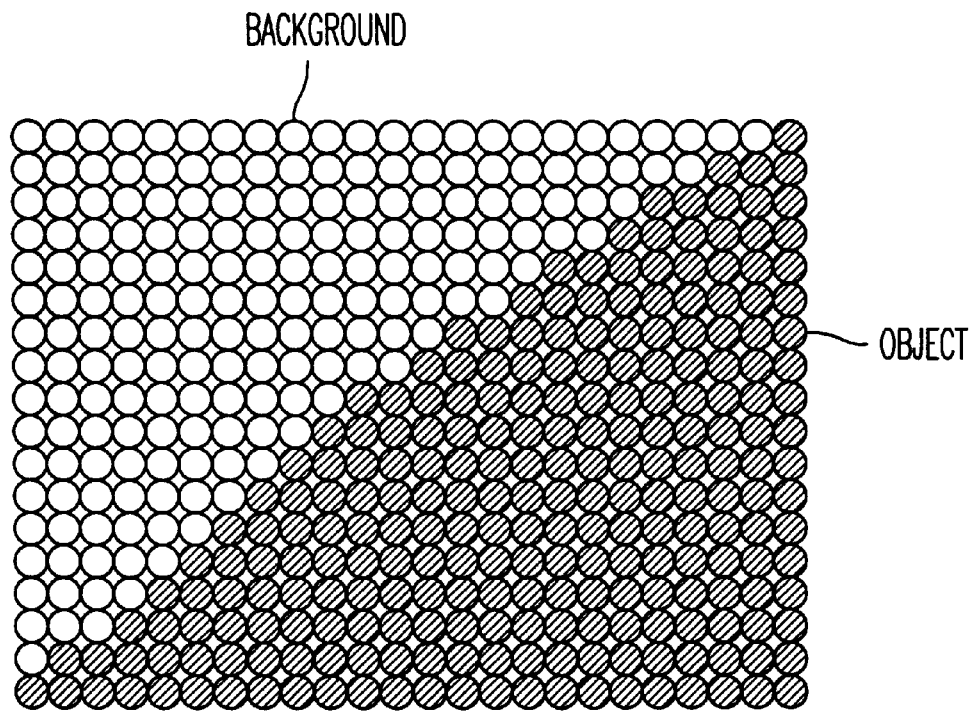
FIG. 33 is a view for explaining the present invention, which illustrate the fourth embodiment of the present invention.
Figure 33B:
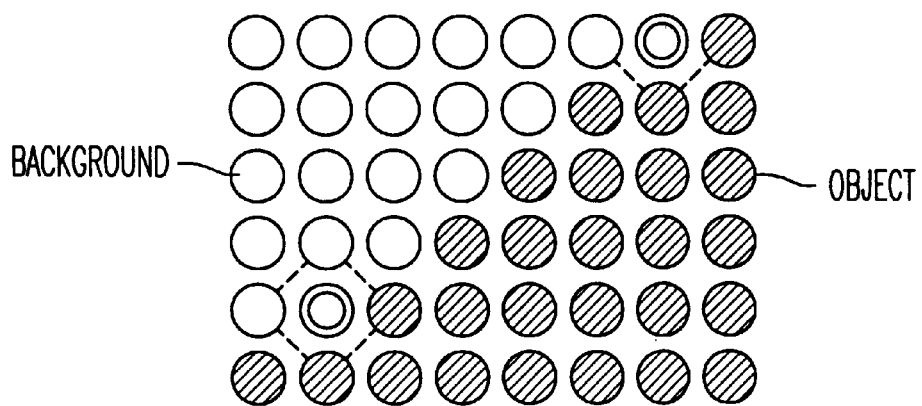

FIGS. 33A and 33B are views for explaining smoothing processing. FIG. 33A shows a binary picture of an original size, and FIG. 33B shows a binary picture obtained by reducing the picture in FIG. 33A. In FIGS. 33A and 33B, an object region is indicated by full circles and a background region is indicated by open circles.

In this embodiment, to smooth an oblique discontinuity occurring when a resolution conversion circuit 210 or a resolution conversion circuit 230 performs sampling conversion (enlargement/reduction conversion) in the configuration shown in FIG. 4, the upper, lower, left, and right pixels, i.e., the adjacent pixels, of each pixel (open circle) in the background region are checked. If two or more of these adjacent pixels are pixels (full circles) in the object region, the pixel of interest in the background region is incorporated into the object region.

That is, assume that the pixel to be checked in the background region is either of pixels in positions indicated by double circles in FIG. 33B. In this case two adjacent pixels are pixels (full circles) in the object region. Therefore, the pixel (i.e., the pixel to be checked) in the position indicated by the double circle is changed into a full-circle pixel, i.e., a pixel in the object region. Assuming a full-circle pixel is "1" and an open-circle pixel is "0", the pixel (pixel value "0") in the position indicated by the double circle is replaced by a pixel value "1".

Figure 34:
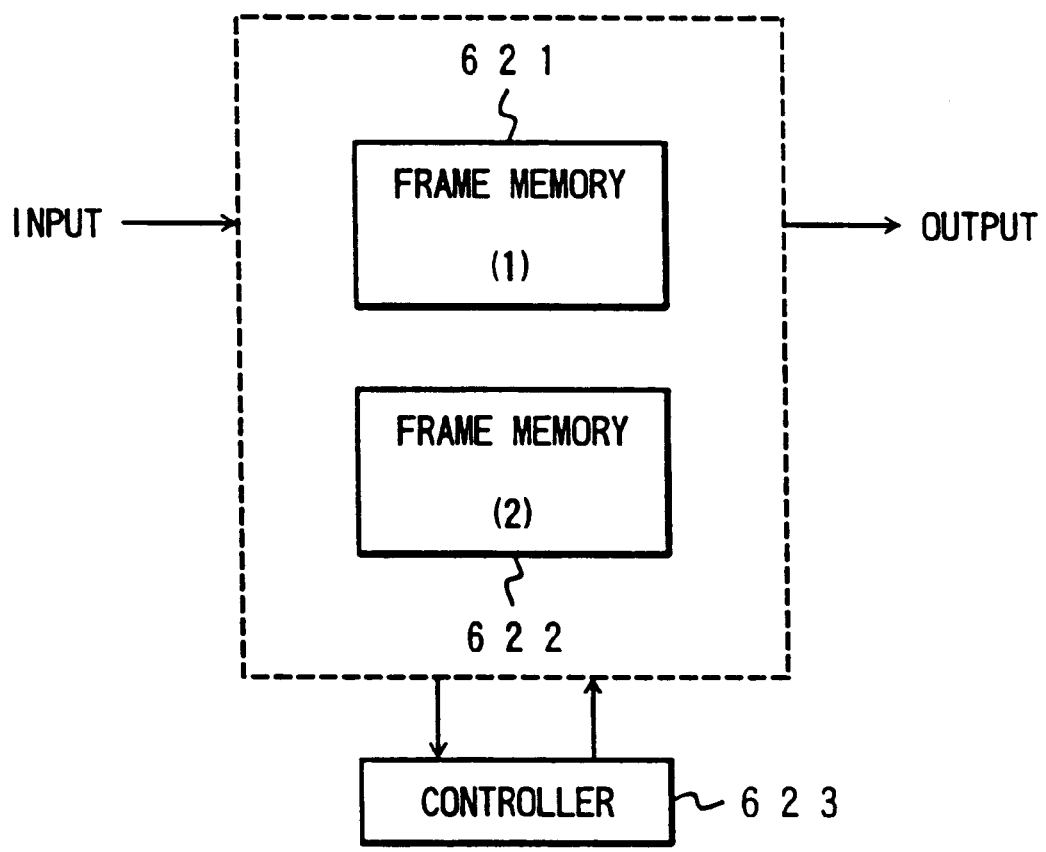
FIG. 34 is a view for explaining the present invention, which is a block diagram showing an example of the arrangement of an apparatus for realizing the fourth embodiment of the present invention.

More specifically, as illustrated FIG. 34, two frame memories 621 and 622 are prepared as devices for performing the above picture processing, and binary picture data to be smoothed is held in these frame memories 621 and 622. One frame memory is used as a memory for holding the picture to be checked, and the other is used as a working memory. A controller 623 controls these frame memories 621 and 622 as follows and performs arithmetic processing as follows by using the contents held in the frame memories 621 and 622.

When binary picture data is input, the Controller 623 stores this binary picture data in the holding memory for a picture to be checked and the working memory (S1). The controller 623 sets each pixel of the picture held in the holding memory for the picture to be checked, as the pixel to be checked, and checks the values of four adjacent pixels of that pixel (S2). The controller 623 checks whether the value of the pixel to be checked is "0" and two or more of the four adjacent pixels have a value "1" (S3). If two or more adjacent pixels have "1", the controller 623 rewrites the value of the pixel to be checked by "1" (S4). This rewrite operation is done by replacing the value in the corresponding pixel position in the working memory with "1".

When completely processing all pixels, the controller 623 reads out the corrected binary picture data from the working memory (S5) and outputs the data as smoothed binary picture data. When this processing is completed, the binary picture data which has lost its smoothness restores the smoothness of the contour. For binary picture data whose smoothness is largely lost, the above processing is repeated a plurality of number of times. That is, the controller 623 copies the corrected binary picture data stored in the working memory to the holding memory for the picture to be checked (S6), and again performs the processing from step S2. When the ratio and the number of times of compression and enlargement are determined, the degree of the loss of smoothness can be known in the system. Therefore, the controller 623 repeats the above processing by determining an appropriate repetitive number in accordance with the situation, reads out binary picture data from the working memory as the processed binary picture data, and outputs the readout data as the final processed data.

As a consequence, even binary picture data whose smoothness is largely lost can be corrected to have a smooth contour. Accordingly, when the picture processing means shown in FIG. 34 is provided in the output stage of the resolution conversion circuit 210 in the configuration shown in FIG. 4, binary picture data with a smooth contour can be supplied to the subsequent stage.

Although various examples have been described above, the gist of the embodiments is that the resolution of an alpha map required to realize object scalability is reduced when the alpha map is encoded, and the obtained codes and the reduction ratio information are together multiplexed to form an alpha-map signal to be transmitted or stored. Consequently, the alpha-map signal can be efficiently encoded and this allows efficient encoding of the shape information of the object.

In reproducing the alpha-map signal, the coded components of the alpha map and the reduction ratio information are separated. The coded components of the alpha map are decoded and enlarged to the original resolution in accordance with the reduction ratio information. Accordingly, the alpha map of the original size can be restored. This allows easy decoding of a coded picture using an alpha map.

Figure 32:
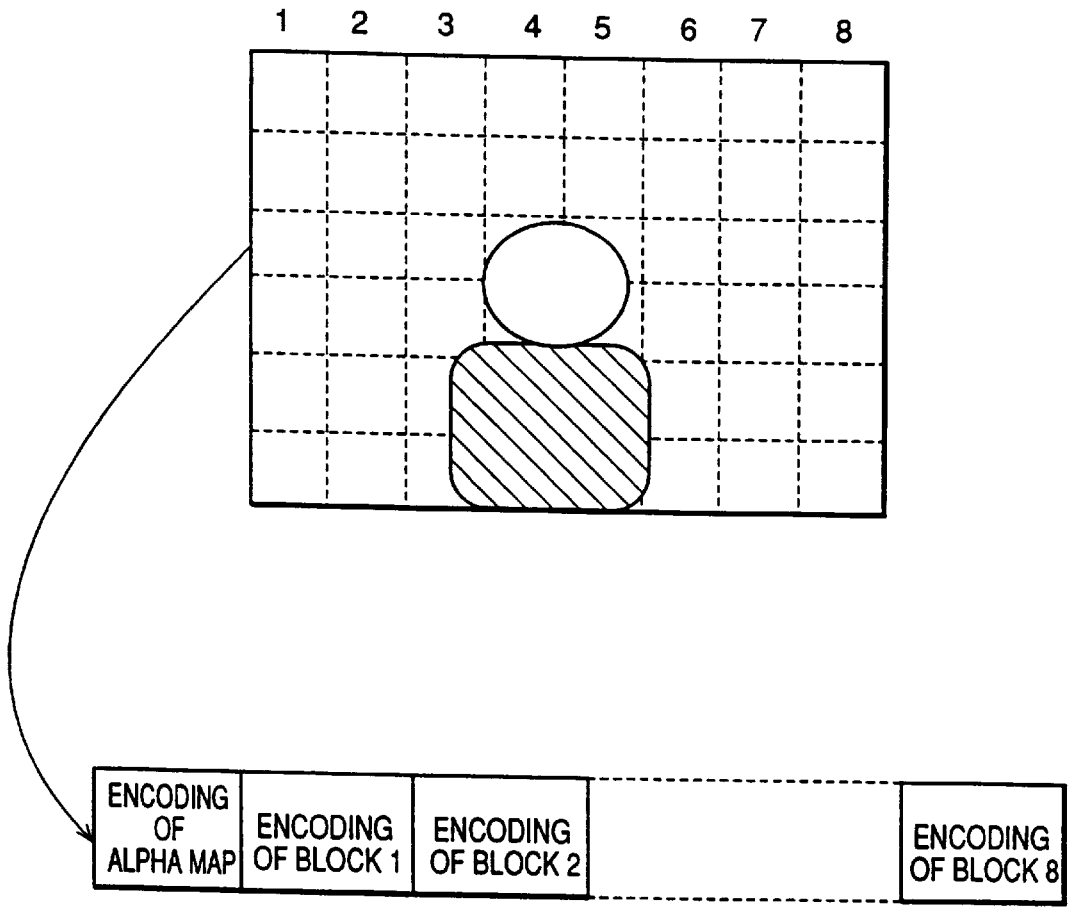
FIG. 32 is a view for explaining another example of the present invention.

In the present invention, the processing can be performed in units of block lines. Therefore, as shown in FIG. 32, codes of alpha maps can be transmitted in units of block lines and decoded in units of block lines on the receiver side.

That is, general MMR detects changed pixels only in horizontal lines of a picture. In the first to fourth embodiments, on the other hand, MMR is used but changed pixels of a picture are detected across a plurality of lines in raster scan order. Accordingly, the processing can be performed in units of block lines. Consequently, as shown in FIG. 32, codes of alpha maps can be transmitted in units of block lines and decoded in units of block lines on the receiver side.

Each of the above embodiments is a method of encoding a whole frame or individual block lines in encoding of an alpha map necessary to realize object scalability which is a function of a coding system capable of reproducing (reconstructing) a picture in units of partial images with arbitrary shapes. That is, each embodiment is a method of encoding an alpha map expressed by binary pictures by using a coding method based on MMR (Modified Modified READ) which is a coding system of FAX. MMR is basically a coding system whose unit is a line.

On the other hand, in the existing picture coding systems such as MPEG which is a standard coding system for motion pictures, a general approach is to divide a whole frame into macro blocks MB each consisting of 16×16 pixels and perform encoding in units of macro blocks MB. Therefore, in these systems it is desirable to perform encoding of alpha maps in units of macro blocks MB. However, the macro block MB is a portion of a frame. Accordingly, if the macro blocks MB are encoded one after another on the basis of MMR which is a coding system whose unit is a line, the coding efficiency may be decreased.

A coding technique, therefore, capable of efficiently performing encoding and decoding in units of macro blocks will be described below.

As the fifth embodiment, the first method of performing encoding and decoding in units of macro blocks according to the present invention will be described below with reference to FIGS. 35, 36, and 37A and 37B. System configurations required in this embodiment can be basically the same as the configurations shown in FIGS. 2 and 3. It is only necessary to design the system such that encoding is performed by the alpha-map encoder 200 shown in FIG. 2 and decoding is performed by the alpha-map decoder 400 shown in FIG. 3.

Figure 35:
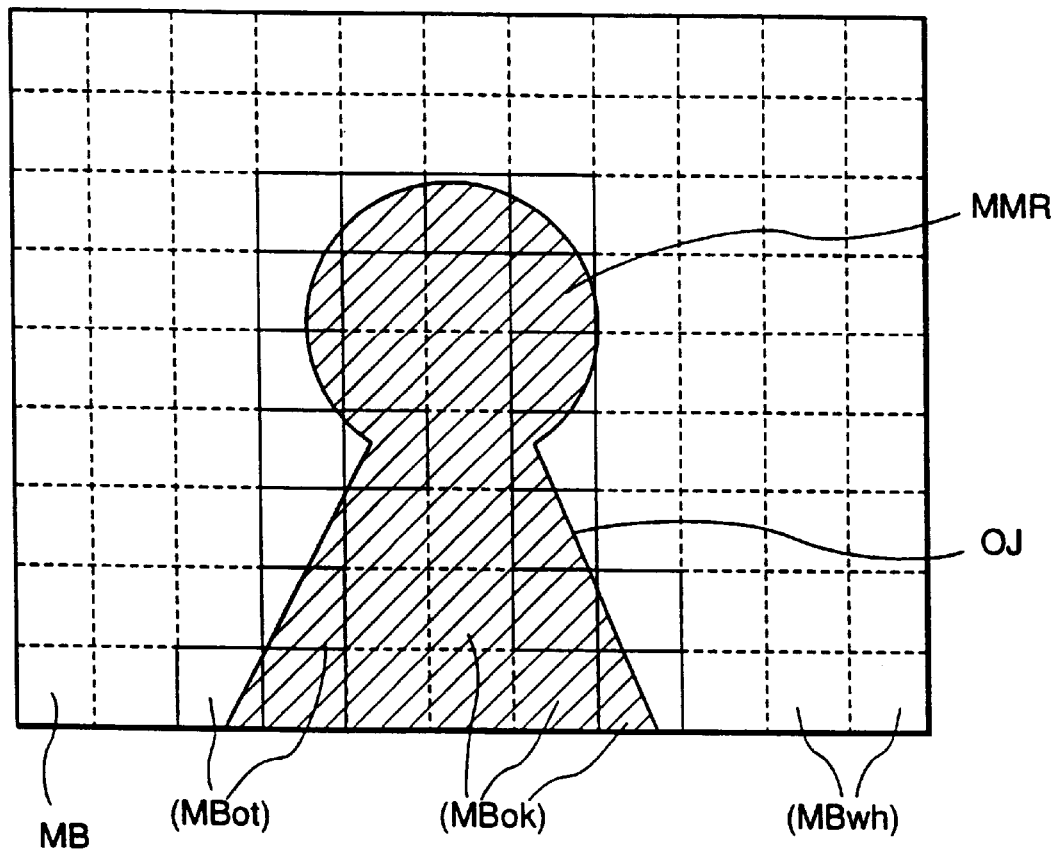
FIG. 35 is a view for explaining the present invention, which illustrates macro blocks MB.
Figure 36:
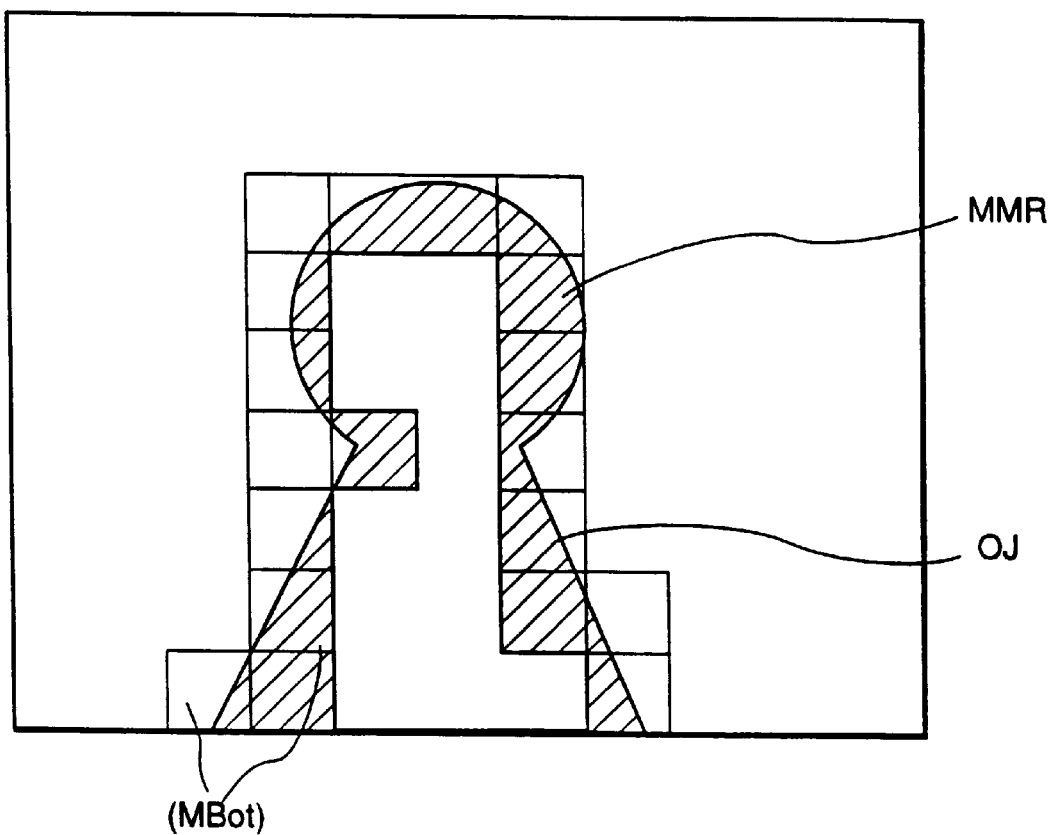
FIG. 36 is a view for explaining the fifth embodiment of the present invention.

FIG. 35 shows a frame of an alpha map divided into macro blocks MB each constructed by a predetermined number of pixels, i.e., 16×16 pixels. In FIG. 35, the square measures indicate the boundaries between the blocks, and each measure is the macro block MB.

Since an alpha map indicates information of the object by using binary numbers in units of pixels, each pixel is black or white. Therefore, as shown in FIG. 35, the contents of the macro blocks MB in an alpha-map frame are classified into three categories, "all_white", "all_black", and "others".

In the case of a frame as shown in FIG. 35 which is an alpha map of an image of a person, the background is "white" and the person is "black". The macro blocks MB are constructed by macro blocks MBwh indicating the background, macro blocks MBbk indicating the person, and macro blocks MBot containing both the background and the person. Portions requiring encoding are the macro blocks MBot. As is apparent from FIG. 35, the macro blocks MBot are macro blocks containing the contour of an object OJ. That is, it is only necessary to apply the MMR-based coding method to macro blocks shown in FIG. 36. The macro blocks MBot exist in the region of the contour of the person and contain both the background and the person.

Figure 37A:
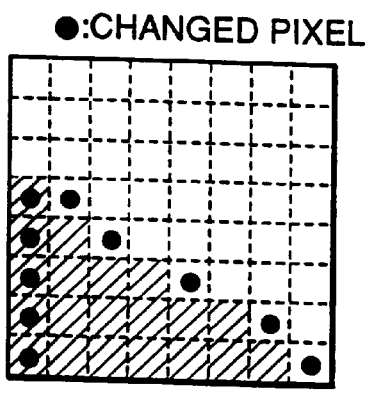
FIGS. 37A and 37B are views for explaining the present invention, which illustrate the fifth embodiment of the present invention.
Figure 37B:
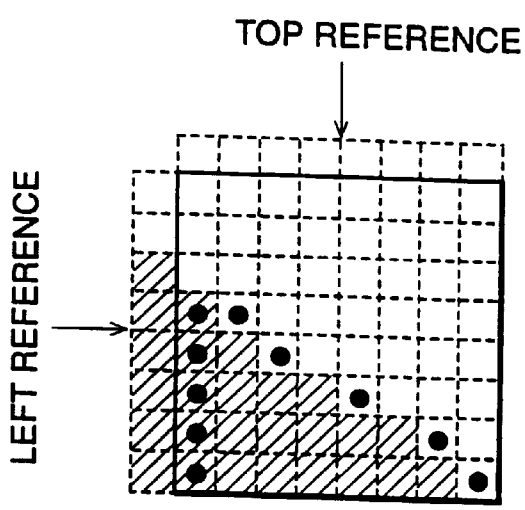

When the methods of the first to fourth embodiments are applied to macro blocks MB as shown in FIGS. 37A and 37B, changed pixels detected are those in positions indicated by full circles in FIG. 37A. In the subsequent drawings, each macro block MB is illustrated as a block constructed by 8×8 pixels for the sake of simplicity.

When the macro blocks MB are encoded in raster scan order from the upper left corner of a frame and decoded in raster scan order after being received, a pixel group ("top reference") in contact with the upper edge of a macro block MB being encoded or decoded and a pixel group ("left reference") in contact with the left edge of the macro block MB have known values on both of the transmitter and the receiver sides as shown in FIG. 37B. That is, since the processing is performed in raster scan order, "top reference" and "left reference" are the information of the adjacent macro blocks MB already processed and therefore have known values.

When macro blocks MB are processed one after another in raster scan order, if pixels contacting the left edge of a macro block MB being processed are changed pixels such as those indicated by the full circles in FIG. 37A, these pixels must be encoded as changed pixels. This is extremely redundant information compared to information encoded in units of frames.

To eliminate this redundancy, therefore, in the present invention a change of pixels on the left edge of the macro block MB from the value of "left reference" on the same line is detected and the first changed pixel having a color opposite to "pred_color" in a reference region is defined as "b1". Consequently, the changed pixels are those in positions indicated by the full circles in FIG. 37B, and this greatly reduces redundant changed pixels compared to the case shown in FIG. 37A. "pred_color" includes "a0_color" (previous line) and "ref_color" (current line).

The "current line" is a line to which the starting changed pixel "a0" belongs, and the "previous line" is a line one line above the "current line". "a0_color" is the value (black or white (a black value or a white value)) of the starting changed pixel "a0", and "ref_color" is the value of "left reference" on the same line as "current line".

The "top reference" indicates pixels in contact with the upper edge of the macro block MB shown in FIG. 37B. "left reference" indicates pixels in contact with the left edge of the macro block MB in FIG. 37B.

In a case where a square region including the object is to be encoded, if the upper or the left edge of the macro block MB is in contact with the upper or the left end of the square region, all values of "top reference" and "left reference" are "white".

In each of the first to fourth embodiments, the method of predicting a change of the relative address by using the reproduced values of a plurality of lines is described. If this is the case, it is necessary to store "top reference" and "left reference" of a plurality of lines. It is also possible to sequentially encode the macro blocks MB from the one in the lower right corner. In this case the reproduced values contacting the lower and the right edges of the macro block MB are used.

When motion compensation prediction is applied, the motion compensation prediction circuits 110 and 350 in the arrangements shown in FIGS. 2 and 3 can generate a motion compensation predictive value for an alpha-map signal as well as for a picture signal. Since identical signals need only be obtained for each of "top reference" and "left reference" on the transmitter and receiver sides, motion compensation predictive values can be used as "top reference" and "left reference". Also, as described in the first to fourth embodiments, relative address encoding with respect to motion compensation predictive values can be applied.

The foregoing is an example of the processing in which macro blocks MB are compression-encoded one after another in raster scan order and decoded in raster scan order (order of x-direction scan in x-y scan). However, when macro blocks MB are compression-encoded and decoded one after another, the compression processing can be performed more efficiently, depending on the state of a picture, when performed in the vertical direction (in order of y-direction scan in x-y scan) than when performed in raster scan order. Therefore, it is useful to realize a method capable of selectively performing processing in raster order or in the vertical direction in accordance with the state of a picture. This method will be described below as the sixth embodiment.

The sixth embodiment of the present invention will be described below with reference to FIGS. 28A to 38D. System configurations required in this embodiment can also be basically the same as the configurations shown in FIGS. 2 and 3. That is, it is only necessary to design the system such that encoding is performed by the alpha-map encoder 200 shown in FIG. 2 and decoding is performed by the alpha-map decoder 400 shown in FIG. 3.

Figure 38A:
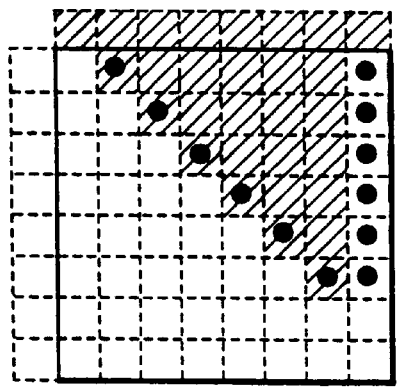
FIGS. 38A to 38D are views for explaining the present invention, which illustrate the sixth embodiment of the present invention.
Figure 38B:
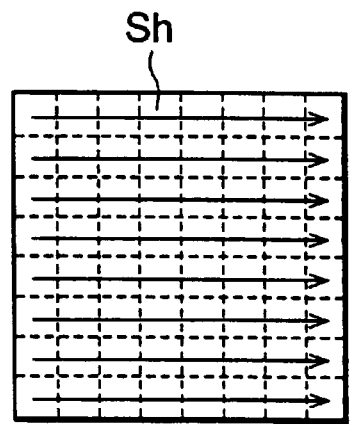
Figure 38C:
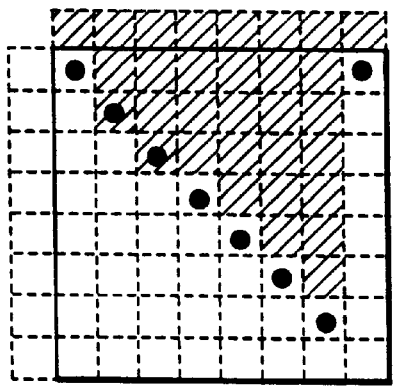
Figure 38D:
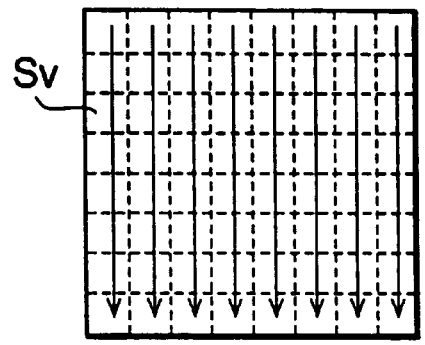

FIG. 38B shows the scan order (scan from the left to the right (horizontal scan Sh)) in the first to fifth embodiments. FIG. 38A shows an example of changed pixels (pixels indicated by the full circles) detected by scan in this scan order. In this case twelve changed pixels are detected even by the use of the changed pixel detection method in the fifth embodiment. In this embodiment, therefore, as shown in FIG. 38D, changed pixels are detected in order of longitudinal scan (scan from the top to the bottom (vertical scan Sv)) by switching the row addresses and column addresses in the macro block MB. Consequently, the number of changed pixels detected is reduced from 12 in the scan method of FIG. 38B to 8 as shown in FIG. 38C. In this way the number of changed pixels can be reduced by changing the scan direction depending on the state of a picture.

In the present invention, the amount of generated codes is reduced when the number of changed pixels is reduced for the same change amount between changed pixels. Therefore, the generated code amount in the scan order shown in FIG. 38D is smaller than that in FIG. 38B.

Accordingly, the code amount can sometimes be reduced by adaptively switching the scan order in FIG. 38B and the scan order in FIG. 38D. If this is the case, to allow the decoding side to reconstruct data, it is necessary to encode and add information identifying the scan order to the data. On the basis of this information identifying the scan order, decoding is performed while the directions are switched.

As described above, when macro blocks MB are compression-encoded and decoded one after another, the compression encoding can sometimes be performed more efficiently when performed in the vertical direction (in order of y-direction scan in x-y scan) than when performed in raster scan order, depending on the state of a picture. Therefore, the above embodiment realizes a system capable of selectively performing the processing in raster scan order or in the vertical direction in accordance with the state of a picture.

It is, however, in some instances also possible to reduce the amount of codes by processing macro blocks MB, as square blocks, after rearranging them into wide rectangular blocks, instead of directly processing them in the form of a square block. This method will be described below as the seventh embodiment.

The seventh embodiment of the present invention will be described below with reference to FIGS. 39A to 39C. System configurations required in this embodiment can also be basically the same as the configurations shown in FIGS. 2 and 3. It is only necessary to design the system such that encoding is performed by the alpha-map encoder 200 shown in FIG. 2 and decoding is performed by the alpha-map decoder 400 shown in FIG. 3.

In this embodiment, the values of "top reference" and "left reference" in the fifth embodiment are not used in order to independently encode macro blocks MB.

Figure 39A:
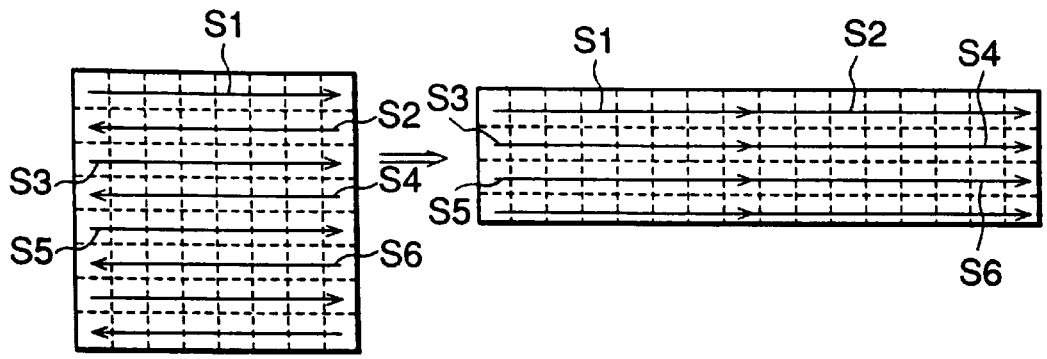
FIGS. 39A to 39C are views for explaining the present invention, which illustrate the seventh embodiment of the present invention.

FIG. 39A is a view for explaining the scan order of this embodiment. A square block of n×n pixels constituting the macro block MB as shown on the left side of FIG. 39A is formed into a raster-scanned rectangular block by alternately switching the scan directions of lines as shown on the right side of FIG. 39A. That is, the square block is horizontally scanned from the upper left pixel to the right along the line (S1). When the right end is reached, the scan moves to pixels on a line below, and the pixels are horizontally scanned from the right end to the left end along the line (S2). When the left end is reached, the scan moves to pixels on a line below, and the pixels are horizontally scanned from the left end to the right end along the line (S3). In this manner the scan is performed zigzag. One line is doubled by connecting two scanned lines, i.e., the number of lines is decreased in the vertical direction (column direction), thereby forming a rectangular block. More specifically, of the zigzag-scanned lines S1, S2, S3, S4, S5, S6, . . . , the uppermost line is formed by connecting the line S2 to the line S1, the next line is formed by connecting the lines S3 and S4, the next line is formed by connecting the lines S5 and S6, and so on.

Figure 39B:
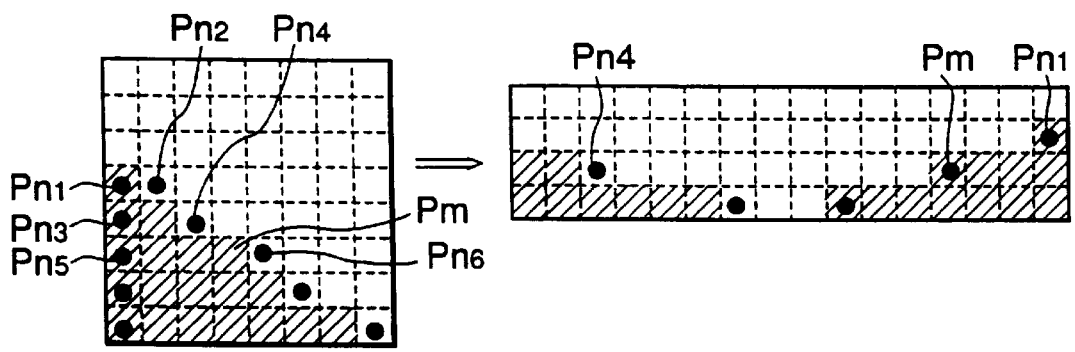

By scanning a square block in this way so that the square block is rearranged into a wide rectangular block, the number of changed pixels is reduced from 10 in the square block to 5 in the rectangular block in the case of FIG. 39B.

In this processing, however, the correlation between changed pixels is decreased. Therefore, if variable length codes designed for square blocks are used in encoding, the amount of codes is sometimes increased. If this is the case, it is only necessary to newly design rectangular block variable length codes and prepare them in the form of a table for rectangular blocks and perform encoding by using this rectangular block variable length code table.

Figure 39C:
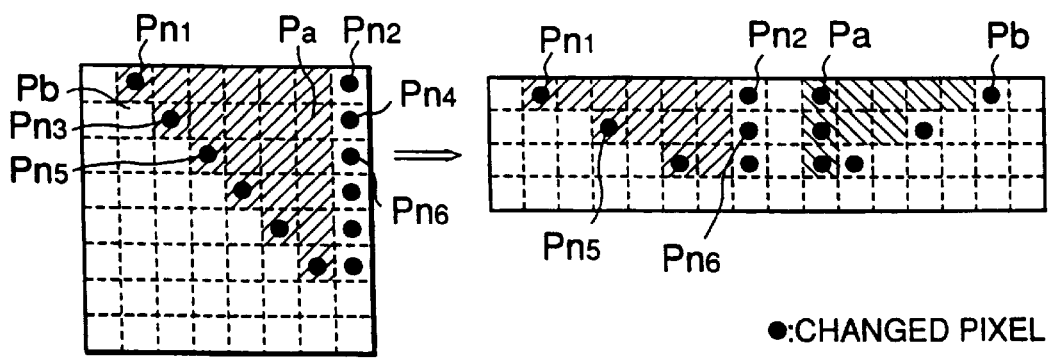

Also, in a case shown in FIG. 39C, the number of changed pixels remains unchanged even by the use of this embodiment, as can be seen from the drawing. On the contrary, the amount of generated codes increases if a square block is converted into a rectangular block, since the correlation between changed pixels is decreased.

Pictures can take various states. Therefore, the amount of generated codes can sometimes be reduced by adaptively switching between a square block and a rectangular block, and so this embodiment is sufficiently significant.

Even in the processing of macro blocks MB, it is in many instances inefficient to directly compress blocks with the macro block size. For example, when every line in a macro block MB assumes the same state of a picture such as when only a vertical belt-like line exists in a picture, data can be faithfully reproduced without decreasing the resolution even if the data is compressed while lines are thinned. An optimum method for a picture like this will be described below as the eighth embodiment.

The eighth embodiment of the present intention will be described below with reference to FIGS. 6, 8, and 40A and 40B. System configurations required in this embodiment can also be basically the same as the configurations shown in FIGS. 2 and 3. It is only necessary to design the system such that encoding is performed by the alpha-map encoder 200 shown in FIG. 2 and decoding is performed by the alpha-map decoder 400 shown in FIG. 3.

This embodiment solves the problem when the method of encoding a binary picture after reducing the picture used in the first embodiment is applied to processing whose unit is a macro block MB.

As described above, an encoder and a decoder can be basically the same as those used in the first embodiment. In this embodiment, the configuration shown in FIG. 6 already described above is used as an alpha-map encoder 200, and the configuration shown in FIG. 8 already described above is used as an alpha-map decoder 400. Accordingly, the operations of individual components and the flows of signals are previously described in detail in the first embodiment and so a detailed description thereof will be omitted.

FIGS. 40A and 40B are views showing examples of reduction of a binary picture. FIG. 40A shows examples of reduction using the method explained in the first embodiment. FIG. 40A shows examples of reduction using a reduction filter. More specifically, FIG. 40A illustrates reduction in which a conversion ratio CR is "1" (the state of no reduction), reduction in which the conversion ratio CR is "½" (the state of ½ reduction), and reduction in which the conversion ratio CR is "¼" (the state of ¼ reduction). Each state shows the result when a square block is directly thinned in the form of a square block.

FIG. 40B shows examples of reduction in the vertical direction using the line thinning explained in the seventh embodiment. That is, FIG. 40B illustrates reduction in which the conversion ratio CR is "1" (the state of no reduction), reduction in which the conversion ratio CR is "½" (the state of ½ reduction), and reduction in which the conversion ratio CR is "¼" (the state of ¼ reduction). Each state shows the result when a square block is thinned and converted into a rectangular block.

The conversion ratio CR is the reduction ratio supplied through the line 60 in the alpha-map encoder 200 shown in FIG. 6. In the first embodiment or MMR, if the value of the difference between the addresses of the changed pixel "b1" and the changed pixel "a1" is a threshold or less, a run with a length (a1–a0) and a run with a length (a2–a1) are encoded (horizontal mode).

Also, since encoding is performed in units of macro blocks MB, the types of run lengths which can be generated are uniquely determined with respect to the value of each CR. When a square block is directly reduced in the form of a square block by thinning the data in both the horizontal and vertical directions as shown in FIG. 40A, the run length frequency distribution greatly changes due to a change in the conversion ratio CR. Therefore, the coding efficiency can be improved by performing variable length encoding in accordance with each CR by preparing variable length codes for run lengths in accordance with the CR.

When the maximum run length is the number of horizontal pixels in a frame (macro block MB) as in the first embodiment, even a maximum number of types of run lengths is 17 (0 to 16). Therefore, the load of a memory for storing a variable length code table is small even when a plurality of variable length codes are prepared.

In the example shown in FIG. 40B, since the correlation between changed pixels decreases when the conversion ratio CR is decreased, a variation in the relative address frequency distribution changes in accordance with a change in the conversion ratio CR. Accordingly, the amount of generated codes can be reduced by optimally switching variable length codes in accordance with CR. Note that even a maximum number of types of absolute values of relative addresses is 16 (0 to 15), and so the load of a memory is small even when a plurality of variable length code tables are prepared.

In the example shown in FIG. 40A, the maximum values of the absolute values of the numbers of relative addresses that can be generated are different. Accordingly, the threshold for switching to the horizontal mode can be switched in accordance with CR. Also, the amount of codes can be controlled by adaptively switching the conversion ratios CR or the reduction methods (e.g., the forms shown in FIGS. 40A and 40B) for each macro block MB in accordance with the state of a picture.

In the first to eighth embodiments described above, even in alpha-map coding performed in units of macro blocks, alpha maps can be encoded and decoded with no large increase in the amount of codes.

Next, a motion picture transmission system to which a motion picture coding/decoding apparatus of the present invention is applied will be described below as one application of the invention with reference to FIGS. 41A to 41C.

Figure 41A:
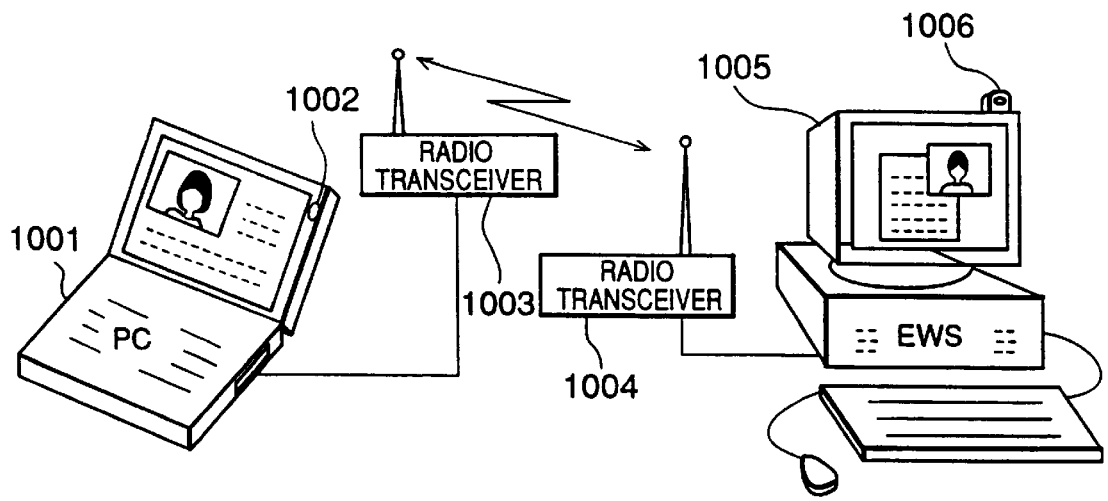
FIGS. 41A to 41C are views for explaining one application of the present invention.

As shown in FIG. 41A, an input motion picture signal from a camera 1002 attached to a personal computer (PC) 1001 is encoded by a motion picture coding apparatus incorporated into the PC 1001. The output coded data from the motion picture coding apparatus is multiplexed with information of voice or data, transmitted by radio by a radio transceiver 1003, and received by another radio transceiver 1004.

The signal received by the radio transceiver 1004 is decomposed into the coded data of the motion picture signal and the information of voice or data. The coded data of the motion picture signal is decoded by a motion picture decoding apparatus incorporated into a workstation (EWS) 1005 and displayed on a display of the EWS 1005.

An input motion picture signal from a camera 1006 attached to the EWS 1005 is encoded in the same manner as above by a motion picture coding apparatus incorporated into the EWS 1005. The coded data of the motion picture signal is multiplexed with information of voice or data, transmitted by radio by the radio transceiver 1004, and received by the radio transceiver 1003. The signal received by the radio transceiver 1003 is decomposed into the coded data of the motion picture signal and the information of voice or data. The coded data of the motion picture signal is decoded by a motion picture decoding apparatus incorporated into the PC 1001 and displayed on a display of the PC 1001.

Figure 41B:
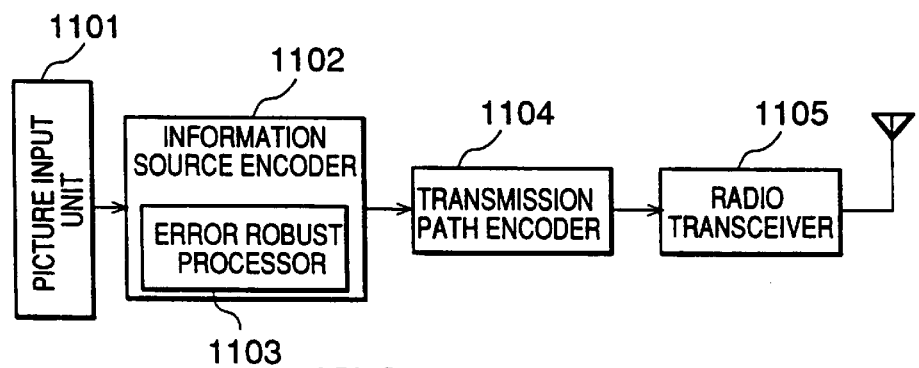

FIG. 41B is a block diagram schematically showing the arrangement of the motion picture coding apparatus incorporated into the PC 1001 and the EWS 1005 shown in FIG. 41A. FIG. 41C is a block diagram schematically showing the arrangement of the motion picture decoding apparatus incorporated into the PC 1001 and the EWS 1005 shown in FIG. 41A.

The motion picture coding apparatus shown in FIG. 41B comprises an information source encoder 1102 which is supplied with a picture signal from a picture input unit 1101 such as a camera and has an error robust processor 1103, and a transmission path encoder 1104. The information source encoder 1101 performs discrete cosine transformation (DCT) for a prediction residue signal and quantizes the generated DCT coefficient. The transmission path encoder 114 performs variable length encoding, error detection for coded data, and error correction encoding. The output coded data from the transmission path encoder 1104 is supplied to the radio transceiver 1105 and transmitted. The processing in the information source encoder 1101 and the variable length encoding in the transmission path encoder 1104 are performed by using the processing methods explained in the embodiments of the present invention.

Figure 41C:
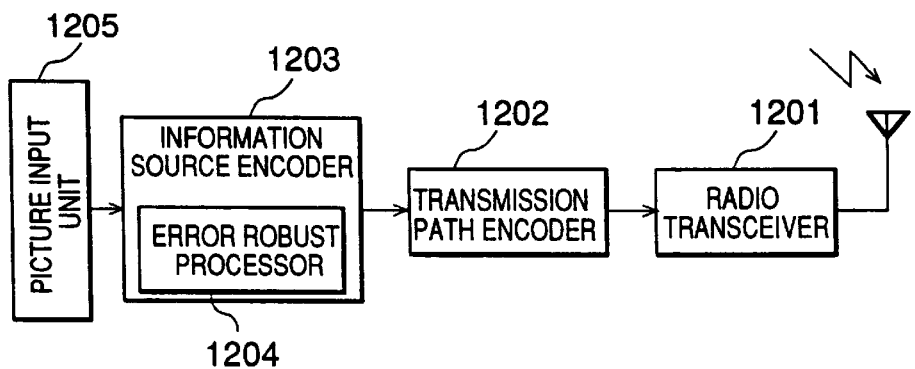

The motion picture decoding apparatus shown in FIG. 41C comprises a transmission path decoder 1202 and an information source decoder 1203. The transmission path decoder 1202 is supplied with the coded data received by a radio transceiver 1201 and performs processing which is the reverse of the processing performed by the transmission path encoder 1104. The information source decoder 1203 is supplied with the output signal from the transmission path decoder 1202 and performs processing which is the reverse of the processing performed by the information source encoder 1102. The information source decoder 1203 has an error robust processor 1204. The picture decoded by the information source decoder 1203 is output by a picture output unit 1205 such as a display.

The decoding operations in these decoders are performed by using the processing methods as explained in the embodiments of the present invention.

In the present invention, the amount of codes of alpha maps can be greatly reduced. Accordingly, the background and the object can be separately encoded with no large decrease in the encoding efficiency compared to conventional encoding methods.

A ninth embodiment for Encoding Motion Vector (MV) for Alpha Map will be described hereinafter.

In the above-described "Second Embodiment", a method of encoding a video image using the correlation between frames has been described in which the line of a previous frame is used as a reference line, and the correlation between the frames is used to increase the encoding processing efficiency. This method is used for processing in units of MB lines (in one line unit in the line direction of a macro block). As is apparent, even with processing in units of MB lines, the generality is maintained.

An embodiment will be described below in which encoding using the correlation between frames is performed in units of macro blocks, thereby increasing the encoding processing efficiency.

In this embodiment, the correlation between a motion compensation prediction (MC) signal of an alpha map and the signal of the MB (macro block) is evaluated in units of MBs. If the evaluation value is smaller than a predetermined threshold value, the MC signal is copied to the MB (to be referred to as copy encoding hereinafter). If the evaluation value is larger than the threshold value, the MB is encoded using the binary picture coding method of the present invention.

In performing copy encoding, when the correlation between the "MV (motion vector) of the alpha map" and the "MV (motion vector) of a Y (luminance) signal " is very high, the MV obtained on the basis of this Y signal is used without any processing. With this operation, copy encoding is enabled without using the amount of codes for the "MV of the alpha map".

Japanese Patent Application No. 8-116542 discloses an invention in which a signal obtained by blending an alpha map and a Y signal (this processing is generally referred to as alpha blending) is used to detect an MV (motion vector), thereby detecting a common MV (this MV (motion vector) will be represented as MVYA hereinafter) for the alpha map and the Y signal.

More specifically, when MC (motion compensation prediction) of the alpha map is performed using the "MVYA" as a common motion vector for the alpha map and the Y signal, no MV information is necessary for copy encoding of the alpha map. That is, the information of the motion vector of the alpha map is unnecessary in copy encoding of the alpha map.

In this case, however, although the amount of codes of the alpha map is reduced, no optimum MV for the Y signal is detected. Therefore, an MV error value (the error value of the motion compensation prediction signal of the alpha map) of the Y signal may increase to decrease the encoding efficiency in the entire encoding system.

This corresponds to a case in which an optimum motion vector MVY for the Y signal is detected, or a case in which an optimum motion vector MVA for the alpha map is detected. In such a case, the encoding efficiency inevitably decreases.

Figure 42A:
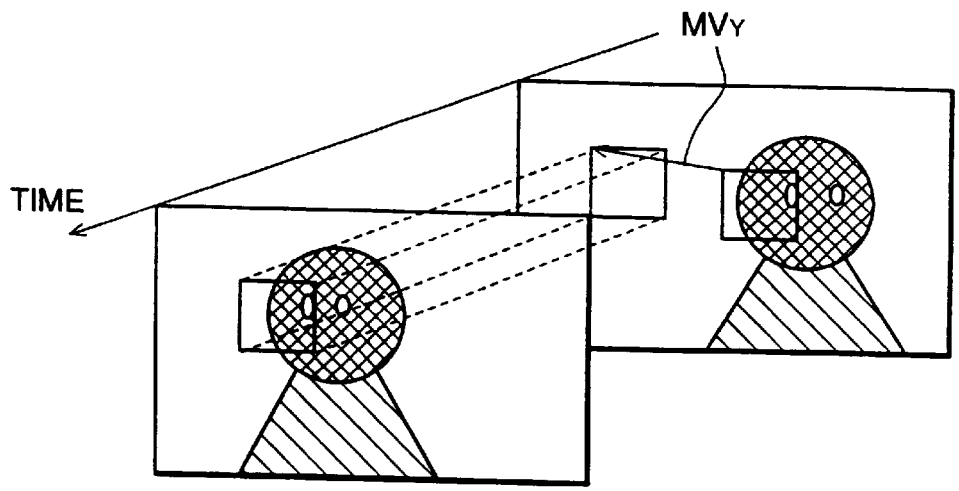
FIGS. 42A to 42C are views showing an example of MV detection and encoding of an alpha map, so as to explain the eighth embodiment of the present invention.
Figure 42B:
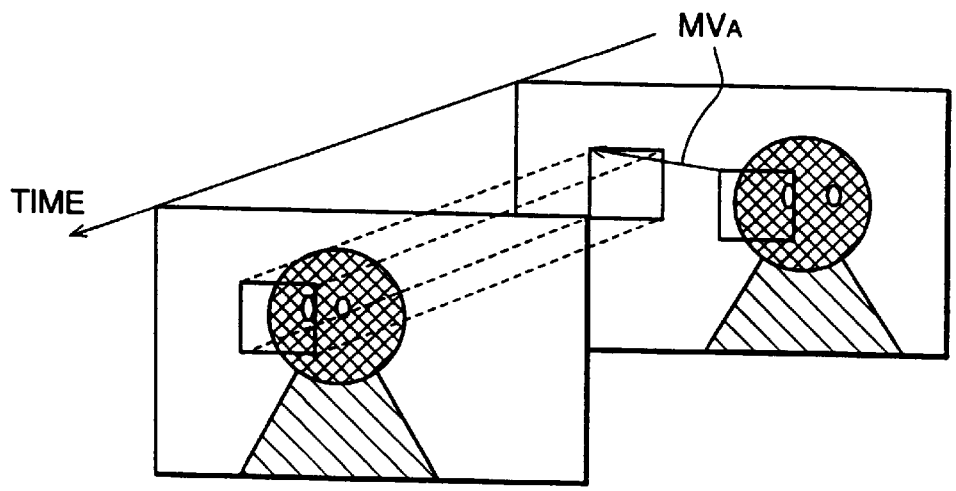

More specifically, the encoding efficiency may decrease in a case shown in FIG. 42A or 42B. Of these examples, in the case shown in FIG. 42A, the optimum motion vector MVY for the Y signal is detected. A description will be made while paying attention to the partial image of a certain macro block at a certain point of time. A position indicated by the motion vector MVY for the Y signal, which is detected in the previous frame, matches a position where the partial image appears in the subsequent frame. The error evaluation value used here means an error value in a pixel value contained in an object.

FIG. 42B shows a case in which the optimum motion vector MVA for the alpha map is detected. A description will be made while paying attention to the contents of the alpha map at a certain macro block at a certain point of time. A position indicated by the motion vector MVA for the contents of the alpha map, which is detected in the previous frame, matches a position where the contents of the alpha map appear in the subsequent frame. The error value used here means the number of mismatched pixels of the alpha map.

The vector MVYA is an MV (motion vector) similar to the vector MVA rather than the vector MVY. For this reason, comparing to a case in which the optimum value MVA is used, the amount of codes of alpha map encoding rarely increases.

On the other hand, even when the vector "MVY" used as a common MV, copy encoding is not selected because the MC error (motion compensation prediction error) of the alpha map increases, so the alpha map encoding efficiency is not increased.

Figure 42C:
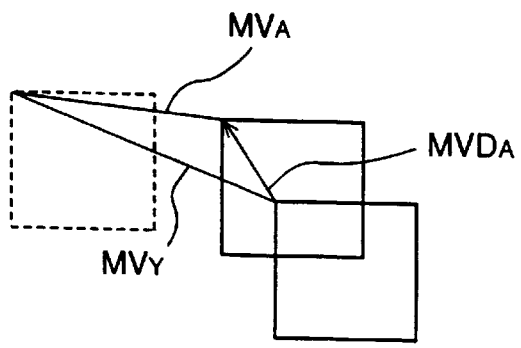

To solve the above problem, as shown in FIG. 42C, a difference MVDA between the optimum motion vector MVA for the alpha map and the optimum motion vector MVY for the luminance signal is obtained, and the obtained difference MVDA is efficiently encoded. By calculating the difference between the vectors MVA and MVY and encoding the difference, the alpha map encoding efficiency can be increased without decreasing the encoding efficiency of the Y signal (luminance signal).

If the value MVDA as the difference between the vectors MVA and MVY has a large value, the amount of codes in binary picture encoding of the block may be smaller than the amount of codes of the motion vector. In addition, since the value MVDA is a difference vector from the vector MVY, the dynamic range is small.

When the maximum value of the search range of the vector MVDA is limited to be smaller than the search range of the vector MVY, the amount of codes of the vector MVDA may be traded off for that in binary picture encoding. When the search range of the vector MVDA is limited, the encoding table for the vector MVDA is smaller than the encoding table for encoding the vector MVY (what is actually encoded is the prediction error of the vector MVY, and the dynamic range of this prediction error is twice that of the vector MVY). Therefore, the encoding efficiency is further increased by designing a small variable length code table for the vector MVDA.

To practice the ninth embodiment, the optimum motion vector MVA for the alpha map must be detected. A detailed example of this detection operation will be described.

Assume that the vector MVY for the Y signal (the optimum motion vector for the Y signal) has already been sent. The vector MVDA corresponding to the difference between the vectors MVA and MVY is detected around a position indicated by the vector MVY. As described above, copy encoding of the alpha map is executed when the MC error (motion compensation prediction error) of the alpha map becomes smaller than a predetermined threshold value. The error is evaluated from the central position to the outside, and the vector MVDA at a position where the error becomes smaller than the threshold value for the first time is used.

The smallest MVDA is detected and used. Generally, as the value MVDA is smaller, a short code is assigned, so that the vector MVDA is efficiently encoded.

Encoding of the motion vector has been described above. A method of encoding the attribute information of a macro block in units of frames is also available. This method will be described below as the 10th embodiment. (10th Embodiment)

An embodiment in which the attribute information of each macro block is encoded in units of frames will be described as the 10th embodiment.

FIG. 38 in the sixth embodiment shows the attribute of each block (macro block MB) in block-based binary picture encoding of the present invention. The attribute information of the block (MB) must be encoded independently of the binary picture encoding information.

FIG. 43A is a view as reillustration of FIG. 38. Referring to FIG. 43A, a macro block indicating only a "white" portion is represented by MBwh, a macro block indicating both the background and the person is represented by MBot, and a macro block indicating only a "black" portion is represented by MBbk. The macro block MBwh of only the "white" portion is labeled as "0", the macro block MBot of both the background and the person is labeled as "1", and the macro block MBbk of only the "black" portion is labeled as "3". FIG. 43A represents block type information shown in FIG. 43B. The block type information is the attribute information of an MB.

There are three labels such as "0", "1", and "3", and each information can be expressed by two bits. That is, a decimal digit "0" is expressed by "00" in binary notation; "1", by "01"; and "3", by "11".

Since the block type information can be expressed in two bits, this information can be decomposed into the upper bit (MSB) and the lower bit (LSB), as shown in FIG. 43C. In FIG. 43C, Bpo indicates that the original block type information is (MB attribute information); Bpl, the bit plane of lower bits (LSBs) obtained by decomposing the information Bpo into bit planes; and Bpm, the bit plane of upper bits (MSBs) obtained by decomposing the information Bpo.

Generally, when the block attribute information of the alpha map, which represents whether a block indicates an object, as shown in FIG. 43A, is labeled as in FIG. 43B, and the information is decomposed into the upper and lower bit planes Bpl and Bpm in FIG. 43C, "0" and "1" tend to gather in both the bit planes. That is, the correlation can be kept in both the MSB and the LSB.

Figures 44, 45A, 45B:
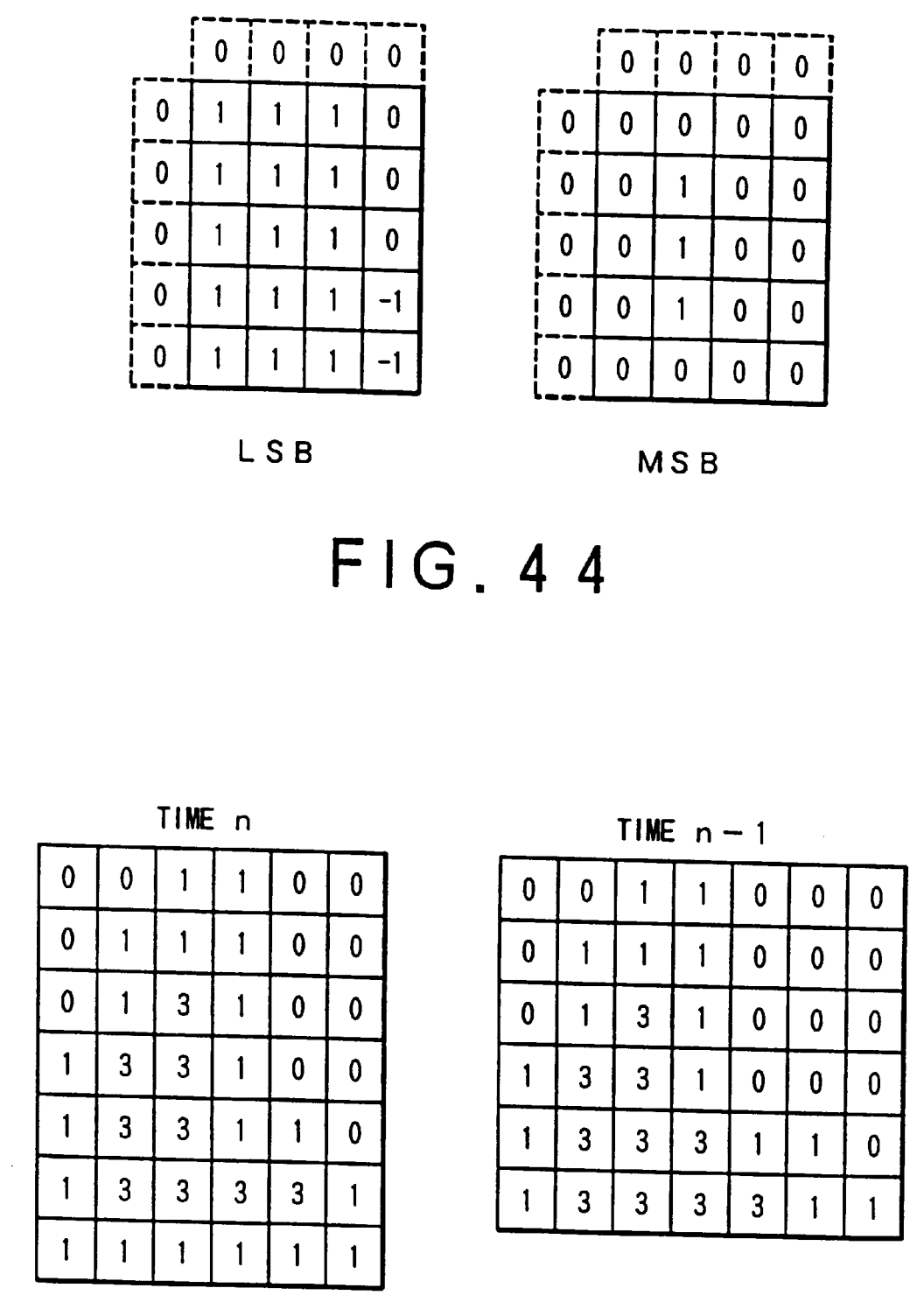

FIG. 44 is a view showing an example in which each bit plane shown in FIG. 43C is encoded by block-based MMR of the present invention. As shown in FIG. 44, when each bit plane is encoded by highly efficient binary picture encoding, the amount of codes of the block attribute information can be largely reduced as compared to that in encoding in units of blocks.

In addition, the binary picture encoding method of encoding the attribute of a block is made identical to the binary picture encoding method of encoding each block, thereby relaxing the complexity of the entire encoding system.

The detailed example of the method of encoding the block attribute information has been described above. Another method of encoding the block attribute information will be described next.

FIGS. 45A and 45B are views showing examples of the attribute information of a certain macro block at time n and at time n–1. As shown in FIG. 42A, a square region is set such that the upper left portion of the object contacts the boundary portion of the region. In this case, similar labeling is performed for both the alpha maps of frames in a short time, like the example of the block attribute information at time n shown in FIG. 45A and the example of the block attribute information at time n–1 shown in FIG. 45B. The correlation of labeling between the frame is high. Therefore, when the label of the current frame is encoded using the label of a frame which has already been encoded, the encoding efficiency is largely increased.

In some cases, the size of the region at time n is different from that at time n−1. In this case, with procedures shown in, e.g., FIGS. 46A and 46B, the size of the region at time n−1 is made to match that at time n. For example, when the macro block at time n is larger by one row and smaller by one column than that at time n−1, the rightmost column of the macro block at time n−1 is cut, and thereafter, the lowermost row is copied to its lower portion to increase the size by one row. FIG. 46B is a view showing this state.

When the macro block at time n−1 is smaller by one column and larger by one row than that at time n, the lowermost row is cut, and thereafter, the rightmost column is copied to its adjacent portion to increase the size by one column.

When the size changes, the sizes are made to match in this manner. The method of matching the sizes is not limited to that described above. For the descriptive convenience, the label of the macro block at time n−1 whose size is equal to that at time n will be represented as the label at time n−1' hereinafter.

FIG. 47A is a view showing the difference between the attribute information of the macro block at time n and that at time n−1', i.e., the difference between the labels of corresponding pixels. In FIG. 47A, "S" represents that the "labels match each other", and "D" represents that the "labels do not match each other".

FIG. 47B is a view showing the differences between the labels at adjacent pixel positions in the attribute information of the macro block at time n. For a label at the left end, the difference with respect to the label at the right-end pixel position one line above the label at the left end is obtained. For a label at the upper left pixel position, the difference with respect to "0" is obtained. For the descriptive convenience, the method shown in FIG. 47A will be referred to as interframe encoding, and the method shown in FIG. 47B will be referred to as intraframe encoding hereinafter.

As is apparent from FIGS. 47A and 47B, the ratio of "S" in interframe encoding is higher than that in intraframe encoding. Since interframe encoding can perform prediction at a higher probability, reduction of the amount of codes can be achieved.

FIG. 49 is a view showing an example of a variable length encoding table for encoding each label.

When a label to be encoded matches the predictive value (interframe: the label of the previous frame, intraframe: the adjacent label) (in case of "S"), encoding is performed by one-bit codes. When the label does not match the predictive value (in case of "D"), encoding is performed by two-bit codes. With this method, the amount of codes can be reduced.

In interframe encoding, the ratio of "S" is high. Therefore, the encoding efficiency can be further increased by encoding a plurality of labels at once.

FIG. 48 is a view showing an example in which whether all the differences between the labels in one line are "S" is represented by a one-bit code. In this case, only the labels of lines where all the differences are not "S" are encoded. Therefore, the amount of codes is largely reduced.

When the correlation between frames is extremely small, the encoding efficiency may be lower than that in intraframe encoding. In this case, switching between intraframe encoding using one-bit codes and interframe encoding is enabled such that intraframe encoding can also be performed. The frame which is to be encoded first is subjected to intraframe encoding because it has no label to be referred to, as a matter of course. At this time, no code for switching between interframe encoding and intraframe encoding is needed.

Figure 50A:
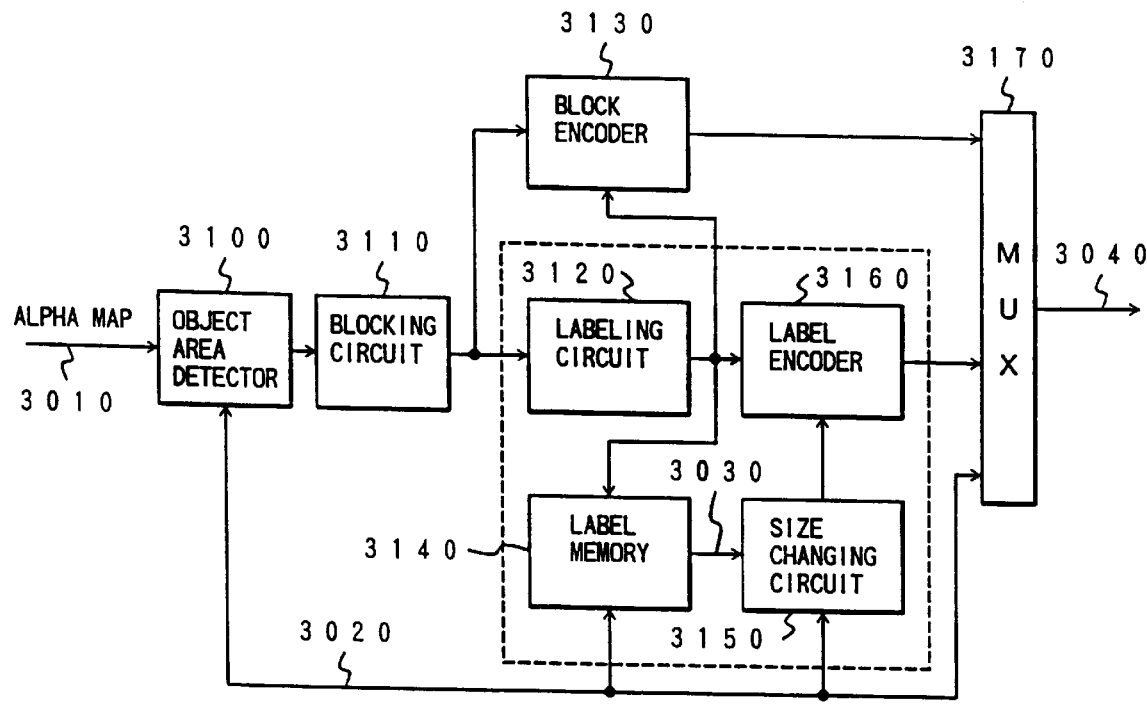
FIGS. 50A and 50B are block diagram showing examples of the arrangements of a decoding apparatus and a coding apparatus of the present invention, respectively, so as to explain the 10th embodiment of the present invention.
Figure 50B:
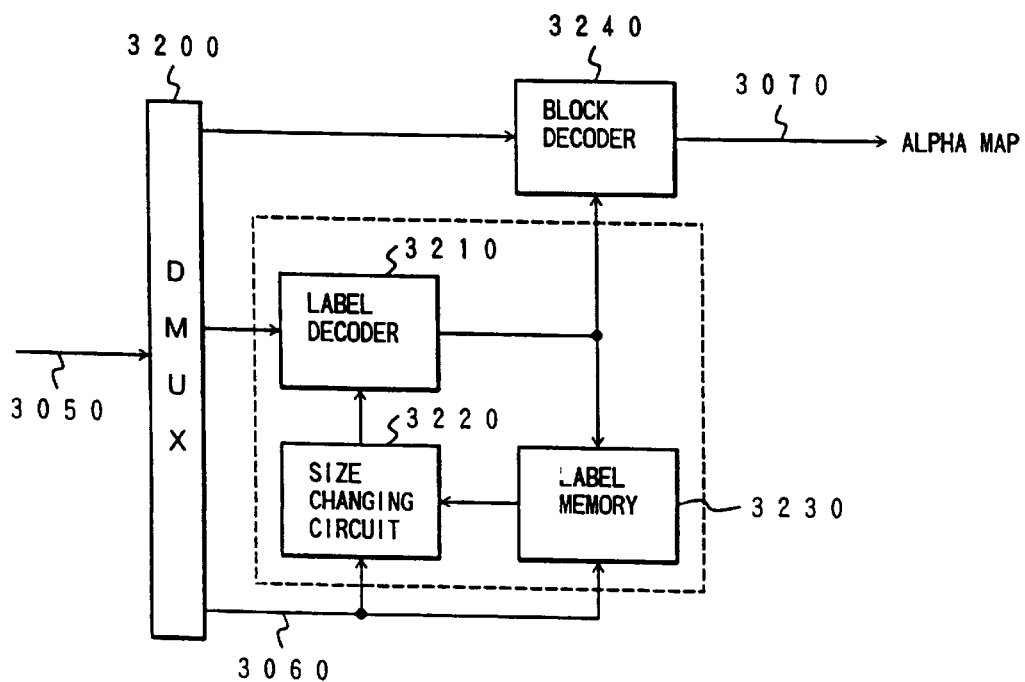

FIGS. 50A and 50B are block diagrams of the system of this embodiment, and the flow of the process will be described with reference to FIGS. 50A and 50B.

In FIGS. 50A and 50B, parts enclosed by broken lines are associated with this embodiment. FIG. 50A shows a coding apparatus comprising an object region detector 3100, a block forming circuit 3110, a labeling circuit 3120, a block encoder 3130, a label memory 3140, a size changing circuit 3150, a label encoder 3160, and a multiplexer (MUX) 3170.

The object region detector 3100 detects, on the basis of an input alpha-map signal, a square region for a portion including an object in the alpha-map signal, and outputs the alpha-map signal of the square region together with information associated with the size of the square region. The block forming circuit 3110 forms macro blocks from the alpha-map signal of the square region. The labeling circuit 3120 determines the attributes (MBwh (only white), MBot (mixture of white and black), and MBbk (only black)) of the alpha-map signal contents in the macro blocks in units of blocks of the alpha-map signal which has been divided into macro blocks, and assigns a label ("0", "1", or "3") corresponding to each attribute.

For a macro block with label "1", (MBot), the block encoder 3130 encodes the alpha-map signal in the macro block. The label memory 3140 accumulates label information supplied from the labeling circuit 3120 and region size information supplied from the object region detector 3100 through a label memory output line 3020 and also supplies the accumulated label information and size information to the size changing circuit 3150.

The size changing circuit 3150 changes the size of the label information at time n−1 in correspondence with the size at time n, on the basis of the label information and size information of the frame at time n−1, which are supplied from the label memory 3140, and the frame size information at time n, which is supplied from the object region detector 3100. The label encoder 3160 encodes the label information supplied from the labeling circuit 3120 by using the label information changed in size as a predictive value.

The multiplexer 3170 multiplexes the encoded information obtained by the label encoder 2160, encoded information supplied from the block encoder 3130, and the size information supplied from the object region detector 3100 and outputs the information.

In the coding apparatus with this arrangement, the square region including the object is detected by the object region detector 3100 from the alpha-map signal supplied through a line 3010. Information associated with the size of this square region is output through the line 3020. The alpha-map signal in the region is supplied to the block forming circuit 3110. The block forming circuit 3110 forms the macro blocks of the alpha-map signal in this region. The alpha-map signal divided into macro blocks is supplied to the labeling circuit 3120 and the block encoder 3130.

The labeling circuit 3120 determines the attributes (MBwh, MBot, and MBbk) in units of macro blocks and assigns a label ("0", "1", or "3") corresponding to each attribute. This label information is supplied to the block encoder 3130, the label memory 3140, and the label encoder 3160.

The block encoder 3130 encodes the alpha-map signal in the block when the label is "1" (MBot). The encoded information is supplied to the multiplexer 3170. The label memory 3140 accumulates the label information supplied from the labeling circuit 3120 and the region size information supplied through the label memory output line 3020 and outputs the label information and size information to the size changing circuit 3150 through a label memory output line 3030.

The size changing circuit 3150 changes in size the label information at the time n−1 in correspondence with the size at time n, on the basis of the label information and size information of the frame at time n−1, which is supplied through the label memory output line 3030, and the size information at time n, which is supplied through the line 3020, and supplies the size-changed label information at time n−1 to the label encoder 3160. The label encoder 3160 encodes the label information supplied from the labeling circuit 3120 by using the label information supplied from the size changing circuit 3150 as a predictive value, and supplies the encoded information to the multiplexer 3170. The multiplexer 3170 multiplexes the encoded information supplied from the block encoder 3130 and the label encoder 3160 and the size information supplied through the line 3020 and outputs the information through a line 3040.

The arrangement and function of the coding apparatus have been described above. The arrangement and function of a decoding apparatus will be described next.

The decoding apparatus shown in FIG. 50B comprises a demultiplexer (DMUX) 3200, a label decoder 3210, a size changing circuit 3220, a label memory 3230, and a block decoder 3240. The demultiplexer 3200 demultiplexes encoded information supplied through a line 3050. The label decoder 3210 reconstructs the label information at time n by using the label information at time n−1, which has been changed in size and supplied from the size changing circuit 3220.

The size changing circuit 3220 acts like the size changing circuit 3150. The size changing circuit 3220 changes the size of the label information at time n−1 in correspondence with the size at time n, on the basis of the label information and size information of the frame at time n−1, which are supplied from the label memory 3230, and the frame size information at time n, which is demultiplexed and supplied from the demultiplexer 3200. The label memory 3230 acts like the label memory 3140. The label memory 3230 accumulates the label information decoded and supplied from the label decoder 3210 and the region size information supplied from the demultiplexer 3200 and supplies the accumulated label information and size information to the size changing circuit 3220.

The block decoder 3240 reconstructs the alpha-map signal in units of blocks in accordance with the reconstructed label information supplied from the label decoder 3210.

The function of the decoding apparatus with the above arrangement will be described. The demultiplexer 3200 demultiplexes the encoded information supplied through the line 3050 and supplies the information to the block decoder 3240 and the label decoder .3210, and at the same time, outputs the size information through a line 3060. The label decoder 3210 reconstructs the label information at time n by using the label information at time n−1, which has been changed in size and supplied from the size changing circuit 3220, as a predictive value.

The reconstructed label information is supplied to the block decoder 3240 and the label memory 3230.

The block decoder 3240 reconstructs the alpha-map signal in units of blocks in accordance with the reconstructed label information supplied from the label decoder 3210. The size changing circuit 3220 and the label memory 3230 perform the same operations as those of the size changing circuit 3150 and the label memory 3230, respectively, and a detailed description thereof will be omitted.

The coding apparatus which assigns labels to the alpha map in units of macro blocks and encodes the labels of the macro blocks of the current frame by using the labels of the macro blocks of an already encoded frame, and the decoding apparatus have been described above. Similar labels are assigned to the macro blocks of alpha maps in frames close to each other along the time axis. In such a case, the correlation of labels between the frames is high. When the labels of the already encoded frame are used to encode the labels of the current frame, the encoding efficiency can be largely increased.

An encoding system using vector quantization will be described as the 11th embodiment. In this embodiment, to efficiently encode an alpha map, the alpha map is divided into square blocks, and encoding is performed in units of blocks. A reference pattern extracted from part of an already encoded block is used to generate an index table for vector quantization in units of blocks. The index table is used to encode the alpha map by vector quantization.

Figure 51:
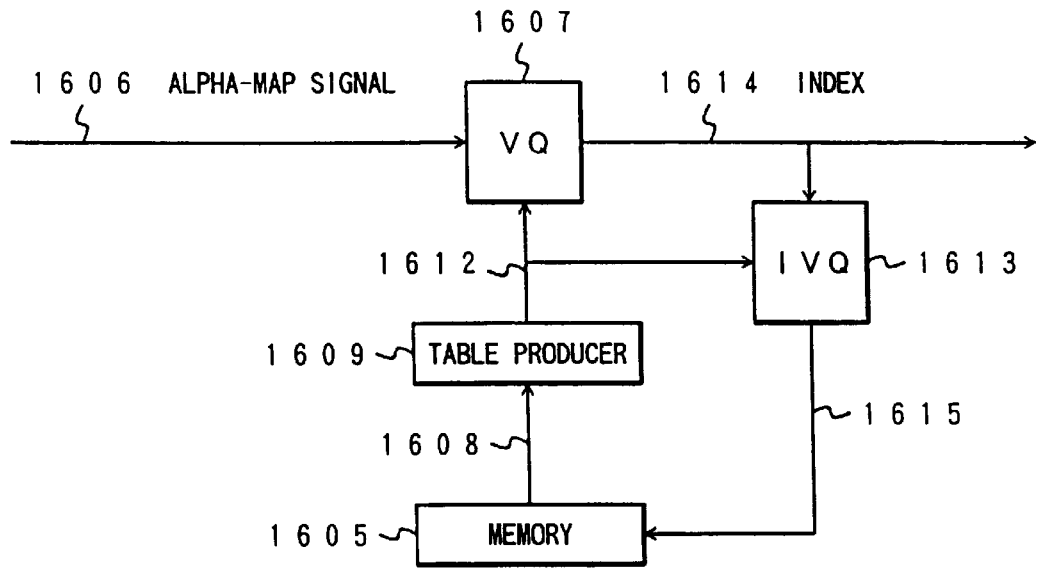
FIG. 51 is a block diagram showing a detailed example of a coding apparatus of the present invention using vector quantization, so as to explain the 11th embodiment of the present invention.

FIG. 51 is a block diagram showing a detailed example of an encoder of the present invention, which uses vector quantization. This encoder comprises a memory 1605, a vector quantizer 1607, an index table generator 1609, and a vector inverse quantizer 1613.

The memory 1605 holds an alpha map whose already encoded portion is decoded. The index table generator 1609 generates an index table 1612 of various pixel patterns on the basis of the information held in the memory 1605. In this table, each pixel pattern of a plurality of macro blocks is made to correspond to an index number. The vector quantizer 1607 obtains, on the basis of an input alpha-map signal 1606 and the index table 1612 output from the index table generator 1609, an index 1614 of one of the pixel patterns in the index table 1612, which has a small error with respect to the alpha-map signal 1606. The vector quantizer 1607 outputs the index 1614.

The vector inverse quantizer 1613 obtains a pixel pattern corresponding to the index 1614 by using the index 1614 output from the vector quantizer 1607 and the index table 1612 output from the index table generator 1609, and at the same time, supplies the obtained pixel pattern to the memory 1605 as a decoded alpha map 1615.

Figure 59:
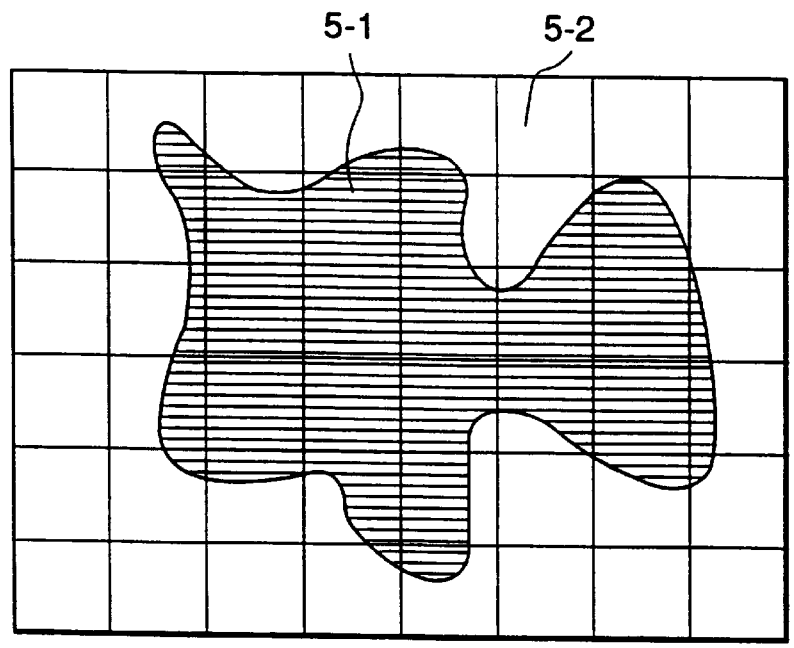
FIG. 59 is a view showing an example of an alpha map so as to explain the 11th embodiment of the present invention.

The decoder with the above arrangement of the this embodiment is arranged at the portion of the alpha-map encoder 200 of the video coding apparatus shown in FIG. 2. An alpha-map signal is input to this encoder, and the index 1614 obtained upon vector quantization of this alpha-map signal is output from the encoder. The alpha-map frame is divided into blocks, as shown in FIG. 59. The blocks are sequentially encoded in an order from the upper left block. A region 5-1 indicated by horizontal lines is an object region. The portion except for the object region is a background region 5-2.

Figure 60:
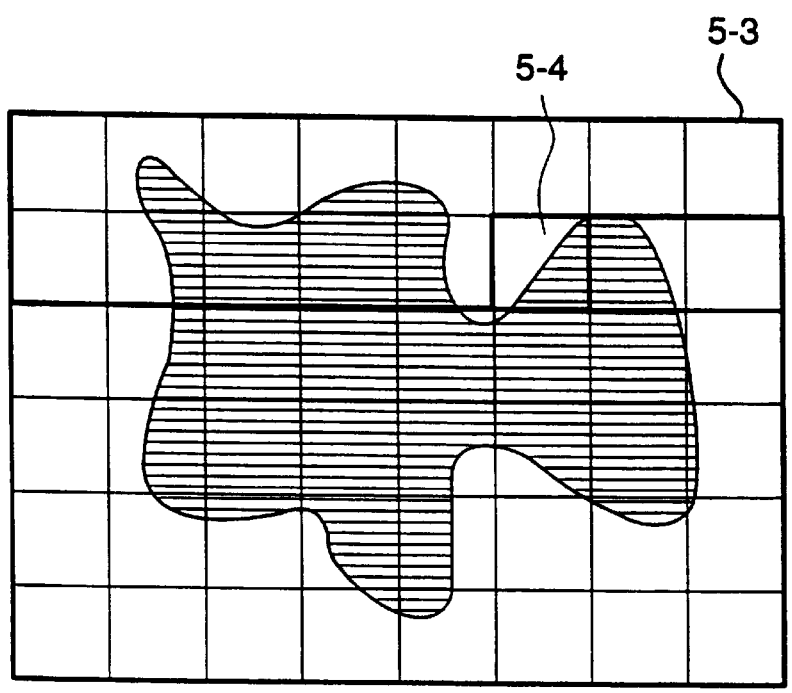
FIG. 60 is a view showing an example of an intermediate encoded/decoded state of the alpha map so as to explain the 11th embodiment of the present invention.
Figure 61:
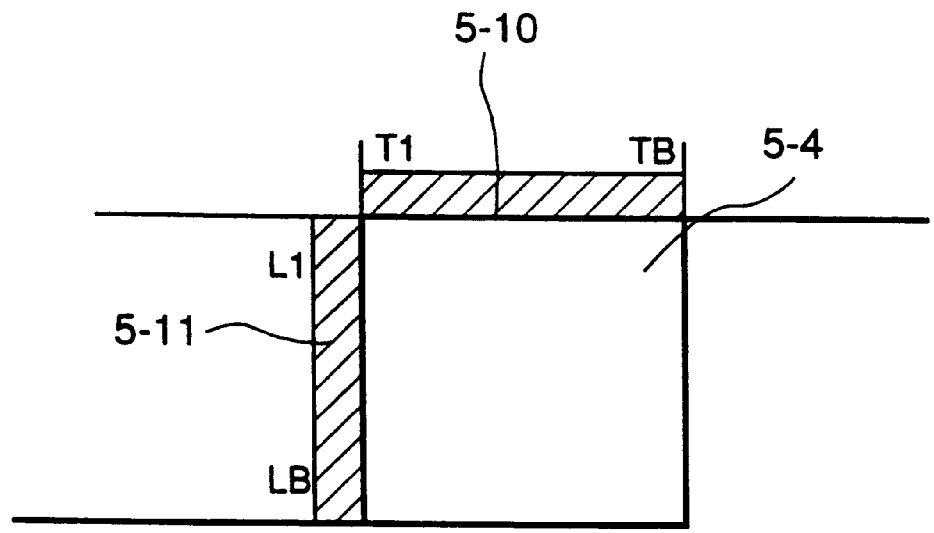
FIG. 61 is a view showing a reference portion so as to explain the 11th embodiment of the present invention.

FIG. 60 is a view showing an intermediate encoded state of the frame. In FIG. 60, a portion 5-3 enclosed by a thick line represents an already encoded portion, and a block 5-4 is being encoded currently. As shown in FIG. 61, to encode the current block 5-4, adjacent pixel strings are used as a top reference pattern 5-10 and a left reference pattern 5-11.

The pixel values of the top reference pattern 5-10 are represented as T1, T2, . . . , and TB from the left side. The pixel values of the left reference pattern 5-11 are represented as L1, L2, . . . , and LB from the upper side. "B" is the number of pixels (block size) of one side of the block.

Referring back to FIG. 51, the encoder of the present invention comprises the memory 1605, the vector quantizer 1607, the index table generator 1609, and the vector inverse quantizer 1613. The memory 1605 holds an alpha map whose already encoded portion is decoded. The alpha-map signal 1606 is input to the vector quantizer 1607. Top and left reference patterns 1608 of the already encoded portion are sequentially read out from the memory 1605 and sent to the index table generator 1609.

On the basis of the reference patterns 1608, the index table generator 1609 generates the index table 1612 used for vector quantization ("Multi-dimensional Signal Processing of TV Image", Nikkan Kogyo Shinbunsha, 1988, pp. 261–262) and sends the index table 1612 to the vector quantizer 1607 and the vector inverse quantizer 1613. The index table makes each pixel pattern of the plurality of macro blocks correspond to an index number.

The vector quantizer 1607 obtains the index 1614 of one of the pixel patterns of the index table 1612 output from the index table generator 1609, which has a small error with respect to the alpha-map signal 1606. The index 1614 is also output and sent to the vector inverse quantizer 1613.

The vector inverse quantizer 1613 obtains a pixel pattern corresponding to the index 1614 by using the index table 1612. The obtained pixel pattern is sent from the vector inverse quantizer 1613 to the memory 1605 as the decoded alpha map 1615.

A detailed example of the index table generator 1609 will be described referring to FIGS. 53 to 55.

Figure 53:
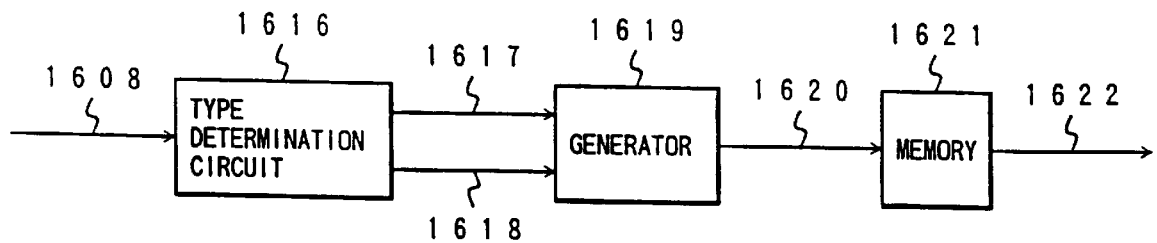
FIG. 53 is a block diagram showing the first example of an index table generator 1609 used in the system of the present invention, so as to explain the 11th embodiment of the present invention.

In the index table generator 1609 having an arrangement shown in FIG. 53, when one of prepared types is designated, the index table corresponding to the designated type is generated. The index table generator 1609 comprises a type determining section 1616 for designating a type to be used, a generator 1619 for generating an index table, and a memory 1621 for holding the generated index table.

In the index table generator 1609 having this arrangement, the reference patterns 1608 are sent to the type determining section 1616.

Several pixel patterns with different tendencies can be selected. When a desired pixel pattern is designated, the type determining section 1616 determines to use the designated one of the several prepared types and sends the information of a type 1617 and the information of a parameter 1618 to the generator 1619. The generator 1619 generates an index table 1620 corresponding to the designated type upon receiving the information and causes the memory 1621 to temporarily hold the generated index table 1620. An index table 1622 is properly output in the encoding process.

Figure 68:
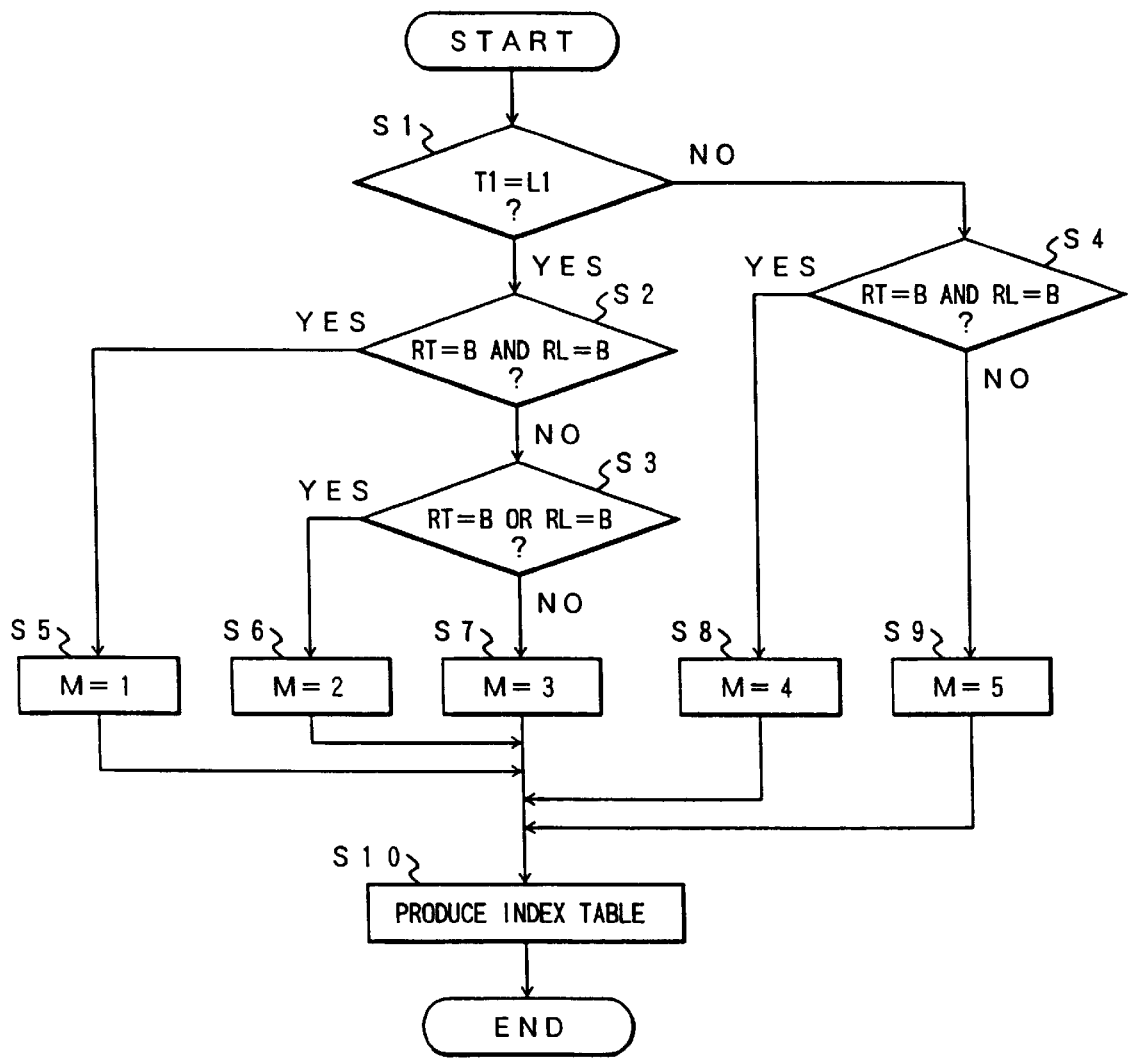
FIG. 68 is a flow chart showing the processing algorithm of the type determining device 1616 used in the present invention, so as to explain the 11th embodiment of the present invention.

FIG. 68 is a flow chart showing the algorithm of processing of the type determining section 1616.

S1: First, the type determining section 1616 determines whether the pixel value T1 of the top reference pattern 5-10 described in FIG. 61 equals the pixel value L1 of the left reference pattern 5-11. If YES in step S1, the flow advances to step S2; otherwise, the flow advances to step S4.

Figure 63:
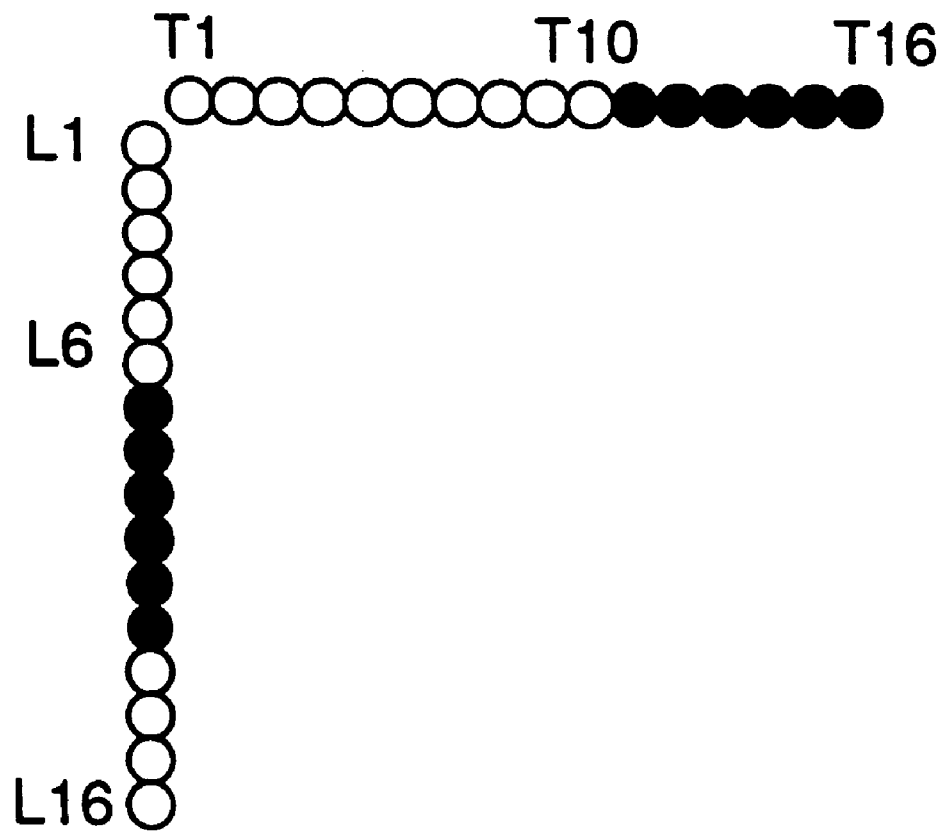
FIG. 63 is a view for explaining "RT" and "RL", so as to explain the 11th embodiment of the present invention.

S2: The pixel string in the row direction of the macro block is viewed from the left side. The first pixel having a value different from the previous pixel value is represented by RT. The pixel string in the column direction is viewed from the upper side. The first pixel having a value different from the previous pixel value is represented by RL. When "RT" equals "B" (the number of pixels of one side of the macro block (block size)), and "RL" equals "B", the flow advances to step S5; otherwise, the flow advances to step S3. The values RT and RL will be described in more detail. The pixel values are sequentially checked in the order of T1, T2, T3, . . . If a pixel value Tk is different from the value T1, RT is represented as k−1. If all the pixel values up to the last pixel TB in the row direction of the macro block equal the pixel value T1, RL=B ("B" is the block size described in FIG. 61). In FIG. 63 (B=16), for example, RT=10.

Similarly, "RL" is associated with the pixel values L1, L2, . . . In FIG. 63, RL=6.

S3: When "RT" equals "B", or when "RL" equals "B", the flow advances to step S6; otherwise, the flow advances to step S7.

S4: When "RT" equals "B", and when "RL" equals "B", the flow advances to step S8; otherwise, the flow advances to step S9.

S5: Type M=1. The flow advances to step S10.
S6: Type M=2. The flow advances to step S10.
S7: Type M=3. The flow advances to step S10.
S8: Type M=4. The flow advances to step S10.
S9: Type M=5. The flow advances to step S10.
S10: An index table is prepared on the basis of "M", "RT", and "RL".

Figure 56:
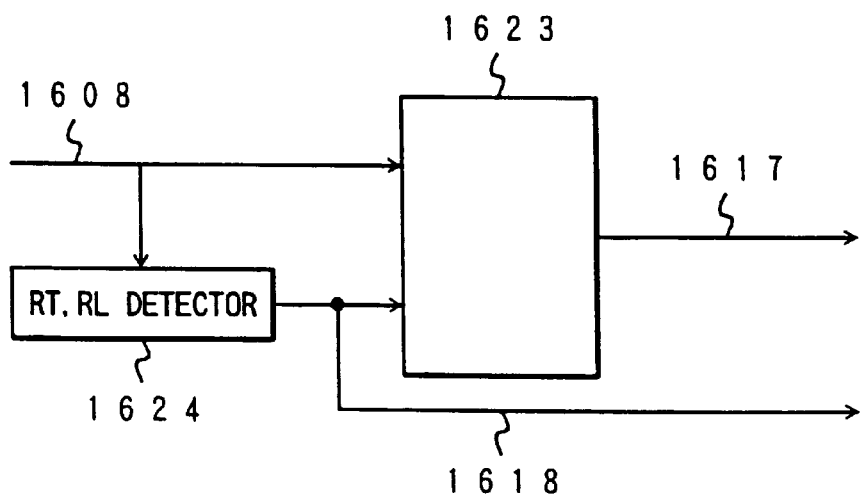
FIG. 56 is a block diagram showing a detailed example of a type determining device 1616 used in the system of the present invention, so as to explain the 11th embodiment of the present invention.

When this algorithm is used, the parameters 1618 output from the type determining section 1616 in FIG. 53 are RT and RL. The type determining section 1616 has an arrangement shown in FIG. 56. The arrangement shown in FIG. 56 comprises a determining section 1623 and an RT/RL detector 1624.

The reference patterns 1608 are input to the determining section 1623 and the RT/RL detector 1624. The RT/RL detector detects RT and RL, which are output as the parameters 1618 and also sent to the determining section 1623. The determining section 1623 determines the type 1617 on the basis of the algorithm shown in FIG. 68 and outputs the type 1617.

FIGS. 70A to 70D are views showing examples of the index table using the type M and RT and RL.

When M=1, all the pixel values of the top reference pattern and the left reference pattern equal each other. Therefore, several predetermined index tables are prepared from pixel patterns without any boundary line crossing the top and left sides, as shown in FIG. 70A.

In FIG. 70A, a hatched portion has values equal to the pixel value T1. More specifically, when T1 is present in the object region, the hatched portion indicates the object, and the white portion indicates the background. When T1 is present in the background region, the hatched portion indicates the background, and the white portion indicates the object.

When M=2, a boundary line crosses the top reference pattern or the left reference pattern, and all the pixel values of the pattern without any boundary line equal each other.

FIG. 70B shows examples in which a boundary line crosses the left reference pattern (RL<B). The boundary line is drawn from the starting point, i.e., a point separated from the uppermost point of the left side by RL, and the angle of the boundary line is changed. When the boundary line crosses the top reference pattern, the boundary line extends from the starting point, i.e., a point separated from the leftmost point of the top side by RT.

When M=3, a boundary line crosses the top side and the left side at points separated from the upper left corner by RT and RL, respectively, as shown in FIG. 70C.

Figure 64A:
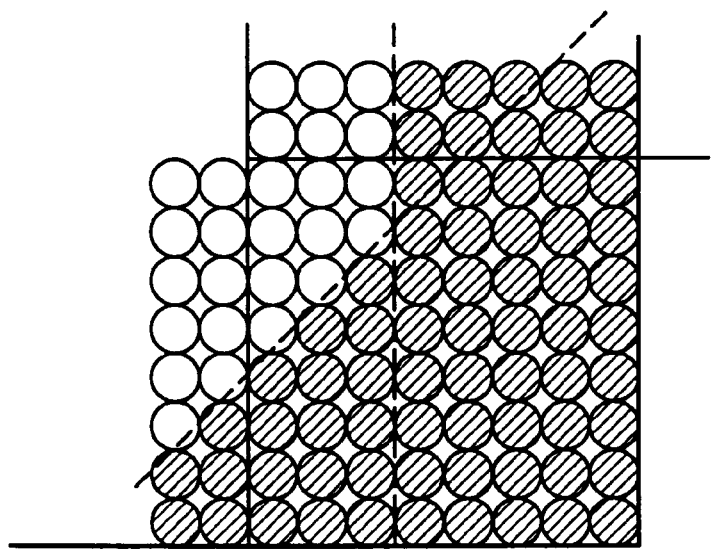
FIGS. 64A and 64B are views for explaining estimation of the directions of boundary lines, so as to explain the 11th embodiment of the present invention.
Figure 64B:
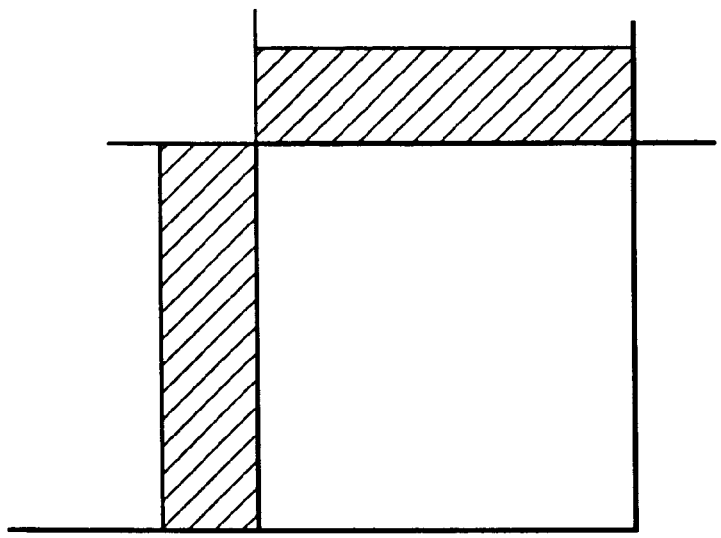

When M=4, the boundary line is present between T1 and L1. The boundary line is drawn from the starting point, i.e., the point at the upper left corner, as shown in FIG. 70D. When a plurality of lines are used as the top and left reference patterns, as shown in FIG. 64B, the direction of the boundary line can be estimated as indicated by a dotted Line in FIG. 64A. Therefore, the pixel pattern can be generated using the estimated boundary line.

FIG. 53 shows the first detailed example of the index table generator 1609 as described above. FIG. 54 shows the index table generator 1609.

Figure 54:
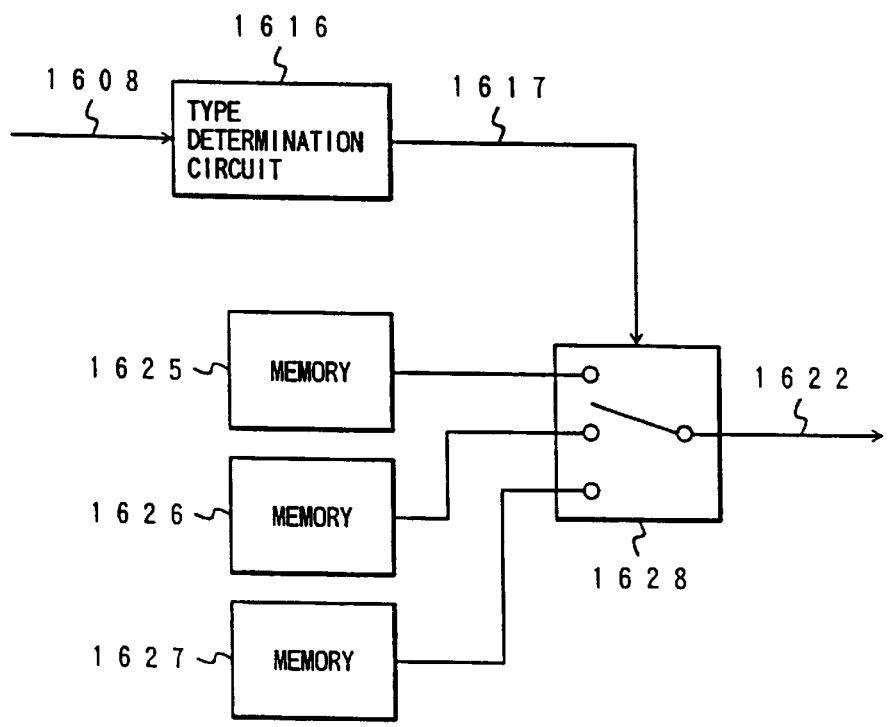
FIG. 54 is a block diagram showing the second example of the index table generator 1609 used in the system of the present invention, so as to explain the 11th embodiment of the present invention.

The index table generator 1609 having an arrangement shown in FIG. 54 comprises the type determining section 1616, memories 1625 to 1627, and a switch 1628. This index table generator 1609 generates index tables according to the respective types before the encoding process and stores the index tables in the memories 1625 to 1627 in units of types. Each of the memories 1625 to 1627 exclusively stores an index table.

The switch 1628 selects one of the memories 1625 to 1627 to make use of the index table stored in the selected memory.

In the index table generator 1609 having the above arrangement, the type 1617 is determined by the type determining section 1616 on the basis of the reference patterns 1608, as in the example shown in FIG. 53. In the second example, however, the parameter 1618 is not output from the type determining section 1616. The index tables formed according to the respective types before the encoding process are held in the different memories 1625 to 1627.

The switch 1628 is changed over in accordance with the type 1617, and the index table 1622 according to the type 1617 is output.

In the second example, although a lot of memories are needed unlike the example shown in FIG. 53, calculation for generating indices is unnecessary.

Still the arrangement of the third example of the index table generator 1609 will be described below.

Figure 55:
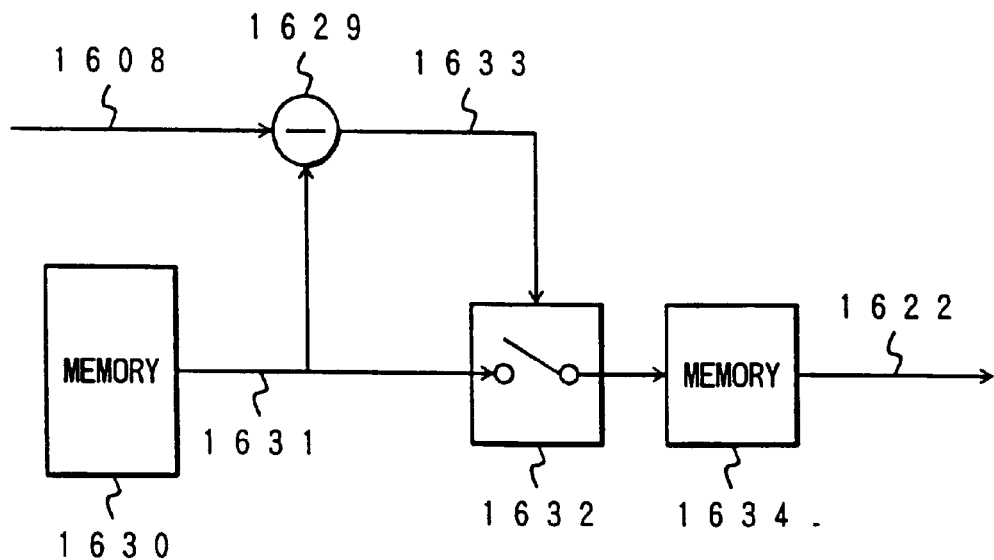
FIG. 55 is a block diagram showing the third example of the index table generator 1609 used in the system of the present invention, so as to explain the 11th embodiment of the present invention.

FIG. 55 is a block diagram showing the third example of an index table generator comprising an evaluating section 1629, a memory 1630, a switch 1632, and a memory 1634. The third example performs no type determination unlike the above examples instead, an evaluation value representing the degree of continuity of the boundary lines of reference patterns and a predetermined pixel pattern is obtained and used.

Figure 65A:
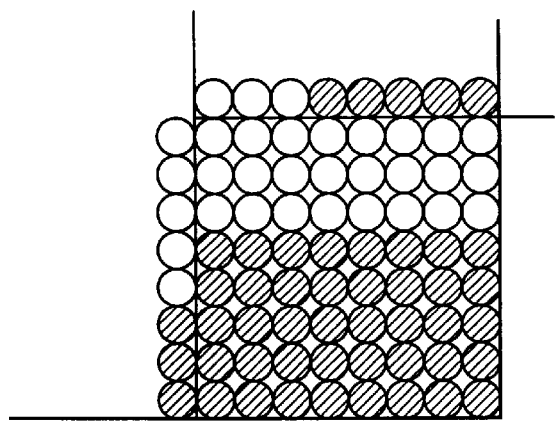
FIGS. 65A and 65B are views for explaining an example of calculation of an evaluation value used in the present invention, so as to explain the 11th embodiment of the present invention.
Figure 65B:
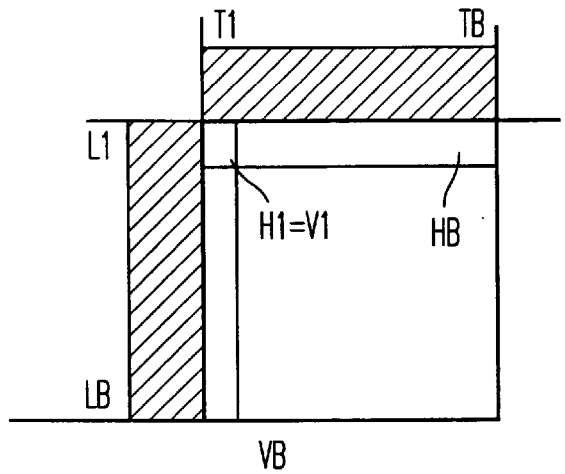

As shown in FIG. 65B, the pixel values T1, T2, . . . of the top reference pattern are compared with pixel values H1, H2, . . . of the pixel pattern at the upper end, and the pixel values L1, L2, . . . of the left reference pattern are compared with pixel values V1, V2, . . . of the pixel string at the left end. The sum of the number of i={1, 2, 3, . . . , B} which satisfies Ti=Hi and the number of j={1, 2, 3, . . . , B} which satisfies Lj=Vj is obtained as an evaluation value.

In FIG. 65A, Ti=Hi and Lj=Vj are satisfied when i=1, 2, 3, and j=1, 2, 3, 6, 7, 8. Therefore, the evaluation value is "9".

Referring back to FIG. 55, the memory 1630 holds various pixel patterns in advance, including those shown in FIGS. 70A to 70D. The evaluating section 1629 obtains the evaluation value representing the degree of continuity of the boundary lines of the reference patterns and a pixel pattern (supplied from the memory 1630). The switch 1632 controls an output from the memory 1630. The memory 1634 holds information supplied through the switch 1632. The switch 1632 is opened/closed in accordance with an opening/closing signal output from the evaluating section 1629 in correspondence with the evaluation value.

The reference patterns 1608 read out from the memory 1605 as one of the constituent elements of the coding apparatus are sent to the evaluating section 1629. Various pixel patterns 1631 held in advance in the memory 1630, including those shown in FIGS. 70A to 70D, are sequentially sent to the evaluating section 1629 and the switch 1632.

The evaluating section 1629 obtains the above-described evaluation value for the reference patterns 1608 and the pixel pattern 1631. When the evaluation value is smaller than a predetermined value, the evaluating section 1629 sends a switching signal 1633 to the switch 1632 so that the switch 1632 is connected.

In this case, the pixel pattern 1631 is recorded in the memory 1634 and set in the index table. When the evaluation value is larger than the predetermined value, the switching signal 1633 is sent to the switch 1632 so that the switch 1632 is disconnected. The pixel pattern 1631 is not sent to the memory 1634.

When evaluation of a predetermined number of pixel patterns prepared in the memory 1630 is completed, indices are sequentially added to the pixel patterns recorded in the memory 1634, and the index table 1622 is output. The evaluation may be ended when a predetermined number of pixel patterns are recorded in the memory 1634.

Alternatively, a predetermined number of pixel patterns may be sequentially selected from those in the memory 1630 in the order of decreasing the evaluation value. In this case, the predetermined number of pixel patterns 1631 and their evaluation values are recorded in the memory 1634.

When the evaluation value of a pixel pattern which is currently being evaluated is larger than the smallest one of the recorded evaluation values, the two pixel patterns may be exchanged.

In the example shown in FIG. 55, although the relatively large memory 1630 is needed, calculation for type determination is advantageously unnecessary.

Of the examples shown in FIGS. 53 to 55, an appropriate arrangement may be employed in accordance with the allowance for calculation and memory capacity in the application system.

The index table generator 1609 shown in FIG. 51 has been described above.

Figure 66:
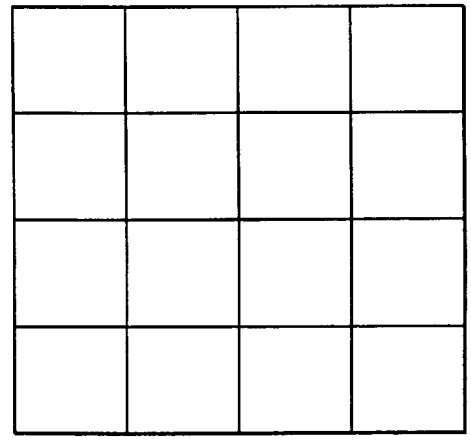
FIG. 66 is a view for explaining a block for determining an error allowance condition, so as to explain the 11th embodiment of the present invention.
Figure 69:
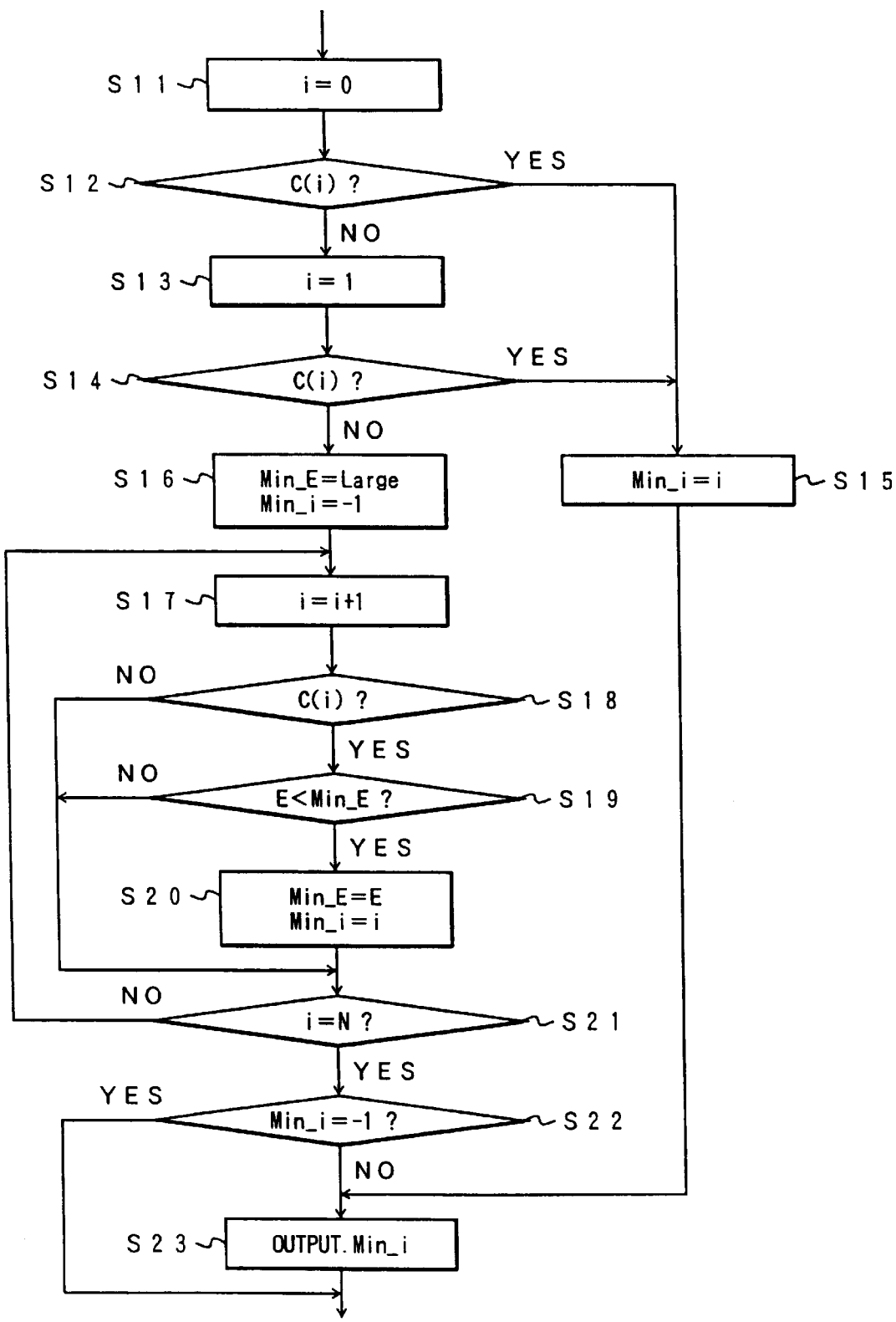
FIG. 69 is a view for explaining an algorithm used by a vector quantizer 1607 shown in FIG. 51, so as to explain the 11th embodiment of the present invention.

FIG. 69 is a flow chart showing the algorithm of the vector quantizer 1607 shown in FIG. 51. C(i) represents the allowance condition of the error of the original image of an input alpha map and a pixel pattern. For example, a block consisting of B×B pixels is "divided into 16, i.e., (B/4)×(B/4) pixel blocks (FIG. 66), and the sum of the absolute values of the errors of the respective pixels of the original image and a pixel pattern i does not exceed α, where α is a threshold value. The sum of the absolute values of the errors of the respective pixels corresponds to the number of mismatched pixels. In other words, α is determined such as 0 pixel, one pixel, two pixels, . . . , B2/16 pixels.

Unless this condition is satisfied, the pixel pattern is not selected. In addition, "E" is the sum of the absolute values of the errors of the B×B pixels as a whole. The flow chart shown in FIG. 69 will be described.

S11: The index is set as i=0. The flow advances to step S12.

S12: If the pixel pattern i satisfies C(i), the flow advances to step S15; otherwise, the flow advances to step S13.

S13: The index is set as i=1.

S14: If the pixel pattern i satisfies C(i), the flow advances to step S15; otherwise, the flow advances to step S16.

S15: Mini=i. The flow advances to step S23.

S16: A sufficiently large value is substituted into MinE, thereby setting Mini=1. The flow advances to step S17.

S17: (i+1) is substituted into i. The flow advances to step S18.

S18: If the pixel pattern i satisfies C(i), the flow advances to step S19; otherwise, the flow advances to step S21.

S19: If E is smaller than MinE, the flow advances to step S20; otherwise, the flow advances to step S21.

S20: E is substituted into MinE, thereby setting Mini=i. The flow advances to step S21.

S21: If i equals a last value N of the index, the flow advances to step S22; otherwise, the flow returns to step S17.

S22: If Mini=-1, no index is determined for the block, and the processing is ended; otherwise, the flow advances to step S23.

S23: Mini is output as the index for the block, and the processing is ended.

In this algorithm, the pixel pattern "0" or the pixel pattern "1" is determined immediately when C(i) is satisfied, without calculating "E".

With this arrangement, when a code shorter than other indices is assigned to the index of the pattern "0" or "1", the amount of codes can be reduced. For example, a pixel pattern of a block corresponding to an object region, or a pixel pattern of a block corresponding to a background region is assigned to "0" or "1".

Figure 67A:
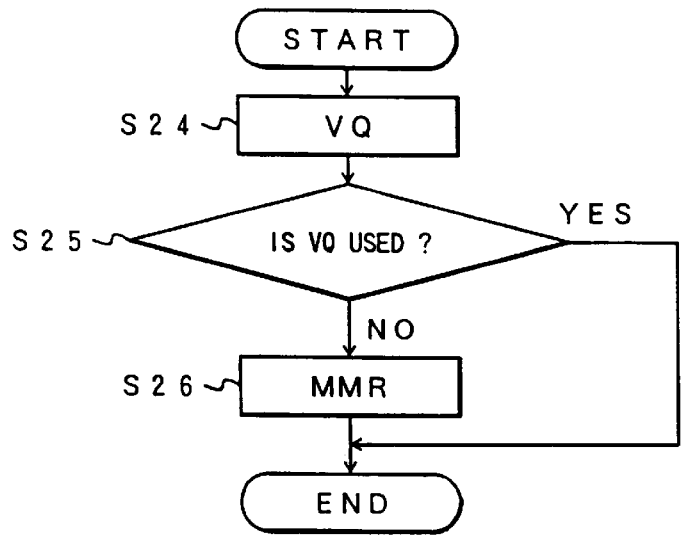
FIGS. 67A and 67B are flow charts showing coding shemes of the present invention so as to explain the 11th embodiment of the present invention.

For a block where no index is determined, another encoding method other than vector quantization (VQ) may be used to encode the block, as shown in the flow chart of FIG. 67A.

In the flow chart of FIG. 67A, the block for which no index is determined is encoded by vector quantization (VQ) first (S24). If an index is determined, the processing is ended (S25). Otherwise, the flow advances to step S26. In step S26, encoding is performed by MMR, and the processing is ended.

Figure 67B:
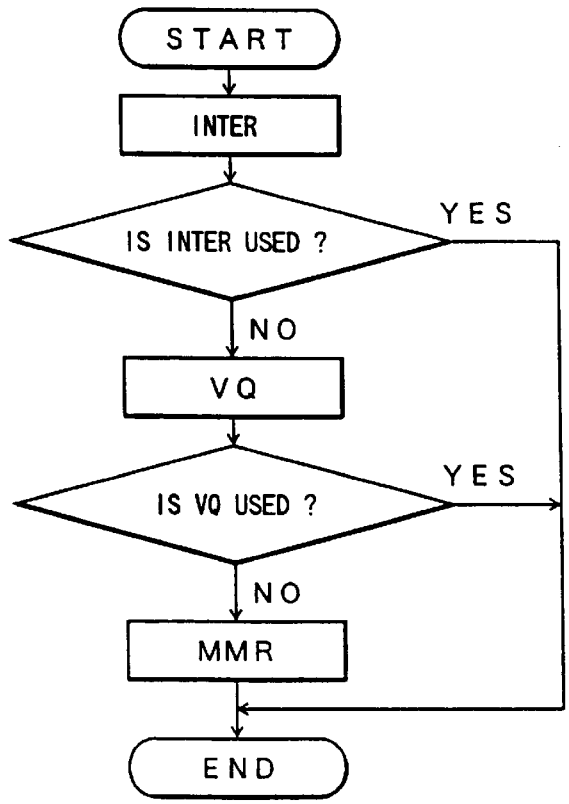

In a case of using an inter mode of performing coding by copying a prediction signal motion-compensated every small region, the encoding is performed in accordance with the flow chart of FIG. 67B. In other words, the block is encoded by the inter coding method. When the block encoded by the inter coding method is used, the processing is ended. When it is not used, the block is coded by the vector quantization.

FIG. 71A is a block diagram showing a coding apparatus for performing the processing based on the flowchart of FIG. 67A. The coding apparatus shown in FIG. 71A comprises a vector quantizer 1642, an MMR encoder 1643, a switching section 1644, and a multiplexer 1646. In this coding apparatus, the alpha-map signal 1606 is input to the vector quantizer 1642 and the MMR encoder 1643. The vector quantizer 1642 has the same arrangement as shown in FIG. 51. The index 1614 as an output from the vector quantizer 1642 is sent to the switching section 1644. Simultaneously, a switching signal 1645 is sent to the switching section 1644 and the multiplexer 1646.

The MMR encoder 1643 encodes the alpha-map signal 1606 by MMR, so that an MMR code 1647 is sent to the switching section 1644. The switching section 1644 receives the MMR code 1647 as an output from the MMR encoder 1643 and the index 1614 as an output from the vector quantizer 1642. The switching section 1644 is switched in accordance with the switching signal 1645 so that one of the MMR code 1647 and the index 1614 is selected.

The switching signal 1645 supplied to the switching section 1644 is output from the MMR encoder 1643. The MMR encoder 1643 operates such that, as an alpha-map code 1648, the index 1614 is selected when the index 1614 is determined or the MMR code 1647 is selected when no index is determined.

The index 1614 or the alpha-map code 1648 selected and output from the switching section 1644 is sent to the multiplexer 1646 for multiplexing the signal. The multiplexer 1646 multiplexes the index 1614 or the alpha-map code 1648 with the switching signal 1645 obtained from the vector quantizer 1642 and outputs the signal as a code 1649.

In this example, when MMR is selected, the decoded alpha map 1615 of the block is sent from the MMR encoder 1643 to the memory 1605 in the vector quantizes. A detailed example of the MMR encoder 1643 will be described hereinafter.

FIG. 71B is a block diagram showing a coding apparatus for performing the processing based on the flowchart of FIG. 67B. This coding apparatus further includes an inter encoder 1661 and a determining circuit 1662 for determining which the inter encoder 1661 or the vector quantizer 1642 should be employed. The switching section 1644 is switched by the output of the determining circuit 1662 in accordance with the table of FIG. 71C. In other words, when the determining circuit 1662 receives the signal S1 of the inter encoder 1661, it turns on the switch n1 to input the inter-encoded signal to the multiplexer 1646. When the determining circuit 1662 receives the signal S2 of the vector quantizer 1642, it turns on the switch n2 to input the vector-quantized signal to the multiplexer 1646. When the signals S1 and S2 are not output, it turns on the switch n3 to input the MMR coded signal to the multiplexer 1646.

The MMR encoder 1643 is described in detail hereinafter.

Figure 74A:
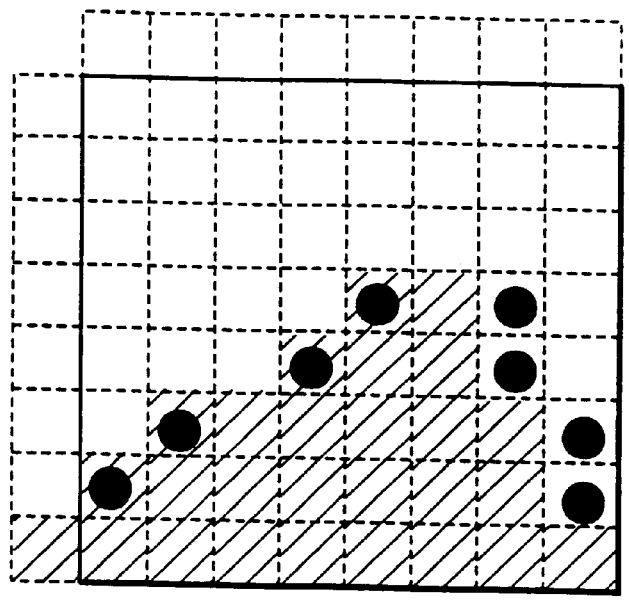
FIGS. 74A and 74B are views respectively showing the relationship between changing pixels in encoding in units of blocks and a reference area for detecting a changing pixel b1, so as to explain the 11th embodiment of the present invention (views showing the relationship between changing pixels in block-based encoding and a reference area, respectively)
Figure 74B:
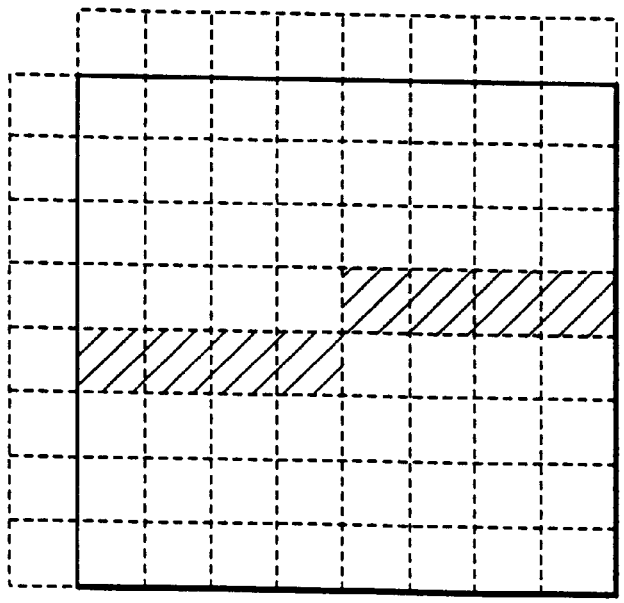

FIG. 74A is a view showing the relationship between changing pixels in encoding in units of blocks. FIG. 74B is a view showing a reference area for detecting a pixel b1.

In MMR encoding, i.e., block-based encoding, encoding of changing pixels may be simplified. The following processing may be performed by changing the scan order, as in the sixth embodiment, or may be applied to reduced blocks, as in the eighth embodiment.

Simplified changing pixels are encoded in the following manner.

Assume that the addresses of changing pixels ai (i=0 to 1) and b1 from the upper left corner of the frame are represented by abs_ai (i=0 to 1) and abs_b1. Values r_ai (i=0 to 1) and r_b1 are obtained by the following equations:

$$r\text{-}a0 = \text{abs}\_a0 - (\text{int})(\text{abs}\_a0/\text{WIDTH})*\text{WIDTH}$$

$$r\text{-}a1 = \text{abs}\_a0 - (\text{int})(\text{abs}\_a0/\text{WIDTH})*\text{WIDTH}*\text{WIDTH}$$

$$r\text{-}b1 = \text{abs}\_a0 - (\text{int})(\text{abs}\_a0/\text{WIDTH})*\text{WIDTH}$$

In the above equations, "*" means multiplication, "(int) (x)" means rounding off the digits after the decimal point of x, and "WIDTH" is the number of pixels in the horizontal direction of the block.

When encoding the value "r_a1-r_b1" or "r_a1-r_a0", a reproduced value can be obtained.

Figure 75:
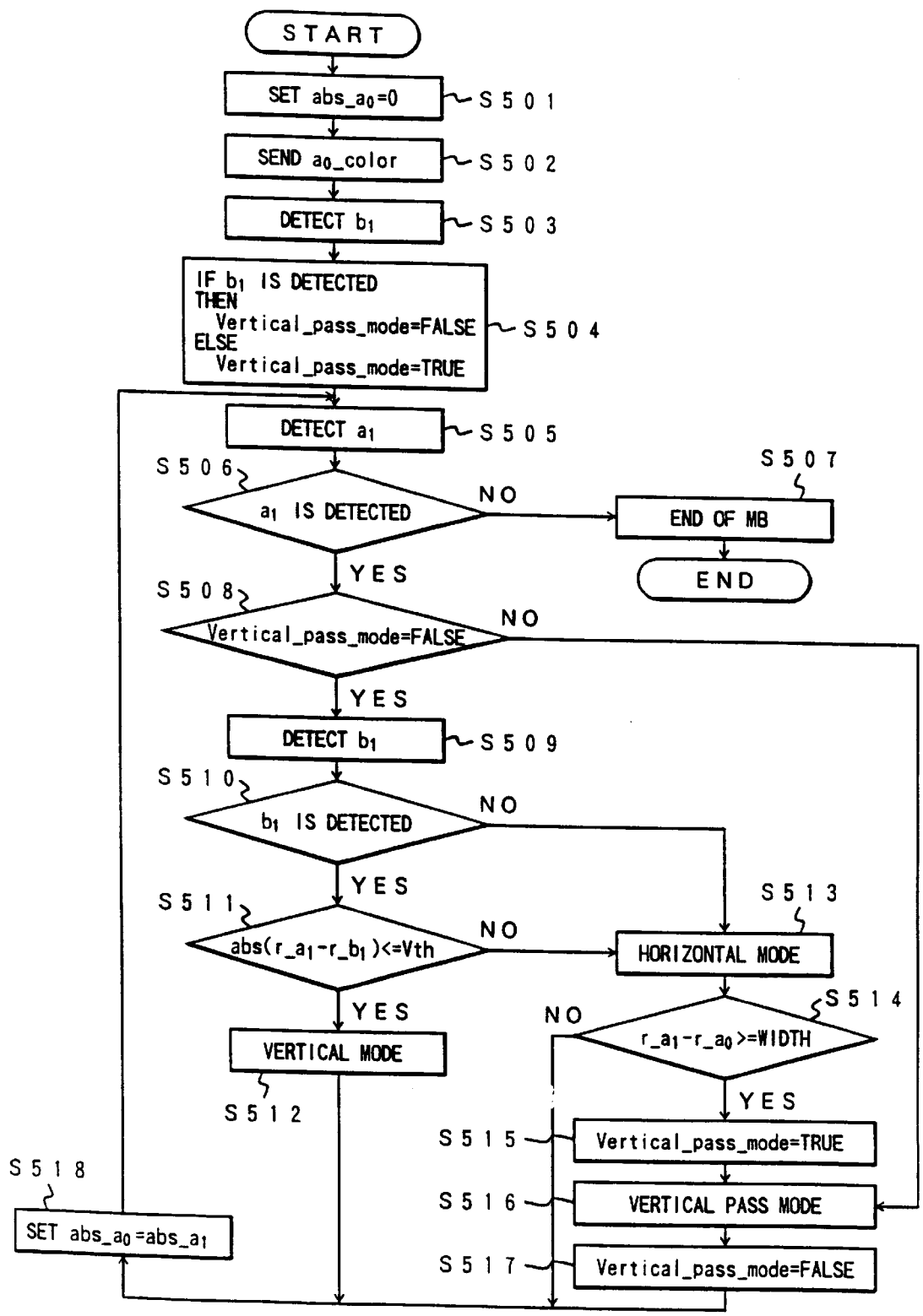
FIG. 75 is a flow chart showing block-based encoding by MMR, so as to explain the 11th embodiment of the present invention.

FIG. 75 is a flow chart of block-based encoding by MMR. The encoding process will be described in accordance with this flow chart. First, the position of the starting changing pixel is initialized (S501). The pixel value at the initial position (the upper left pixel of the block) is encoded by one-bit codes (S502). At the initial position, the reference changing pixel b1 is detected (S503).

If the changing pixel b1 is not detected, the vertical mode cannot be used because no changing pixel is present in the reference area. Therefore, the vertical pass mode is set to "TRUE". When the changing pixel b1 is detected, the vertical mode can be used, so that the vertical pass mode is set to "FALSE".

Setting of the initial state is ended, and the process shifts to the encoding loop process.

The changing pixel a1 is detected (S505). It is determined whether the changing pixel a1 is detected (S506). If NO in step S506, the end code (EOMB) of the encoding process, which represents the end of encoding, is encoded (S507) because no changing pixel is present anymore.

If YES in step S506, the vertical pass mode is determined (S508). If the vertical pass mode is "TRUE", encoding in the vertical pass mode is performed (S516). If the vertical pass mode is "FALSE", the changing pixel b1 is detected (S509).

It is determined whether the changing pixel is detected (S510). If NO in step S510, the flow advances to the step of the horizontal mode (S513). If YES in step S510, it is determined whether the absolute value of "r_a1-r_b1" is larger than a threshold value (VTH) (S511). If NO in step S511, the flow advances to the step of the vertical mode (S512). If YES in step S511, the flow advances to the step of the horizontal mode (S513).

In the step of the horizontal mode (S513), the value "r_a1-r_a0" is encoded. It is determined whether the value "r_a1-r_a0" is smaller than "WIDTH" (S514). If NO in step S514, the vertical pass mode is set to "TRUE" (S515), and the flow advances to the step of the vertical pass mode (S516). Upon completion of the step of the vertical pass mode (S516), the vertical pass mode is set to "FALSE".

After one of the vertical mode, the horizontal mode, and the vertical pass mode is ended (after encoding up to the pixel a1 is ended), the position of the pixel a1 is set as the position of the next pixel a0 (S518), and the flow returns to step S505.

FIG. 73 shows an example of a VLC table.

When the vertical pass mode is "TRUE", there are only three codes, i.e., V0, H, and EOMB. In accordance with the vertical pass mode, the VLC can be switched. When the vertical pass mode is "TRUE", the code EOMB is generated only when the changing pixel a0 is present at the upper left position (initial position) of the block. In this case, the code of "0" in FIG. 73 is used.

When not vector quantization but only MMR encoding is used, the above-described example may be directly applied to the alpha-map encoder 200 shown in FIG. 2.

Figure 62:
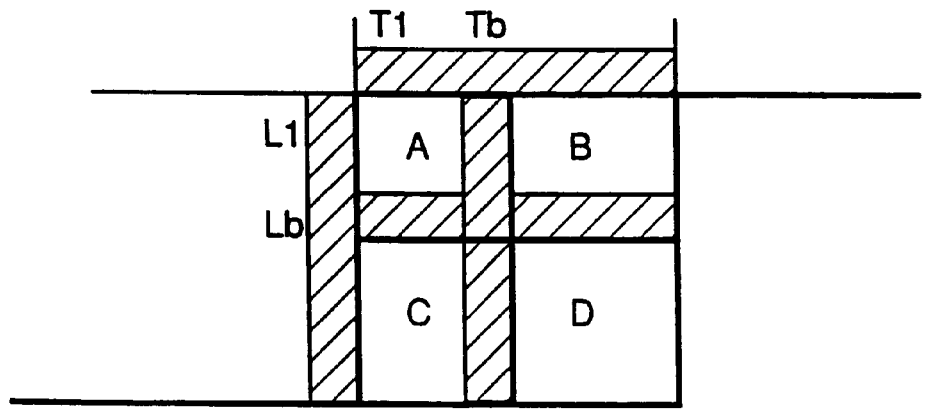
FIG. 62 is a view for explaining a reference portion obtained upon redividing a block, so as to explain the 11th embodiment of the present invention.

In addition to the encoding method such as MMR, a block for which no index is determined can be encoded by a method in which the macro block is redivided into small blocks, and vector quantization is performed again, as shown in FIG. 62. In FIG. 62, a macro block of a standard size is further divided into small blocks each having a size b=B/2.

In this case, encoding is performed in the order of "A B C D" or "A C B D" such that the reference portion of each block can be encoded first.

Redivision of the block is performed until the error falls within the allowance. With this operation, the number of indices increases to increase the amount of codes accordingly. However, the error can be suppressed within the allowance.

Figure 57:
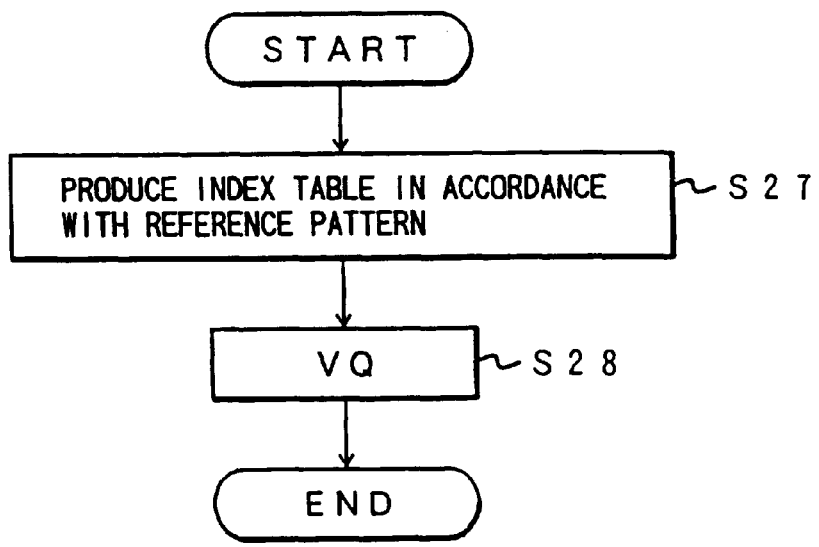
FIG. 57 is a flow chart showing the flow of the process of the coding apparatus of the 11th embodiment, so as to explain the 11th embodiment of the present invention.

The detailed example of the coding apparatus has been described above. Finally, the flow chart of the coding apparatus as a whole is shown in FIG. 57.

S27: An index table is generated in accordance with reference patterns.

S28: Vector quantization is performed using the generated index table, and the processing is ended.

The processing is performed in the above manner.

Figure 52:
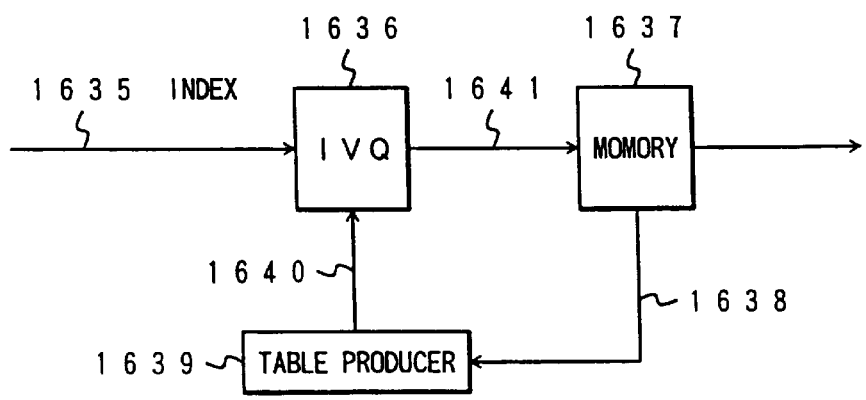
FIG. 52 is a block diagram showing a detailed example of a decoding apparatus of the present invention using vector quantization, so as to explain the 11th embodiment of the present invention.

FIG. 52 is a block diagram showing a detailed example of a decoding apparatus. The circuit shown in FIG. 52 comprises a vector inverse quantizer 1636 for performing vector inverse quantization, a memory 1637 for holding information obtained upon vector inverse quantization, and an index table generator 1639 for generating an index table. This circuit is arranged at the portion of the alpha-map decoder 400 in the video decoding apparatus shown in FIG. 3.

An index 1635 is input to the vector inverse quantizer 1636. The memory 1637 holds an already decoded alpha map, and a reference pattern 1638 is sent from the memory 1637 to the index table generator 1639. The index table generator 1639 is the same as that of the coding apparatus.

A generated index table 1640 is sent to the vector inverse quantizer 1636. A decoded alpha map 1641 is sent from the vector inverse quantizer 1636 to the memory 1637.

Figure 58:
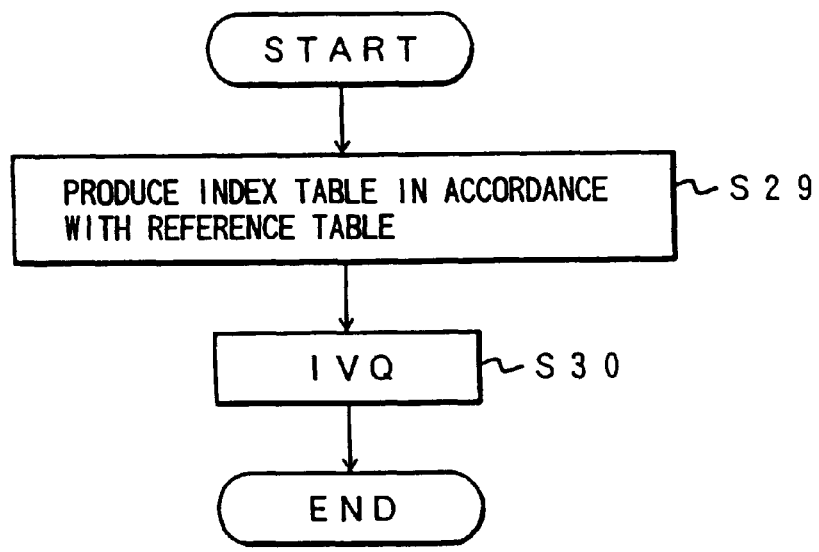
FIG. 58 is a flow chart showing the flow of the process of the decoding apparatus of the 11th embodiment shown in FIG. 52, so as to explain the 11th embodiment of the present invention.

FIG. 58 is a flow chart showing the flow of the process of the decoding apparatus shown in FIG. 52. This flow chart will be described. The index table generator 1639 generates an index table in accordance with reference patterns (S29). The vector inverse quantizer 1636 performs vector inverse quantization of the index 1635 by using the generated index table (S30), and the processing is ended.

Figure 72A:
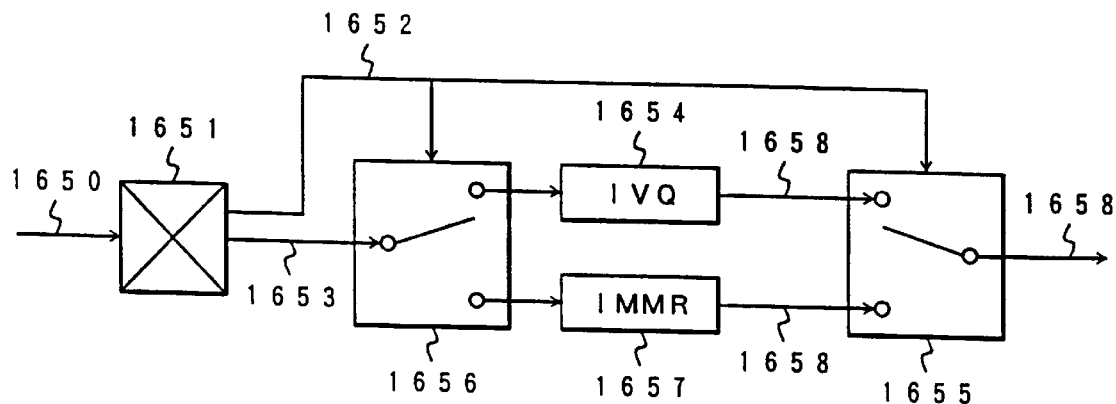
FIGS. 72A and 72B are block diagrams showing decoding apparatuses for decoding a code generated by the coding apparatuses shown in FIGS. 71A and 71B, so as to explain the 11th embodiment of the present invention.

FIG. 72A shows a decoding apparatus for decoding a code generated by the coding apparatus shown in FIG. 71A. This decoding apparatus comprises a demultiplexer 1651 for demultiplexing a signal obtained by multiplexing a switching signal 1652 with an alpha-map code 1653, a switching section 1655 for switching the circuit in accordance with the switching signal 1652 demultiplexed by the demultiplexer 1651 to input a signal to a vector inverse quantizer 1654 or an MMR decoder 1657, the vector inverse quantizer 1654 for performing vector inverse quantization of the alpha-map code 1653 demultiplexed by the demultiplexer 1651 and supplied through the switching section 1655, and a switching section 1656 for switching the circuit in accordance with the switching signal 1652 to output a signal from the vector inverse quantizer 1654 or the MMR decoder 1657.

In this arrangement, a code 1650 as the multiplexed signal of the switching signal 1652 and the alpha-map code 1653 is input to the demultiplexer 1651. The demultiplexer 1651 demultiplexes the code 150 into the switching signal 1652 and the alpha-map code 1653. The switching signal 1652 is sent to the switching sections 1655 and 1656. The alpha-map code 1653 is sent to the switching section 1656.

The switching section 1656 sends the alpha-map code 1653 to the vector inverse quantizer 1654 or the MMR decoder 1657 in accordance with the switching signal 1652. Upon receiving the alpha-map code 1653, the vector inverse quantizer 1654 or the MMR decoder 1657 reconstructs an alpha map 1658. The alpha map 1658 is output through the switching section 1655.

Figure 72B:
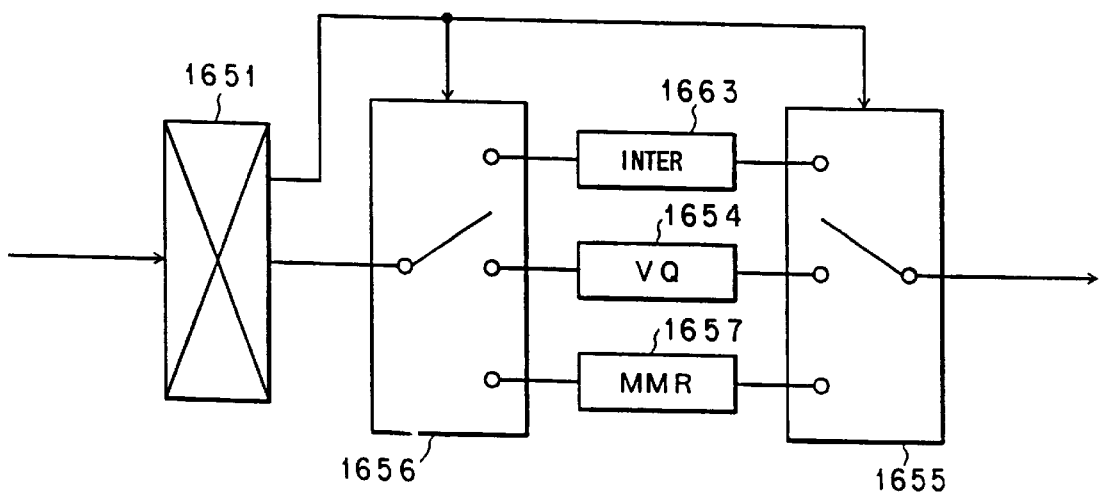

FIG. 72B shows a decoding apparatus for decoding a code generated by the coding apparatus shown in FIG. 71B. In the decoding apparatus, an inter decoder 1663 is added to the decoding apparatus of FIG. 72A. According to the decoding apparatus, when the code 1650 as the multiplexed signal of the switching signal 1652 and the alpha-map code 1653 is demultiplexed by the demultiplexer 1651, the switching signal 1652 is sent to the switching sections 1655 and 1656 and the alpha-map code 1653 is sent to the switching section 1656.

The switching section 1656 sends the alpha-map code 1653 to the vector inverse quantizer 1654, the MMR decoder 1657 or the inter decoder 1663 in accordance with the switching signal 1652. Upon receiving the alpha-map code 1653, the vector inverse quantizer 1654, the MMR decoder 1657 or the inter decoder 1663 reconstructs an alpha map 1658. The alpha map 1658 is output through the switching section 1655.

The detailed example of the decoding apparatus as the 11th embodiment has been described above.

As has been described above, according to the present invention, the alpha map can be efficiently encoded. Since the amount of codes of the alpha map can be reduced, the background and the object can be independently encoded without largely decreasing the encoding efficiency.

Although various embodiments have been described above, the present invention is not limited to the above embodiments, and various changes and modifications can be made.

According to the present invention, since the amount of codes of the alpha map can be reduced, the background and the object can be independently encoded without largely decreasing the encoding efficiency, unlike the conventional encoding method.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A picture encoding apparatus comprising:
    an object region detector configured for receiving an alpha-map signal of a whole picture including an object and a background surrounding the object, the alpha-map signal discriminating between the object and the background in accordance with information representing whether a value of the alpha-map signal is 0, and detecting a rectangular object region containing the object and a part of the background surrounding the object, from the whole picture to obtain an alpha-map signal of the rectangular object region and a position of the rectangular object region and a size thereof;
    an encoder configured for encoding the alpha-map signal of the rectangular object region and the position and size of the rectangular object region to output coded alpha-map data and coded position/size data; and
    a multiplexer configured for multiplexing the coded alpha-map data and the coded position/size data.

2. The picture coding apparatus according to claim 1, wherein said encoder encodes an address of a corner of the object region and dimensions thereof in horizontal and vertical directions.

3. The picture coding apparatus according to claim 1, wherein the object region consists of a plurality of blocks, each of which is a processing unit for encoding.

4. The picture coding apparatus according to claim 1, wherein the object region includes an integral number of blocks, each of which is a processing unit for encoding.

5. A picture encoding apparatus comprising:
    an object region detector configured for receiving a binary picture signal of a whole picture including an object and a background surrounding the object, the binary picture signal discriminating between the object and the background in accordance with information representing whether a value of the alpha-map signal is 0, and detecting a rectangular object region containing the object and a part of the background surrounding the object, from the whole picture to obtain a binary picture signal of the rectangular object region and a position of the rectangular object region and a size thereof;
    an encoder configured for encoding the binary picture signal of the rectangular object region and the position and size of the rectangular object region to output coded alpha-map data and coded position/size data; and
    a multiplexer configured for multiplexing the ended alpha-map data and the coded position/size data.

6. The picture coding apparatus according to claim 5, wherein said encoder encodes an address of a corner of the object region and dimensions thereof in horizontal and vertical directions.

7. The picture coding apparatus according to claim 5, wherein the object region consists of a plurality of blocks, each of which is a processing unit for encoding.

8. The picture coding apparatus according to claim 5, wherein the object region includes an integral number of blocks, each of which is a processing unit for encoding.

9. A method of encoding a picture comprising the steps of:
    receiving an alpha-map signal of a whole picture including an object and a background surrounding the object, the alpha-map signal discriminating between the object and the background in accordance with information representing whether a value of the alpha-map signal is 0;
    detecting a rectangular object region including the object and a part of the background surrounding the object from a whole picture including the object and the background to obtain an alpha-map signal of the rectangular object region and a position of the rectangular object region and a size thereof;
    encoding the alpha-map signal of the rectangular object region and the position and size of the rectangular object region to output coded alpha-map data and coded position/size data; and
    multiplexing the coded alpha-map data and the coded position/size data.

10. The method according to claim 9, wherein said encoding step encodes an address of a corner of the object region and dimensions thereof in horizontal and vertical directions.

11. The method according to claim 9, wherein the object region consists of a plurality of blocks, each of which is a processing unit for encoding.

12. The method according to claim 9, wherein the object region includes an integral number of blocks, each of which is a processing unit for encoding.

13. A picture encoding method comprising the steps of:
    receiving a binary picture signal of a whole picture including an object and a background surrounding the object, the binary picture signal discriminating between the object and the background in accordance with information representing whether a value of the alpha-map signal is 0;
    detecting rectangular object region including the object and a part of the background surrounding the object from the whole picture to obtain a binary picture signal of the rectangular object region and a position of the rectangular object region and a size thereof;
    encoding the binary picture signal of the rectangular object region and the position and size of the rectangular object region to output coded binary picture data and coded position/size; and
    multiplexing the coded binary picture data and the coded position/size data.

14. The method according to claim 13, wherein said encoding step encodes an address of a corner of the object region and dimensions thereof in horizontal and vertical directions.

15. The method according to claim 13, wherein the object region consists of a plurality of blocks each which is a processing unit for encoding.

16. The method according to claim 13, wherein the object region includes an integral number of blocks, each of which is a processing unit for encoding.

* * * * *